(12) United States Patent
Lai et al.

(10) Patent No.: US 11,994,736 B2
(45) Date of Patent: May 28, 2024

(54) IMAGING LENS ASSEMBLY, IMAGE CAPTURING DEVICE AND ELECTRONIC DEVICE

(71) Applicant: LARGAN PRECISION CO., LTD., Taichung (TW)

(72) Inventors: Yu-Chen Lai, Taichung (TW); Ming-Ta Chou, Taichung (TW); Cheng-Feng Lin, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 556 days.

(21) Appl. No.: 17/144,214

(22) Filed: Jan. 8, 2021

(65) Prior Publication Data

US 2022/0050260 A1    Feb. 17, 2022

(30) Foreign Application Priority Data

Aug. 12, 2020  (TW) .................................. 109127442

(51) Int. Cl.
*G02B 7/02* (2021.01)
*G02B 5/00* (2006.01)
*G02B 13/00* (2006.01)
*H04N 5/225* (2006.01)
(Continued)

(52) U.S. Cl.
CPC ............. *G02B 7/021* (2013.01); *G02B 5/003* (2013.01); *G02B 13/004* (2013.01); *H04N 23/54* (2023.01); *H04N 23/55* (2023.01)

(58) Field of Classification Search
CPC .......... G02B 7/02; G02B 7/021; G02B 7/022; G02B 7/023; G02B 7/025; G02B 7/026; H04N 23/54; H04N 23/55
See application file for complete search history.

(56) References Cited

U.S. PATENT DOCUMENTS 6,813,099 B2 * 11/2004 Yamaguchi .......... G02B 13/004
                                                           359/779
7,092,174 B2   8/2006 Yamaguchi et al.
7,221,524 B2   5/2007 Ye et al.
(Continued)

FOREIGN PATENT DOCUMENTS

CN     204143048 U    2/2015
CN     205404941 U    7/2016
(Continued)

*Primary Examiner* — Ephrem Z Mebrahtu
(74) *Attorney, Agent, or Firm* — McClure, Qualey & Rodack, LLP

(57) ABSTRACT

An imaging lens assembly has an optical axis and includes an annular structure located on an object side of the imaging lens assembly and surrounds the optical axis. The annular structure is located on an object side of the imaging lens assembly, surrounds the optical axis, and includes a first through hole, a second through hole, a first frustum surface, a second frustum surface and a third frustum surface. The first through hole is disposed on an object side of the annular structure, and the second through hole is disposed on an image side of the first through hole. The first frustum surface is disposed on the image side of the first through hole. The second frustum surface is disposed on an object side of the second through hole. The third frustum surface is disposed on an image side of the second through hole.

21 Claims, 57 Drawing Sheets

(51) Int. Cl.
*H04N 23/54* (2023.01)
*H04N 23/55* (2023.01)

(56) References Cited

U.S. PATENT DOCUMENTS

| | | |
|---|---|---|
| 7,528,880 B2 | 5/2009 | Yamaguchi et al. |
| 7,561,354 B2 | 7/2009 | Lin |
| 8,970,972 B2 | 3/2015 | Madsen et al. |
| 9,069,119 B2 | 6/2015 | Takase et al. |
| 9,097,841 B2 | 8/2015 | Fornari et al. |
| 9,817,205 B2 | 11/2017 | Wei et al. |
| 10,114,192 B2 | 10/2018 | Wei et al. |
| 10,139,527 B2 | 11/2018 | Gombert et al. |
| 11,156,903 B2 | 10/2021 | Chen et al. |
| 2003/0193605 A1* | 10/2003 | Yamaguchi .............. G02B 9/14 348/335 |
| 2004/0105173 A1* | 6/2004 | Yamaguchi .............. G02B 9/10 359/793 |
| 2010/0176281 A1* | 7/2010 | Tomioka ............ G02B 27/0018 250/227.2 |
| 2018/0129017 A1* | 5/2018 | Huang .................. G02B 1/041 |

FOREIGN PATENT DOCUMENTS

| | | |
|---|---|---|
| CN | 206431347 U | 8/2017 |
| CN | 206523665 U | 9/2017 |
| CN | 207731004 U | 8/2018 |
| CN | 209979984 U | 1/2020 |
| CN | 210742587 U | 6/2020 |

* cited by examiner

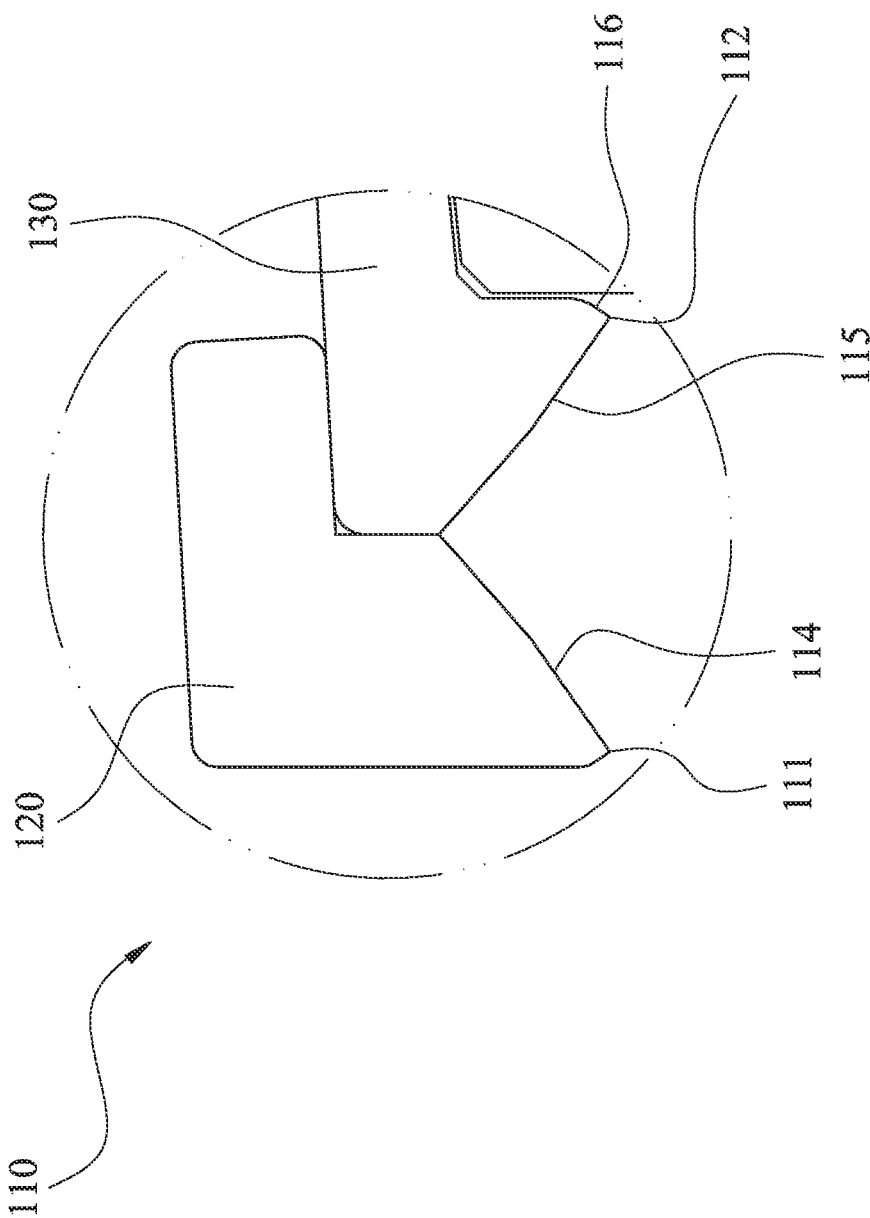

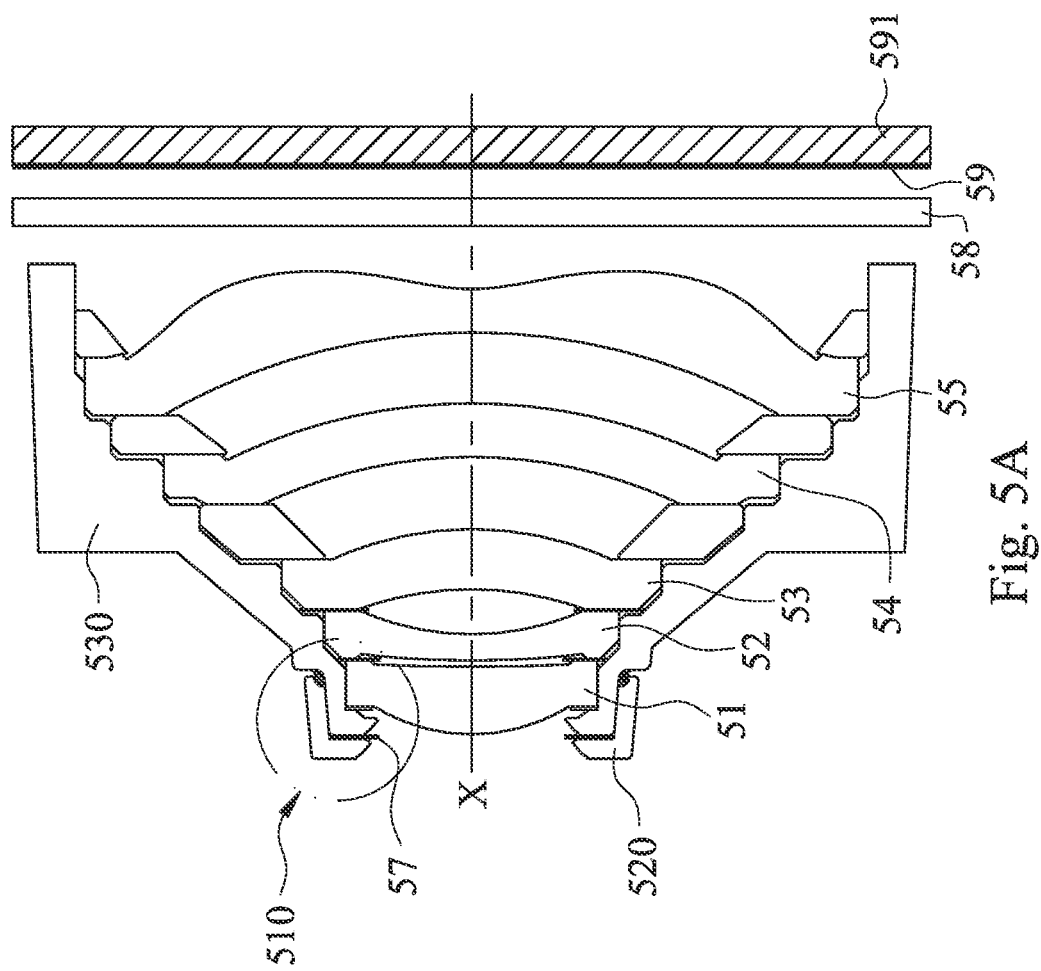

IMAGING LENS ASSEMBLY, IMAGE CAPTURING DEVICE AND ELECTRONIC DEVICE

RELATED APPLICATIONS

This application claims priority to Taiwan Application Serial Number 109127442, filed Aug. 12, 2020, which is herein incorporated by reference.

BACKGROUND

Technical Field

The present disclosure relates to an imaging lens assembly and an image capturing device. More particularly, the present disclosure relates to an imaging lens assembly and an image capturing device applicable to portable electronic devices.

Description of Related Art

In an imaging lens assembly, a light blocking element is often used to improve an image quality; specifically, the light blocking element is configured to block a non-imaging light out of a field of view being incident into the imaging lens assembly in case an image quality decreases due to a generation of the stray light on an image surface. In recent years, a market trend of the imaging lens assembly develops in a way of short total track length (TTL), large image sensor, high pixel density and wide angle of view, and higher image quality is required such as high resolving power and high relative illumination (RI %). Hence, capabilities of traditional light blocking elements are not enough to be used due to many factors.

Please refer to FIG. 11A, FIG. 11A is a schematic view of an electronic device 1100 without a light blocking element according to the conventional art. According to FIG. 11A, in the condition without the light blocking element, when light-emitting elements get close to an imaging lens assembly, a non-imaging light N is incident into the imaging lens assembly and generates the stray light on an image surface 1119. Please refer to FIG. 11B, FIG. 11B is a schematic view of an electronic device 1100 with a light blocking element 1107 according to the conventional art. In FIG. 11B, when the light blocking element 1107 is disposed on the electronic device 1100, a total track length increases and a large-angled imaging light I is shaded in a cause of decreasing relative illumination and seriously effecting an optical quality. Hence, developing an imaging lens assembly with an improved optical quality in a limited space is an important and urgent problem to be solved in the industry.

SUMMARY

According to one aspect of the present disclosure, an imaging lens assembly has an optical axis and includes an annular structure. The annular structure is located on an object side of the imaging lens assembly, surrounds the optical axis, and includes a first through hole, a second through hole, a first frustum surface, a second frustum surface and a third frustum surface. The first through hole is disposed on an object side of the annular structure, and the optical axis passes therethrough. The second through hole is disposed on an image side of the first through hole, and the optical axis passes therethrough. The first frustum surface is disposed on the image side of the first through hole and extends from the first through hole to the second through hole in a direction away from the optical axis. The second frustum surface is disposed on an object side of the second through hole and extends from second through hole to the first through hole in the direction away from the optical axis. The third frustum surface is disposed on an image side of the second through hole and extends from the second through hole in a direction away from the first through hole and in the direction away from the optical axis. The first frustum surface of the annular structure and the second frustum surface of the annular structure gradually taper towards the direction away from the optical axis. The second frustum surface and the third frustum surface gradually taper towards the second through hole. The second through hole of the annular structure is a tip-end opening. A minimum angle between the first frustum surface and the optical axis is $\theta 1$, a diameter of the first through hole is L1, a diameter of the second through hole is L2, and the following condition is satisfied: 3 degrees<$\theta 1$≤70 degrees, and L1≥L2.

According to one aspect of the present disclosure, an image capturing device includes the imaging lens assembly of the aforementioned aspect.

According to one aspect of the present disclosure, an electronic device includes the at least one image capturing device of the aforementioned aspect and an image sensor. The image sensor is disposed on an image surface of the at least one image capturing device.

According to another aspect of the present disclosure, an imaging lens assembly has an optical axis and includes an annular structure. The annular structure is located on an object side of the imaging lens assembly, surrounds the optical axis and includes a first through hole, a second through hole, a first object-side surface, a first image-side surface, a second frustum surface and a third frustum surface. The first through hole is disposed on an object side of the annular structure, and the optical axis passes therethrough. The second through hole is disposed on an image side of the first through hole, and the optical axis passes therethrough. The first object-side surface is disposed on an object side of the first through hole and extends from the first through hole in a direction away from the optical axis. The first image-side surface is disposed on the image side of the first through hole, extends from the first through hole in the direction away from the optical axis, and the first image-side surface is disposed relative to the first object-side surface. The second frustum surface is disposed on an object side of the second through hole and extends from the second through hole to the first through hole in the direction away from the optical axis. The third frustum surface is disposed on an image side of the second through hole and extends from the second through hole in a direction away from the first through hole and in the direction away from the optical axis. The first image-side surface of the annular structure and the second frustum surface of the annular structure gradually taper in the direction away from the optical axis. The second frustum surface and the third frustum surface gradually taper towards the second through hole. The second through hole of the annular structure is a tip-end opening.

According to one aspect of the present disclosure, an image capturing device includes the imaging lens assembly of the aforementioned aspect.

According to one aspect of the present disclosure, an electronic device includes the at least one image capturing of the aforementioned image capturing device and an image sensor. The image sensor is disposed on an image surface of the at least one image capturing device.

BRIEF DESCRIPTION OF THE DRAWINGS

The present disclosure can be more fully understood by reading the following detailed description of the embodiment, with reference made to the accompanying drawings as follows:

FIG. 1B is a partially enlarged view of the electronic device according to the 1st embodiment in FIG. 1A.

FIG. 5A is a schematic view of an electronic device according to the 5th embodiment of the present disclosure.

DETAILED DESCRIPTION

Figure 1A:
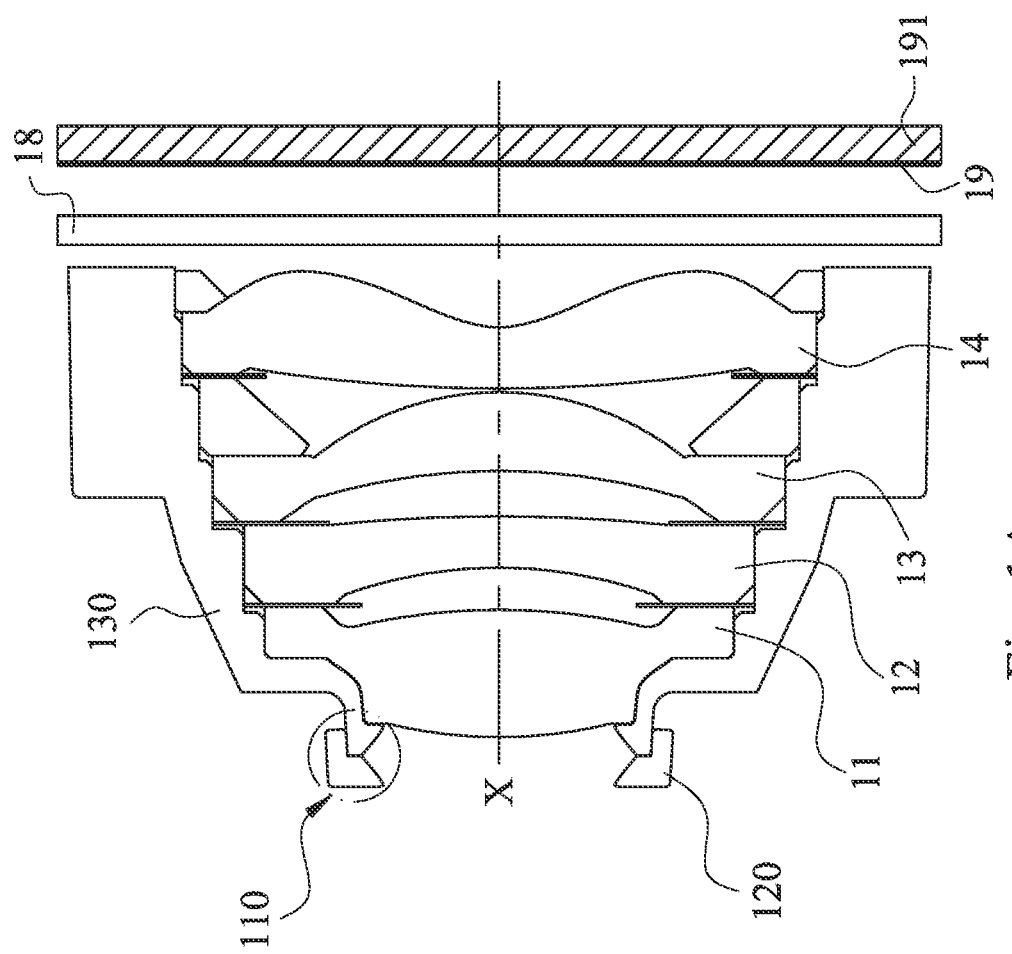
FIG. 1A is a schematic view of an electronic device according to the 1st embodiment of the present disclosure.

The present disclosure provides an imaging lens assembly, which has an optical axis and includes an annular structure. The annular structure is located on an object side of the imaging lens assembly, surrounds the optical axis, and includes a first through hole, a second through hole, a second frustum surface and a third frustum surface. The first through hole is disposed on an object side of the annular structure, and the optical axis passes therethrough. The second through hole is disposed on an image side of the first through hole, and the optical axis passes therethrough, wherein the second through hole is a tip-end opening and the second through hole can be a smallest through hole of the annular structure. Specifically, the tip-end opening is a tip-end protruding towards the optical axis. The second frustum surface is disposed on an object side of the second through hole and extends from the second through hole to the first through hole in a direction away from the optical axis. The third frustum surface is disposed on an image side of the second through hole and extends from the second through hole in a direction away from the first through hole and in the direction away from the optical axis. The second frustum surface and the third frustum surface gradually taper towards the second through hole. Hence, it is favorable for improving an exact image quality closer to an ideal design and decreasing the generation of the stray light, and the third frustum surface can be configured to improve a formability of the annular structure. Furthermore, cross sections of the second frustum surface and the third frustum surface can be arc lines or slash lines, the second frustum surface and the third frustum surface can include convex structures or concave structures, but the present disclosure is not limited thereto.

The imaging lens assembly can further include a first frustum surface, wherein the first frustum surface is disposed on the image side of the first through hole, extends from the first through hole to the second through hole in the direction away from the optical axis, and the first frustum surface can be a non-vertical cylindrical surface. Furthermore, the first frustum surface of the annular structure and the second frustum surface thereof gradually taper in the direction away from the optical axis so as to form a light trap structure. Hence, it is favorable for decreasing an intensity of a non-imaging light or changing a reflection path thereof, and improving the image quality by intercepting most of the non-imaging light.

The annular structure can further include a first image-side surface. The first image-side surface can be disposed on an image-side edge of the first frustum surface and extends from an image side of the first frustum surface in the direction away from the optical axis. Furthermore, the first image-side surface of the annular structure and the second frustum surface of the annular structure can gradually taper in the direction away from the optical axis, and all of the first frustum surface, a first image-side surface and the second frustum surface collaboratively form a light trap structure. Hence, it is favorable for improving the effect of the light trap structure by enlarging a surface area of the light trap structure.

The annular structure can further include a first object-side surface. The first object-side surface is disposed on an object side of the first through hole and extends from the first through hole in the direction away from the optical axis. Specifically, the first image-side surface can be disposed on the image side of the first through hole, extend from the first through hole in the direction away from the optical axis, and be disposed relative to the first object-side surface. Hence, it is favorable for ensuring the image quality by improving a circularity of the first through hole.

The annular structure can be composed of a front cover and a lens barrel. The front cover can include the first through hole and the first frustum surface, the lens barrel can include the second through hole, the second frustum surface and the third frustum surface, and the lens barrel is located on an image side of the front cover. Hence, it is favorable for enhancing a feasibility of manufacturing.

The imaging lens assembly can further include an axial connecting structure. The axial connecting structure is disposed on the front cover and the lens barrel and can include a fourth frustum surface and a fifth frustum surface. The fourth frustum surface can be disposed on the image side of the front cover, the fourth frustum surface is farther from the first through hole than the first frustum surface from the first through hole, the fourth frustum surface faces towards the optical axis and extends from the image side of the front cover to the lens barrel in the direction away from the optical axis. The fifth frustum surface can be disposed on an object side of the lens barrel, the fifth frustum surface is farther from the second through hole than the second frustum surface from the second through hole, the fifth frustum surface faces towards the fourth frustum surface and extends from the object side of the lens barrel in a direction away from the front cover and the optical axis. Both of the fourth frustum surface and the fifth frustum surface can be in a form of a connecting surface, the fourth frustum surface can contact the fifth frustum surface physically, and the front cover is aligned with the lens barrel. Furthermore, the front cover can further include a groove, the groove is located on the image side and faces towards the optical axis, and the groove and the fifth frustum surface form a containing groove. The containing groove is configured to contain a glue. A bonding strength between the front cover and the lens barrel and an associativity of the axial connecting structure can be enhanced via the glue.

The annular structure can be composed of a lens barrel and a ring element. The lens barrel can include the first through hole and the first frustum surface, the ring element can include the second through hole, the second frustum surface and the third frustum surface. The lens barrel surrounds the optical axis and forms a containing space. The ring element is disposed on an object side of the containing space and contacts the lens barrel physically. Hence, it is favorable for enhancing a feasibility of manufacturing and improving a process of assembling. Moreover, the glue can be disposed in the containing space, and the coherence between the lens barrel and the ring element can be fixed via the glue.

The first through hole, the second through hole, the first frustum surface, the second frustum surface and the third frustum surface can be integrally formed, and the annular structure can be integrally formed via injection molding with elastic demolding. Hence, it is favorable for decreasing a space for strapping and assembling and is favorable for reducing a volume of the imaging lens assembly.

The imaging lens assembly can further include a light blocking sheet which is disposed between the first frustum surface and the second frustum surface. The first frustum surface, the light blocking sheet and the second frustum surface can be arranged in order from the object side to an image side. The imaging lens assembly can include a third through hole, and the optical axis passes through the third through hole. Hence, it is favorable for increasing a surface area of the light trap structure and improving the effect of the light trap structure.

At least one of the first frustum surface and the second frustum surface can include a concentric circle structure. The concentric circle structure surrounds the optical axis and can be opaque. The concentric circle structure is not configured to image. Hence, it is favorable for further improving the effect of the light trap structure. Specifically, the concentric circle structure can include a plurality of convex structures. Each of the convex structures can include an arc torus surface and a connecting surface, wherein the art torus surfaces can have the same curving direction, the arc torus surfaces can be arranged along the first frustum surface, the second frustum surface or the first image-side surface, and the connecting surfaces connect the two adjacent art torus surfaces. Moreover, each of the arc torus surfaces can be composed of at least one frustum surface, and a rounded angle can be further included between the arc torus surfaces and the connecting surfaces. Hence, it is favorable for enhancing a feasibility of manufacturing. It is worth to be mentioned that the concentric circle structure can be Fresnel structure, the convex structures can be arc-shaped convex, but the present disclosure is not limited thereto.

The imaging lens assembly can further include a first lens element and at least two lens elements. The first lens element and the lens elements are disposed on the image side of the annular structure, the lens elements are disposed on an image side of the first lens element, and the first lens element can be a closest lens element of the imaging lens assembly to the object side. Hence, it is favorable for increasing the effect of the light trap structure.

The annular structure can be composed of a light blocking sheet and a lens barrel. The light blocking sheet can include the first through hole, the first object-side surface and the first image-side surface, and the lens barrel can include the second through hole, the second frustum surface and the third frustum surface. Hence, it is favorable for enhancing a feasibility of manufacturing.

The lens barrel can further include a sixth frustum surface. The sixth frustum surface surrounds an object-side edge of the lens barrel, faces towards the optical axis, extends towards the light blocking sheet and gradually expands. The sixth frustum surface contacts an object-side edge of the light blocking sheet. Specifically, the lens barrel can be integrally formed via injection molding with elastic demolding.

It is worth to be mentioned that all of the first frustum surface of the annular structure, the second frustum surface of the annular structure, the third frustum surface of the annular structure, the fourth frustum surface of the axial connecting structure, the fifth frustum surface of the axial connecting structure and the sixth frustum surface of the lens barrel can be conical surfaces.

When a minimum angle between the first frustum surface and the optical axis is $\theta 1$, the following condition can be satisfied: 3 degrees<$\theta 1$≤70 degrees. Hence, it is favorable for inducing the non-imaging light into the light trap structure. Further, the following condition can be satisfied: 3 degrees<$\theta 1$≤30 degrees. Hence, the first frustum surface and the lens barrel can be integrally formed, and $\theta 1$ can be an elastic demolding angle.

When a diameter of the first through hole is L1, and a diameter of the second through hole is L2, the following condition can be satisfied: L1≥L2. Specifically, the second through hole is a smallest through hole of the annular structure. Hence, it is favorable for avoiding over light blocking so as to ensure the image quality.

When an angle between the third frustum surface and the optical axis is $\theta 3$, the following condition can be satisfied: 35 degrees≤$\theta 3$≤80 degrees. Specifically, the annular structure can be manufactured via injection molding by a black material. Hence, it is favorable for improving a formability of the annular structure.

When a diameter of the second through hole is L2, a diameter of the third through hole is L3, the following condition can be satisfied: 0≤(L3−L2)/L2≤0.2. Hence, it is favorable for increasing the surface area of the light trap structure and improving the effect of light trap structure.

When an angle between the sixth frustum surface and the optical axis is $\theta f$, the following condition can be satisfied: 3 degrees<$\theta f$≤30 degrees. Hence, the sixth frustum surface and the lens barrel can be integrally formed, and $\theta f$ can be an elastic demolding angle.

When a spacing thickness between the first object-side surface of the light blocking sheet and the first image-side surface thereof is THIs, the following condition is satisfied: 0.005 mm≤THIs≤0.06 mm. Hence, it is favorable for decreasing the intensity of the non-imaging light so as to improve the image quality.

Each of the abovementioned features of the imaging lens assembly module can be utilized in various combinations for achieving the corresponding effects.

The present disclosure provides the image capturing device. The image capturing device includes the aforementioned imaging lens assembly.

The present disclosure provides an electronic device. The electronic device includes at least one of the aforementioned image capturing device and an image sensor. The image sensor is disposed on an image surface of the image capturing device.

Although the present disclosure has been described in considerable detail with reference to certain embodiments thereof, other embodiments are possible. Therefore, the spirit and scope of the appended claims should not be limited to the description of the embodiments contained herein.

1st Embodiment

FIG. 1A is a schematic view of an electronic device 10 according to the 1st embodiment of the present disclosure. In FIG. 1A, the electronic device 10 includes at least one image capturing device (its reference numeral is omitted) and an image sensor 191, wherein the image capturing device includes an imaging lens assembly (its reference numeral is omitted) and a filter 18. The image sensor 191 is disposed on an image surface 19 of the image capturing device, and the filter 18 is disposed between the imaging lens assembly and the image surface 19.

Figure 1C:
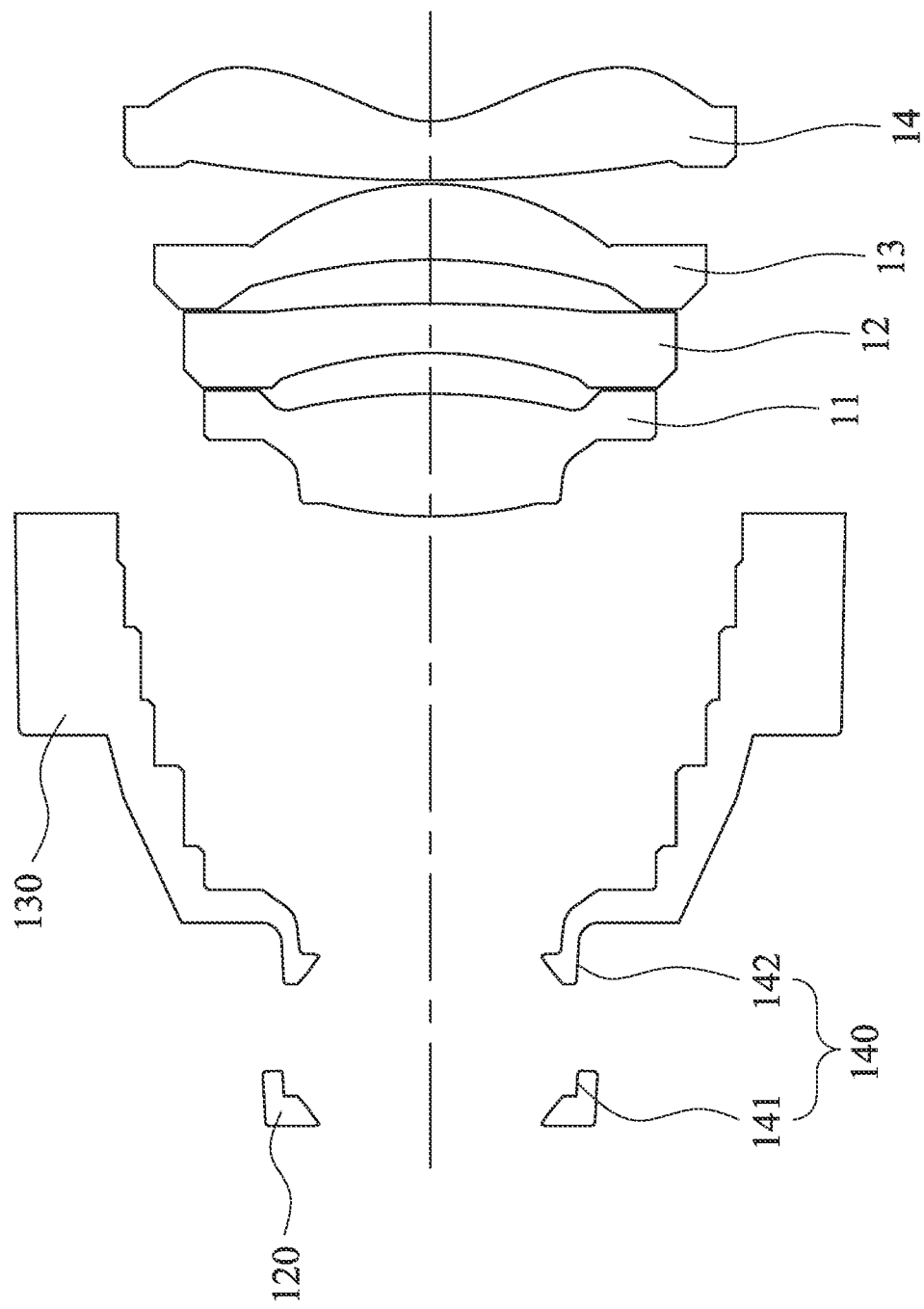
FIG. 1C is a partially exploded view of the image capturing device according to the 1st embodiment in FIG. 1A.

FIG. 1B is a partially enlarged view of the electronic device 10 according to the 1st embodiment in FIG. 1A, and FIG. 1C is a partially exploded view of the image capturing device according to the 1st embodiment in FIG. 1A. In FIGS. 1A to 1C, the imaging lens assembly has an optical axis X and includes an annular structure 110, a front cover 120, a lens barrel 130, an axial connecting structure 140, a first lens element 11 and at least two lens elements.

In the 1st embodiment, the imaging lens assembly in order from an object side to an image side includes the first lens element 11 and lens elements 12, 13, 14, wherein all of the first lens element 11 and the lens elements 12, 13, 14 are disposed on an image side of the annular structure 110, and the first lens element 11 is a closest lens element to the object side of the imaging lens assembly. Furthermore, all of the first lens element 11 and the lens elements 12, 13, 14 have refractive power, wherein optical characteristics of the lens elements such as a number, a structure, a surface shape and so on can be utilized, other optical elements can be further disposed according to different imaging requirements, and the present disclosure is not limited thereto.

In FIG. 1B, the annular structure 110 is located on the object side of the imaging lens assembly, surrounds the optical axis X, and is composed of the front cover 120 and the lens barrel 130. The front cover 120 includes a first through hole 111 and a first frustum surface 114, and the lens barrel 130 includes a second through hole 112, a second frustum surface 115 and a third frustum surface 116. The lens barrel 130 is located on an image side of the front cover 120. Hence, it is favorable for enhancing a feasibility of manufacturing.

The first through hole 111 is disposed on an object side of the annular structure 110, and the optical axis X passes through the first through hole 111. The second through hole 112 is disposed on an image side of the first through hole 111, the optical axis X passes through the second through hole 112, the second through hole 112 is a tip-end opening, and the second through hole 112 is a smallest opening of the annular structure 110. Specifically, the tip-end opening is a tip-end protruding towards the optical axis X, and the second frustum surface 115 contacts the third frustum surface 116 and the second through hole 112.

The first frustum surface 114 is disposed on the image side of the first through hole 111, extends from the first through hole 111 to the second through hole 112 in a direction away from the optical axis X, and the first frustum surface 114 can be a non-vertical cylindrical surface. The second frustum surface 115 is disposed on an object side of the second through hole 112 and extends from the second through hole 112 to the first through hole 111 in the direction away from the optical axis X. Specifically, the first frustum surface 114 and the second frustum surface 115 gradually taper in the direction away from the optical axis X and form a light trap structure (its reference numeral is omitted). The third frustum surface 116 is disposed on an image side of the second through hole 112, extends from the second through hole 112 in a direction away from the first through hole 111 and in the direction away from the optical axis X, and the second frustum surface 115 and the third frustum surface 116 gradually taper towards the second through hole 112. Hence, it is favorable for improving an exact image quality closer to an ideal design and decreasing a generation of the stray light, and the third frustum surface 116 can be configured to improve a formability of the annular structure 110. Moreover, cross sections of the second frustum surface 115 and the third frustum surface 116 can be arc lines or slash lines, the second frustum surface 115 and the third frustum surface 116 can include convex structures or concave structures, and the present disclosure is not limited thereto.

Figure 1E:
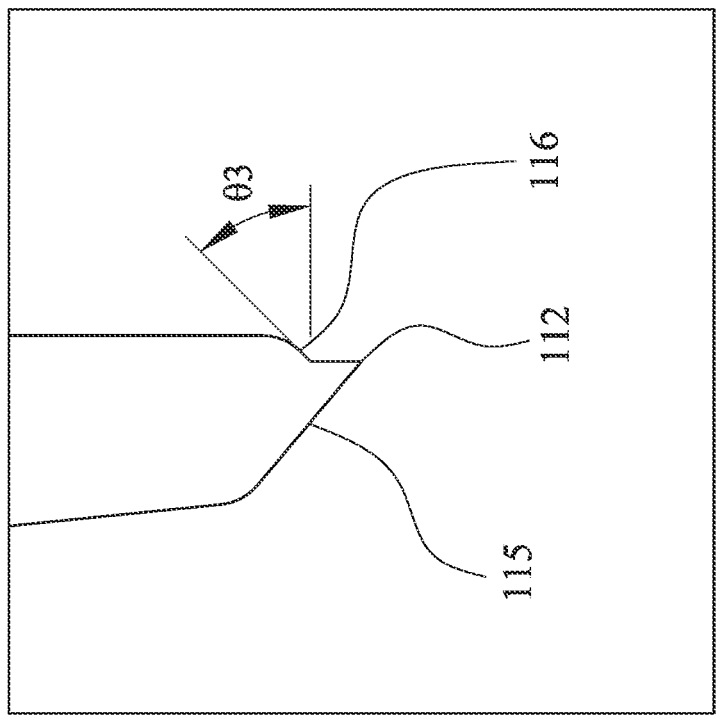
FIG. 1E is another schematic view of the second through hole, the second frustum surface and the third frustum surface according to the 1st embodiment in FIG. 1A.
Figure 1D:
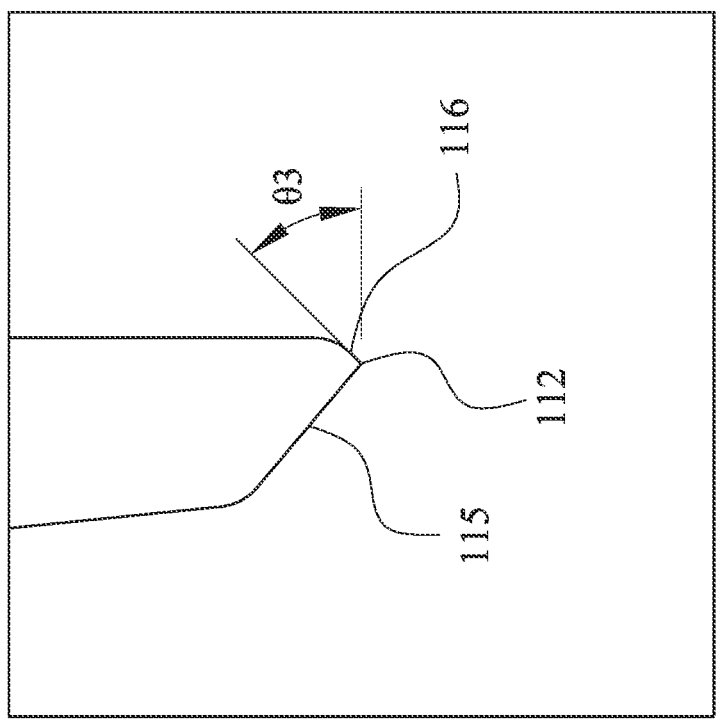
FIG. 1D is another schematic view of the second through hole, the second frustum surface and the third frustum surface according to the 1st embodiment in FIG. 1A.
Figure 1F:
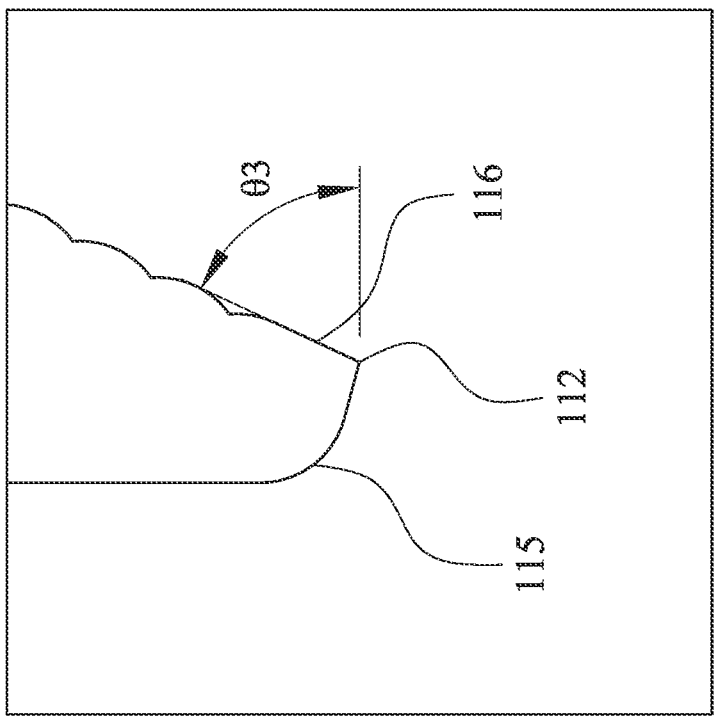
FIG. 1F is another schematic view of the second through hole, the second frustum surface, and the third frustum surface according to the 1st embodiment in FIG. 1A.
Figure 1G:
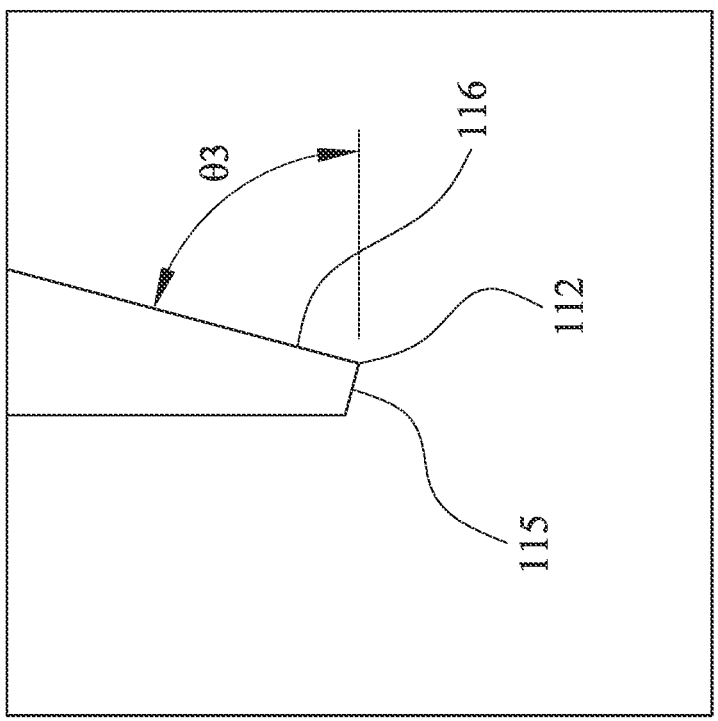
FIG. 1G is another schematic view of the second through hole, the second frustum surface and the third frustum surface according to the 1st embodiment in FIG. 1A.
Figure 1I:
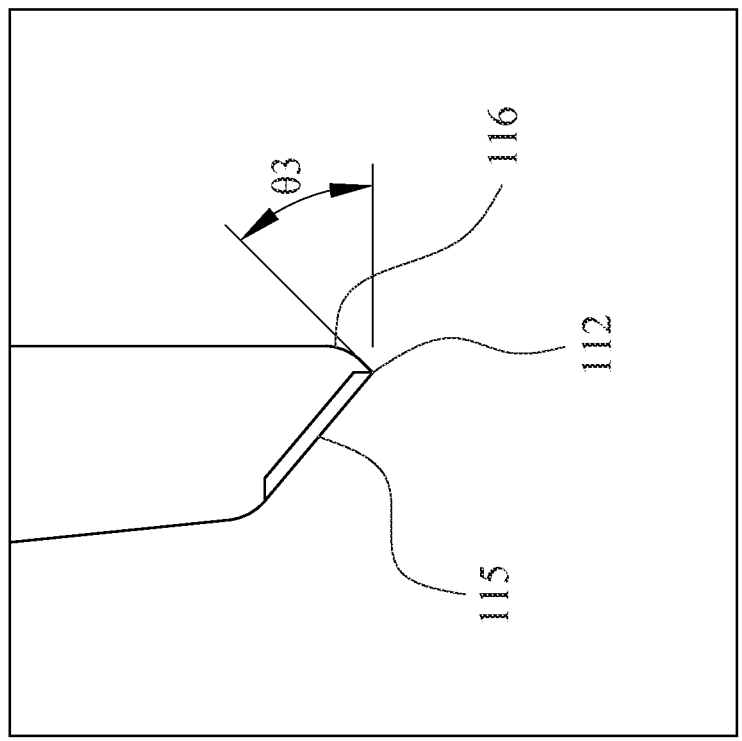
FIG. 1I is another schematic view of the second through hole, the second frustum surface and the third frustum surface according to the 1st embodiment in FIG. 1A.
Figure 1H:
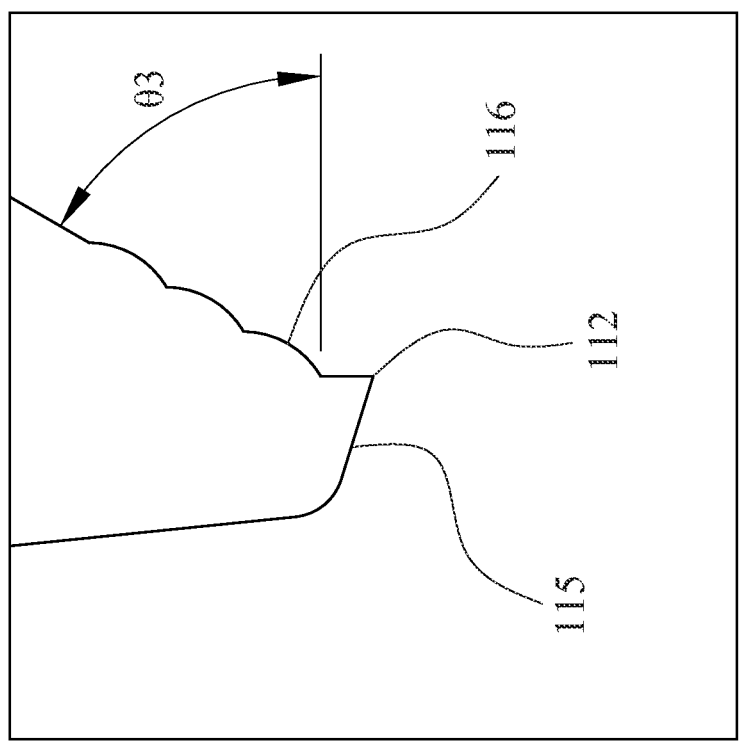
FIG. 1H is another schematic view of the second through hole, the second frustum surface and the third frustum surface according to the 1st embodiment in FIG. 1A.

FIG. 1D is another schematic view of the second through hole 112, the second frustum surface 115 and the third frustum surface 116 according to the 1st embodiment in FIG. 1A. FIG. 1E is another schematic view of the second through hole 112, the second frustum surface 115 and the third frustum surface 116 according to the 1st embodiment in FIG. 1A. FIG. 1F is another schematic view of the second through hole 112, the second frustum surface 115 and the third frustum surface 116 according to the 1st embodiment in FIG. 1A. FIG. 1G is another schematic view of the second through hole 112, the second frustum surface 115 and the third frustum surface 116 according to the 1st embodiment in FIG. 1A. FIG. 1H is another schematic view of the second through hole 112, the second frustum surface 115 and the third frustum surface 116 according to the 1st embodiment in FIG. 1A. FIG. 1I is another schematic view of the second through hole 112, the second frustum surface 115 and the third frustum surface 116 according to the 1st embodiment in FIG. 1A. Furthermore, in the 1st embodiment, the second through hole 112, the second frustum surface 115 and the third frustum surface 116 can be manufactured via injection molding so as to fulfill a need of mass production. Shapes of the second through hole 112, the second frustum surface 115 and the third frustum surface 116 can be as illustrated in FIGS. 1D to 1I, wherein an angle between the third frustum surface 116 and the optical axis X is θ3, and θ3 can be different in FIGS. 1D to 1I. Specifically, θ3 in FIG. 1D, FIG. 1E and FIG. 1I is 45 degrees, θ3 in FIG. 1F is 75 degrees, θ3 in FIG. 1G is 65 degrees, θ3 in FIG. 1H is 60 degrees, but the present disclosure is not limited to the abovementioned combination and data.

Figure 1J:
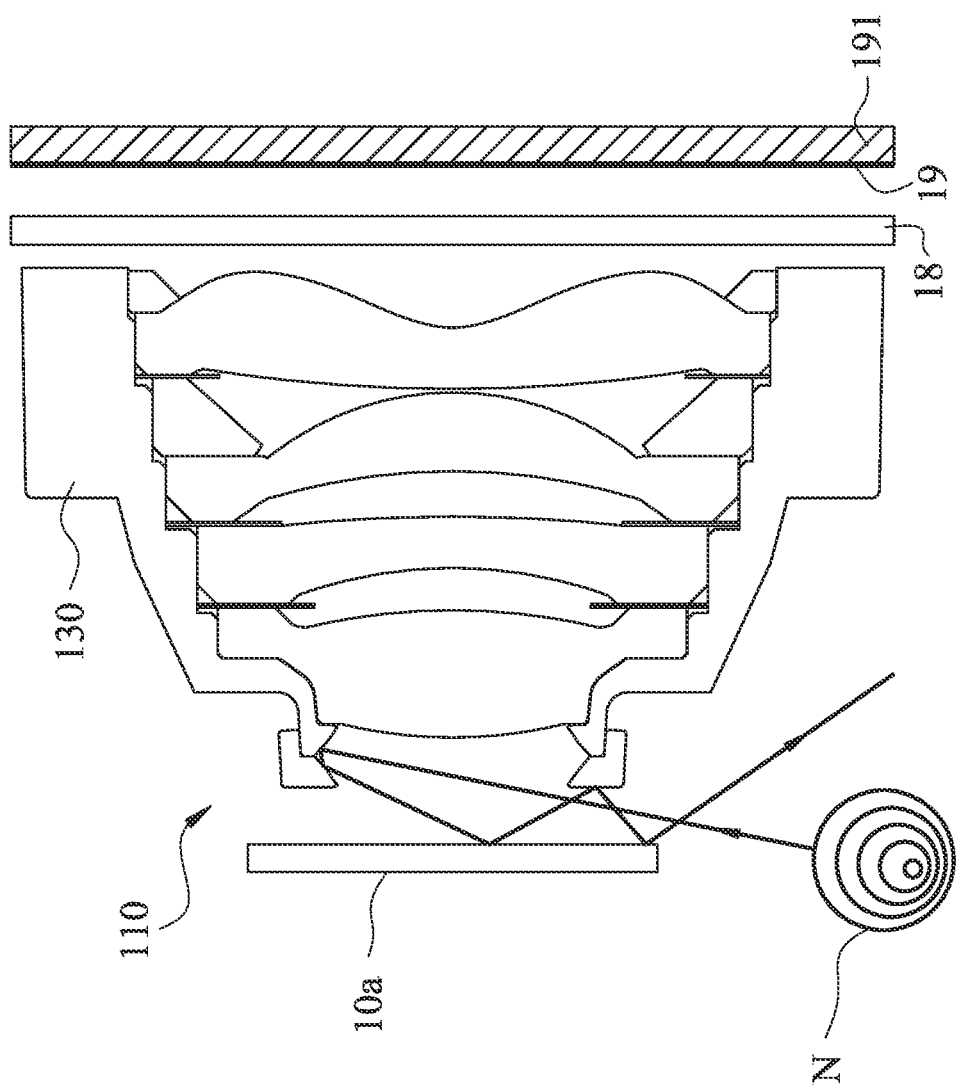
FIG. 1J is a schematic view of a reflection path of a non-imaging light according to the 1st embodiment in FIG. 1A.

FIG. 1J is a schematic view of a reflection path of a non-imaging light N according to the 1st embodiment in FIG. 1A. In FIG. 1J, when the non-imaging light N goes into the electronic device 10, the non-imaging light N first arrives at the second frustum surface 115, then reflects to the first frustum surface 114, then reflects to a transparent platform 10a, then reflects to the front cover 120, and finally reflects to the transparent platform 10a and leaves the electronic device 10. The non-imaging light N does not go into the image surface 19. Specifically, when the non-imaging light goes into the electronic device 10, the light trap structure can decrease an intensity of the non-imaging light or change the reflection path thereof in multiple reflections. Hence, the light trap structure can intercept most of the non-imaging light N and improves the image quality, but the present disclosure is not limited to the abovementioned reflection path.

In FIG. 1C, the axial connecting structure 140 is disposed between the front cover 120 and the lens barrel 130 and includes a fourth frustum surface 141 and a fifth frustum surface 142. The fourth frustum surface 141 is disposed on the image side of the front cover 120, the fourth frustum surface 141 is farther away from the first through hole 111 than the first frustum surface 114 away from the first through hole 111, the fourth frustum surface 141 faces towards the optical axis X and extends from the image side of the front cover 120 to the lens barrel in the direction away from the optical axis X. The fifth frustum surface 142 is disposed on an object side of the lens barrel 130, the fifth frustum surface 142 is farther away from the second through hole 112 than the second frustum surface 115 away from the second through hole 112, the fifth frustum surface 142 faces towards the fourth frustum surface 141 and extends from the object side of the lens barrel 130 in a direction away from the front cover 120 and the optical axis X. Both of the fourth frustum surface 141 and the fifth frustum surface 142 can be in a form of a laying surface, the fourth frustum surface 141 contacts the fifth frustum surface 142 physically, and the front cover 120 is aligned with the lens barrel 130.

It is worth to be mentioned that all of the first frustum surface 114 of the front cover 120, the second frustum surface 115 of the lens barrel 130, the third frustum surface 116 of the lens barrel 130, the fourth frustum surface 141 of the axial connecting structure 140 and the fifth frustum surface 142 of the axial connecting structure 140 can be conical surfaces.

Figure 1K:
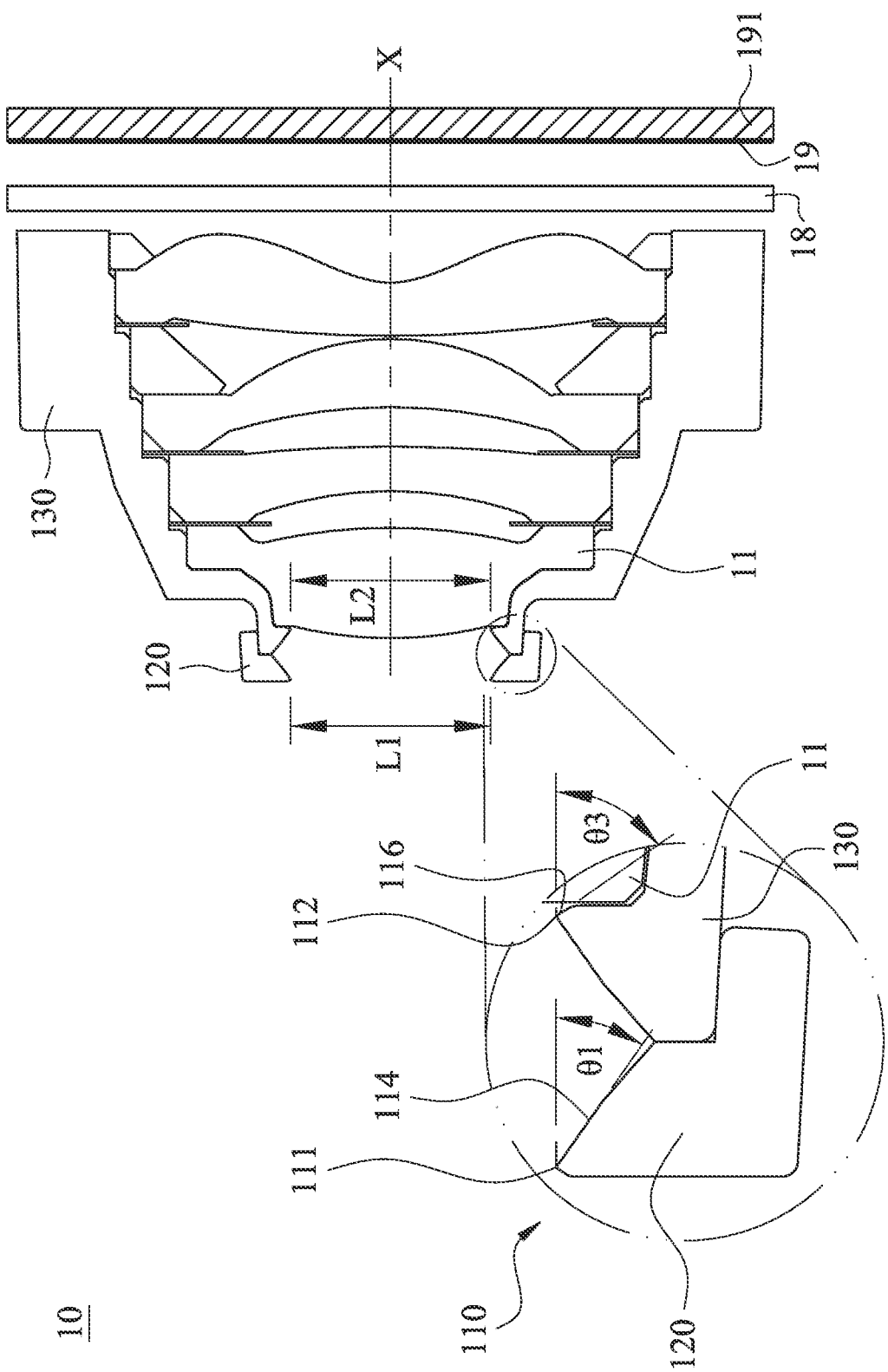
FIG. 1K is a schematic view of parameters of the electronic device according to the 1st embodiment in FIG. 1A.

FIG. 1K is a schematic view of parameters of the electronic device 10 according to the 1st embodiment in FIG. 1A. In FIG. 1K, when a diameter of the first through hole 111 is L1, a diameter of the second through hole is L2, a minimum angle between the first frustum surface 114 and the optical axis X is θ1, and an angle between the third frustum surface 116 and the optical axis X is θ3, the condition related to the parameters can be satisfied as the following Table 1.

| Table 1, the 1st embodiment | | | |
| --- | --- | --- | --- |
| L1 (mm) | 1.67 | θ1(degrees) | 35 |
| L2 (mm) | 1.67 | θ3(degrees) | 55 |

It is worth to be mentioned that L1 is equal to L2 according to the 1st embodiment.

2nd Embodiment

Figure 2A:
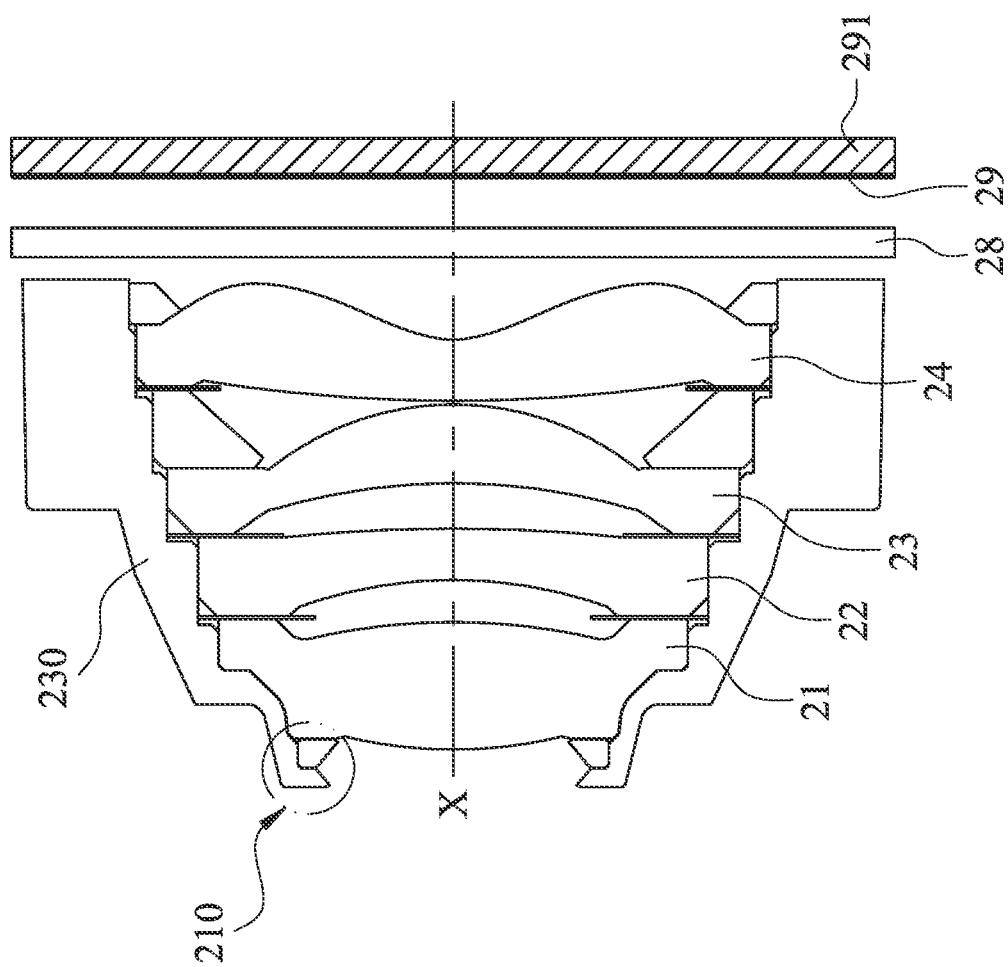
FIG. 2A is a schematic view of an electronic device according to the 2nd embodiment of the present disclosure.

FIG. 2A is a schematic view of an electronic device 20 according to the 2nd embodiment of the present disclosure. In FIG. 2A, the electronic device 20 includes at least one image capturing device (its reference numeral is omitted) and an image sensor 291, wherein the image capturing device includes an imaging lens assembly (its reference numeral is omitted) and a filter 28. The image sensor 291 is disposed on an image surface 29 of the image capturing device and the filter 28 is disposed between the imaging lens assembly and the image surface 29.

Figure 2B:
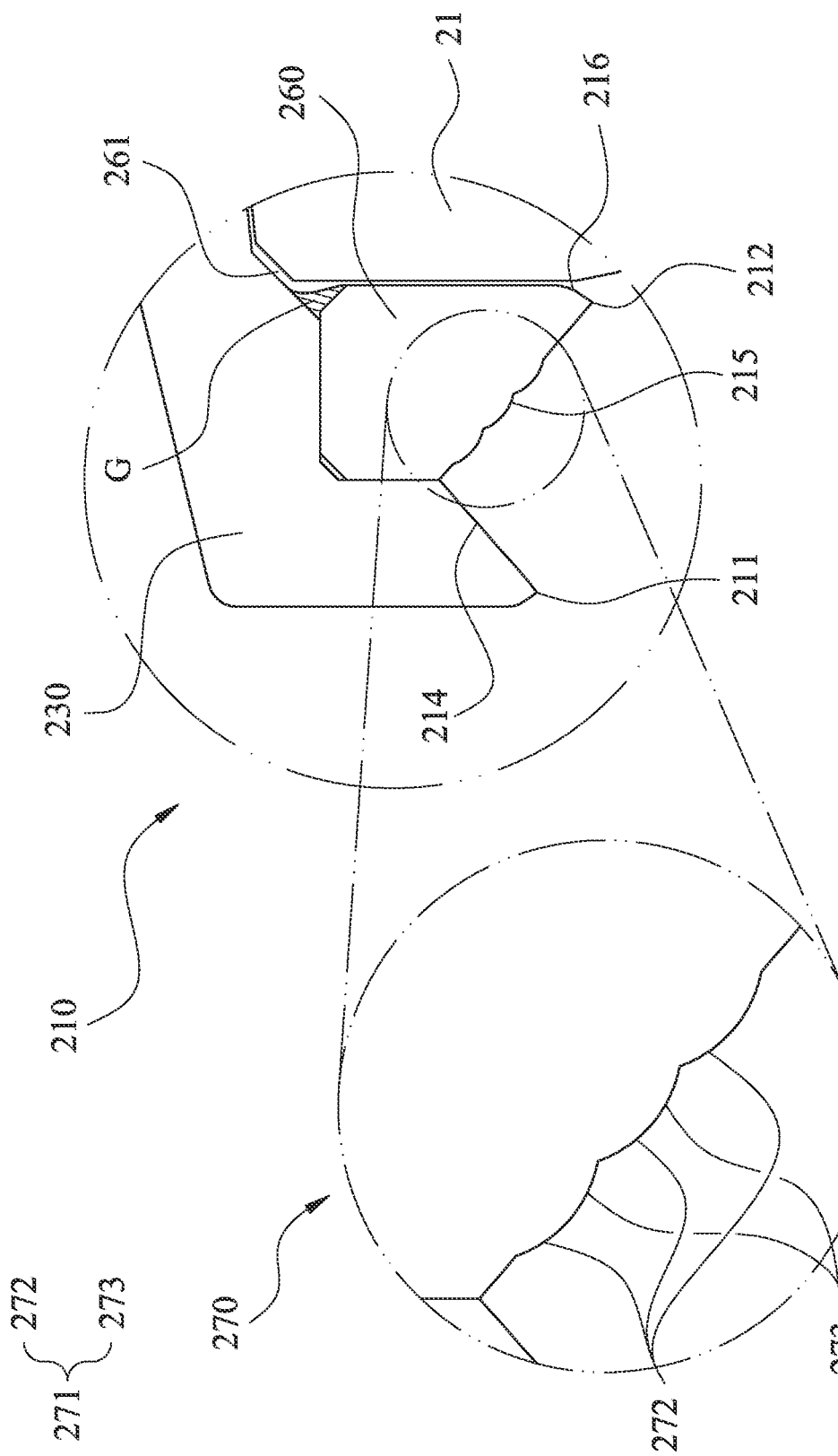
FIG. 2B is a partially enlarged view of the electronic device according to the 2nd embodiment in FIG. 2A.
Figure 2C:
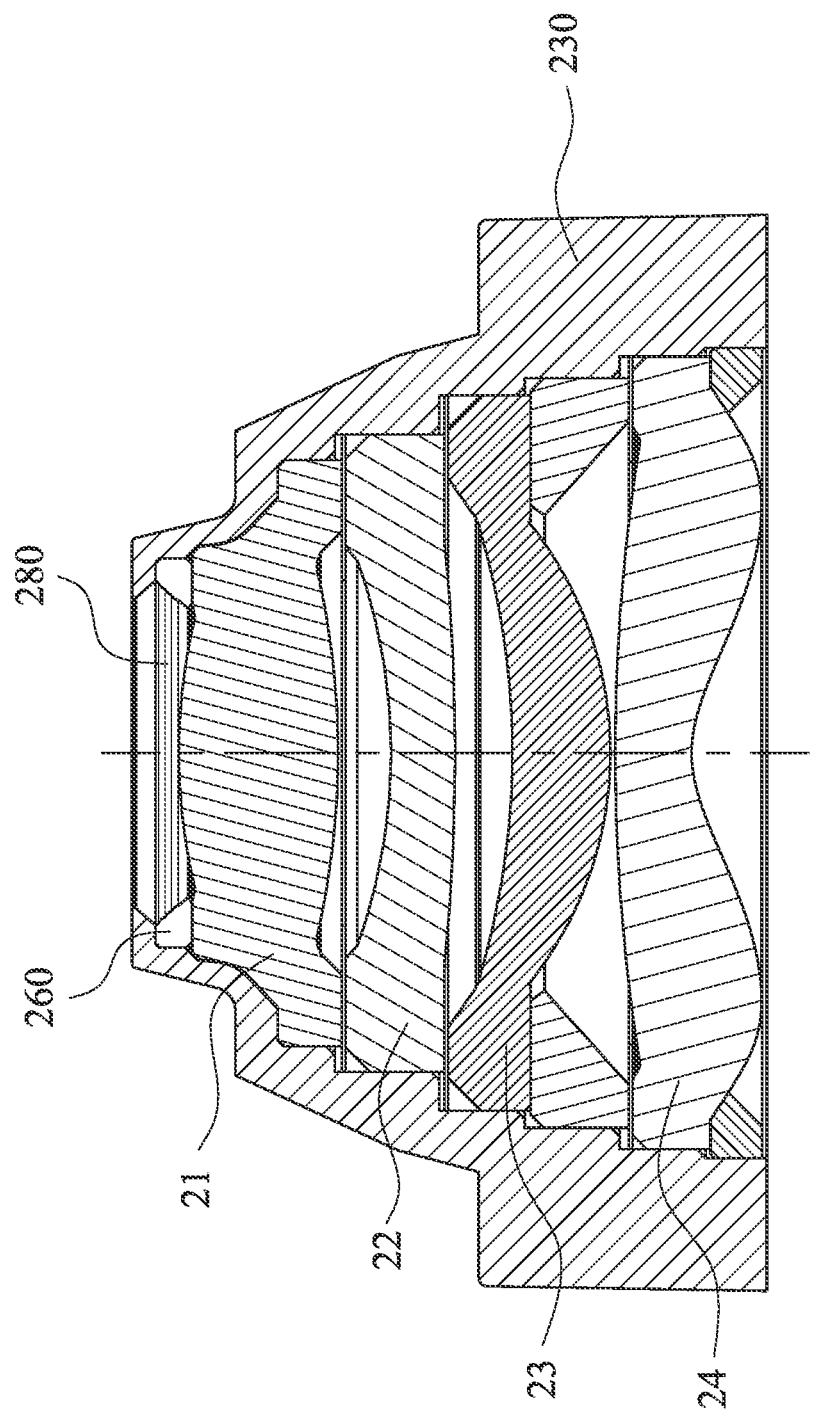
FIG. 2C is a schematic view of the image capturing device according to the 2nd embodiment in FIG. 2A.
Figure 2D:
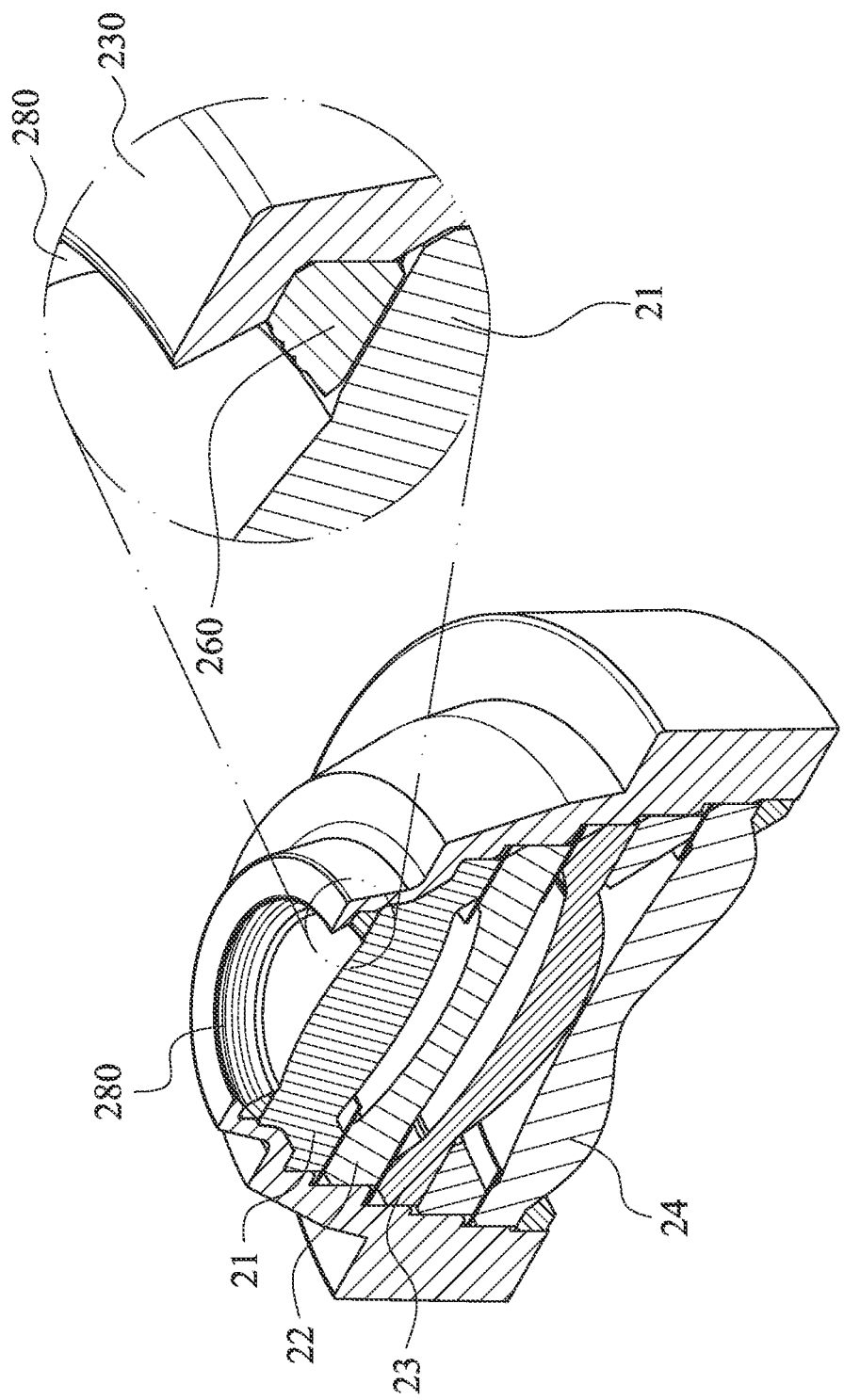
FIG. 2D is a cross-sectional view of the image capturing device according to the 2nd embodiment in FIG. 2C.
Figure 2E:
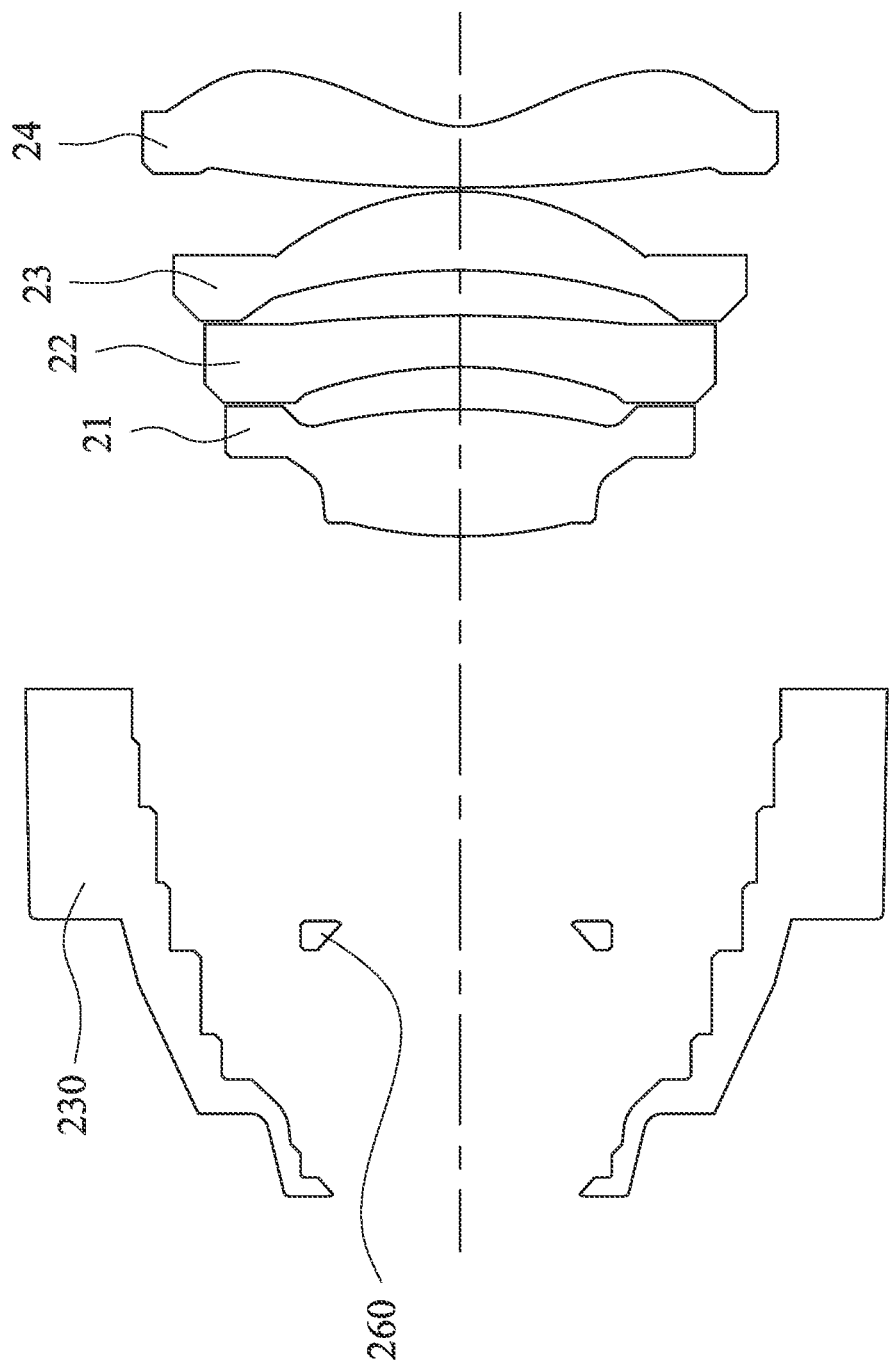
FIG. 2E is a partially exploded view of the image capturing device according to the 2nd embodiment in FIG. 2A.

FIG. 2B is a partially enlarged view of the electronic device 20 according to the 2nd embodiment in FIG. 2A. FIG. 2C is a schematic view of the image capturing device according to the 2nd embodiment in FIG. 2A. FIG. 2D is a cross-sectional view of the image capturing device according to the 2nd embodiment in FIG. 2C. FIG. 2E is a partially exploded view of the image capturing device according to the 2nd embodiment in FIG. 2A. In FIGS. 2A to 2E, the imaging lens assembly has an optical axis X and includes an annular structure 210, a lens barrel 230, a ring element 260, a first lens element 21 and at least two lens elements.

In the 2nd embodiment, the imaging lens assembly in order from an object side to an image side includes the first lens element 21 and lens elements 22, 23, 24, wherein all of the first lens element 21 and the lens elements 22, 23, 24 are disposed on an image side of the annular structure 210, and the first lens element 21 is a closest lens element of the imaging lens assembly to the object side. Furthermore, all of the first lens element 21 and the lens elements 22, 23, 24 have refractive power, wherein optical characteristics of the lens elements such as a number, a structure, a surface shape and so on can be utilized, other optical elements can be further disposed according to different imaging requirements, and the present disclosure is not limited thereto.

Figure 2F:
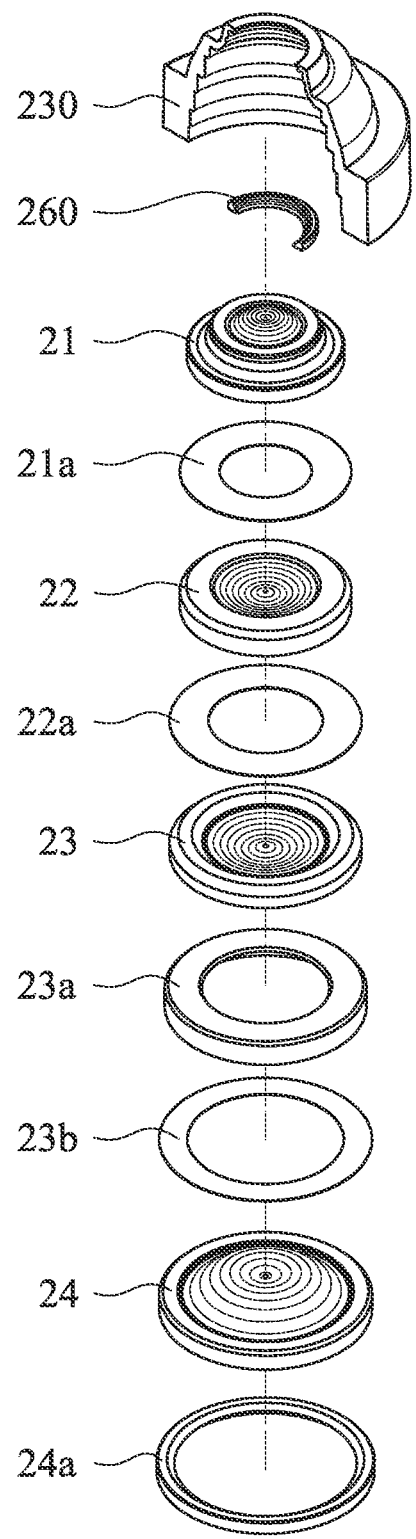
FIG. 2F is an exploded view of the image capturing device according to the 2nd embodiment in FIG. 2C.
Figure 2G:
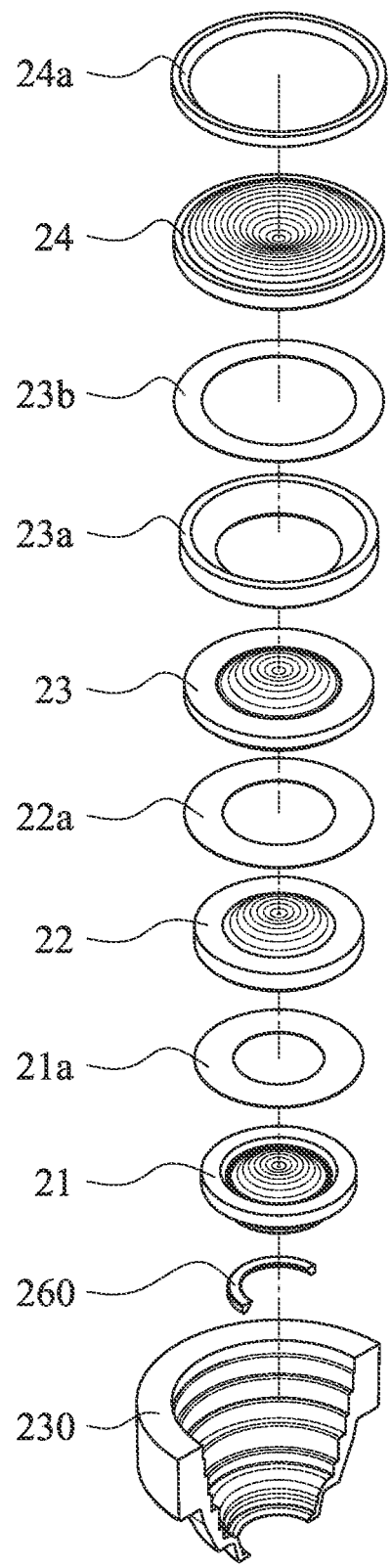
FIG. 2G is another exploded view of the image capturing device according to the 2nd embodiment in FIG. 2C.

In detail, FIG. 2F is an exploded view of the image capturing device according to the 2nd embodiment in FIG. 2C. FIG. 2G is another exploded view of the image capturing device according to the 2nd embodiment in FIG. 2C. In FIG. 2F and FIG. 2G, the imaging lens assembly in order from the object side to image side includes the lens barrel 230, the ring element 260, the first lens element 21, a light blocking sheet 21a, the lens element 22, a light blocking sheet 22a, the lens element 23, a spacer 23a, a light blocking sheet 23b, the lens element 24 and a pressure ring 24a.

In FIG. 2B, the annular structure 210 is located on an object side of the imaging lens assembly, surrounds the optical axis X, and is composed of the lens barrel 230 and the ring element 260. The lens barrel 230 includes a first through hole 211 and a first frustum surface 214, the ring element 260 includes a second through hole 212, a second frustum surface 215 and a third frustum surface 216, and the lens barrel 230 surrounds the optical axis X and forms a containing space 261. The ring element 260 is disposed on an object side of the containing space 261 and contacts the lens barrel 230 physically. Hence, it is favorable for enhancing a feasibility of manufacturing and improving a process of assembling. Moreover, a glue G can be disposed in the containing space 261 and the coherence between the lens barrel 230 and the ring element 260 can be fixed via the glue G.

The first through hole 211 is disposed on an object side of the annular structure 210, and the optical axis X passes through the first through hole 211. The second through hole 212 is disposed on an image side of the first through hole 211, the optical axis X passes through the second through hole 212, the second through hole 212 is a tip-end opening, and the second through hole 212 is a smallest opening of the annular structure 210. Specifically, the tip-end opening is a tip-end protruding towards the optical axis X, and the second frustum surface 215 contacts the third frustum surface 216 and the second through hole 212.

The first frustum surface 214 is disposed on the image side of the first through hole 211, extends from the first through hole 211 to the second through hole 212 in a direction away from the optical axis X, and the first frustum surface 214 can be a non-vertical cylindrical surface. The second frustum surface 215 is disposed on an object side of the second through hole 212 and extends from the second through hole 212 to the first through hole 211 in the direction away from the optical axis X. Specifically, the first frustum surface 214 and the second frustum surface 215 gradually taper in the direction away from the optical axis X and form a light trap structure 280. The third frustum surface 216 is disposed on an image side of the second through hole 212, extends from the second through hole 212 in a direction away from the first through hole 211 and in the direction away from the optical axis X, and the second frustum surface 215 and the third frustum surface 216 gradually taper towards the second through hole 212. Hence, it is favorable for improving an exact image quality closer to an ideal design and decreasing a generation of the stray light, and the third frustum surface 216 can be configured to improve a formability of the annular structure 210. Moreover, cross sections of the second frustum surface 215 and the third frustum surface 216 can be arc lines or slash lines, the second frustum surface 215 and the third frustum surface 216 can include convex structures or concave structures, but the present disclosure is not limited thereto.

Moreover, shapes of the second through hole 212, the second frustum surface 215 and the third frustum surface 216 of the 2nd embodiment can be as illustrated in FIGS. 1D to 1I, but the present disclosure is not limited thereto. It is worth to be mentioned that a reflection path of a non-imaging light (not shown) according to the 2nd embodiment can refer to FIG. 1J, but the present disclosure is not limited thereto.

It is worth to be mentioned that all of the first frustum surface 214 of the lens barrel 230, the second frustum surface 215 of the ring element 260 and the third frustum surface 216 of the ring element 260 can be conical surfaces.

In FIG. 2B, at least one of the first frustum surface 214 and the second frustum surface 215 includes a concentric circle structure 270. In the 2nd embodiment, the second frustum surface 215 includes the concentric circle structure 270. The concentric circle structure 270 surrounds the optical axis X and is opaque. The concentric circle 270 is not configured to image. Hence, it is favorable for further improving the effect of the light trap structure 280. Specifically, the concentric circle structure 270 includes a plurality of convex structures 271. Each of the convex structures 271 include a plurality of arc torus surfaces 272 and a plurality of connecting surfaces 273, wherein the art torus surfaces 272 have the same curving direction and are arranged along the second frustum surface 215, and the connecting surfaces 273 connect the two adjacent art torus surfaces 272. It is worth to be mentioned that the convex structures 271 can be arc-shaped convex, but the present disclosure is not limited thereto.

Figure 2H:
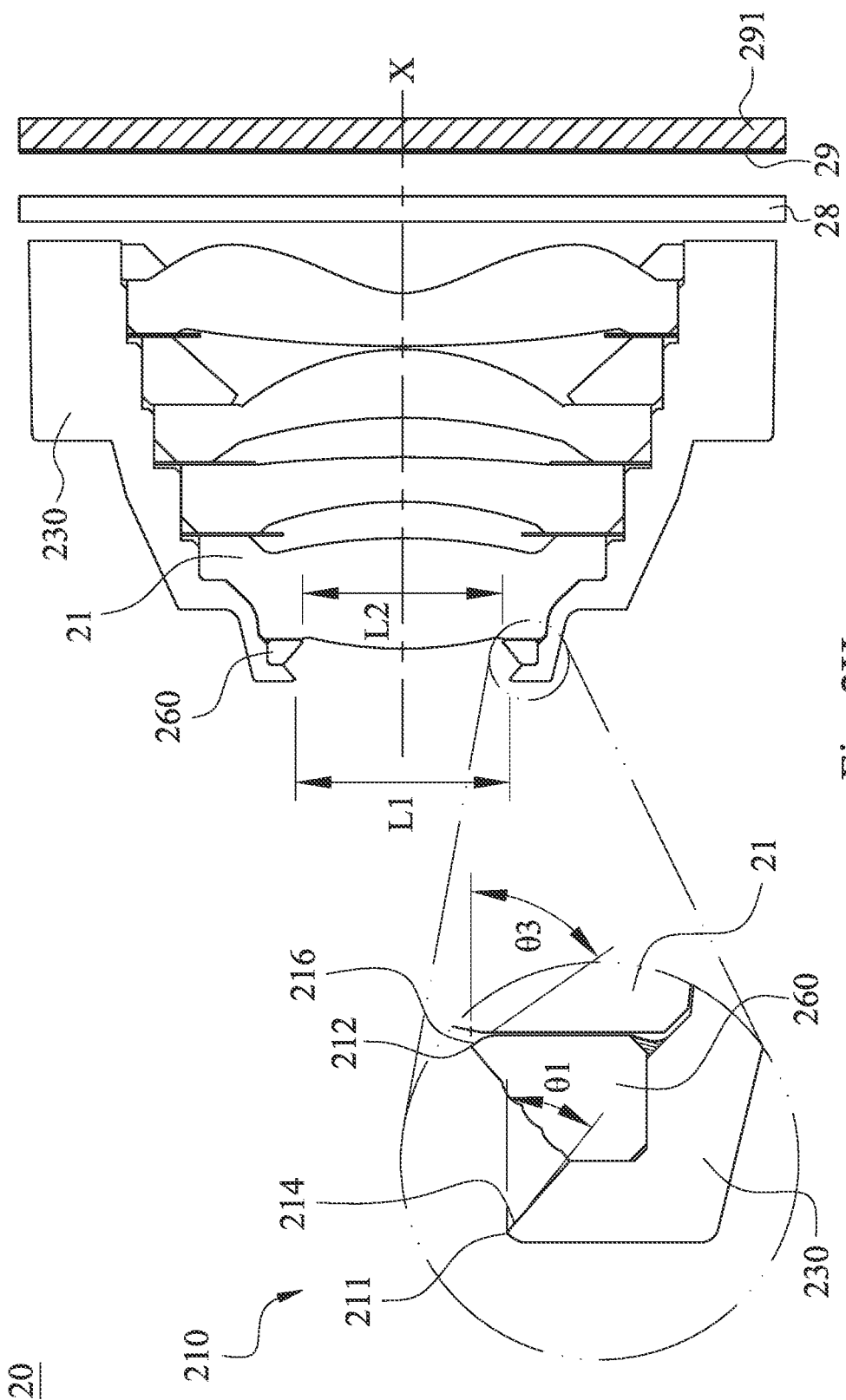
FIG. 2H is a schematic view of parameters of the electronic device according to the 2nd embodiment in FIG. 2A.

FIG. 2H is a schematic view of parameters of the electronic device 20 according to the 2nd embodiment in FIG. 2A. In FIG. 2H, when a diameter of the first through hole 211 is L1, a diameter of the second through 212 hole is L2, a minimum angle between the first frustum surface 214 and the optical axis X is θ1, an angle between the third frustum surface 216 and the optical axis X is θ3, the condition related to the parameters can be satisfied as the following Table 2.

| Table 2, the 2nd embodiment | | | |
|---|---|---|---|
| L1 (mm) | 1.79 | θ1(degrees) | 35 |
| L2 (mm) | 1.67 | θ3(degrees) | 55 |

3rd Embodiment

Figure 3A:
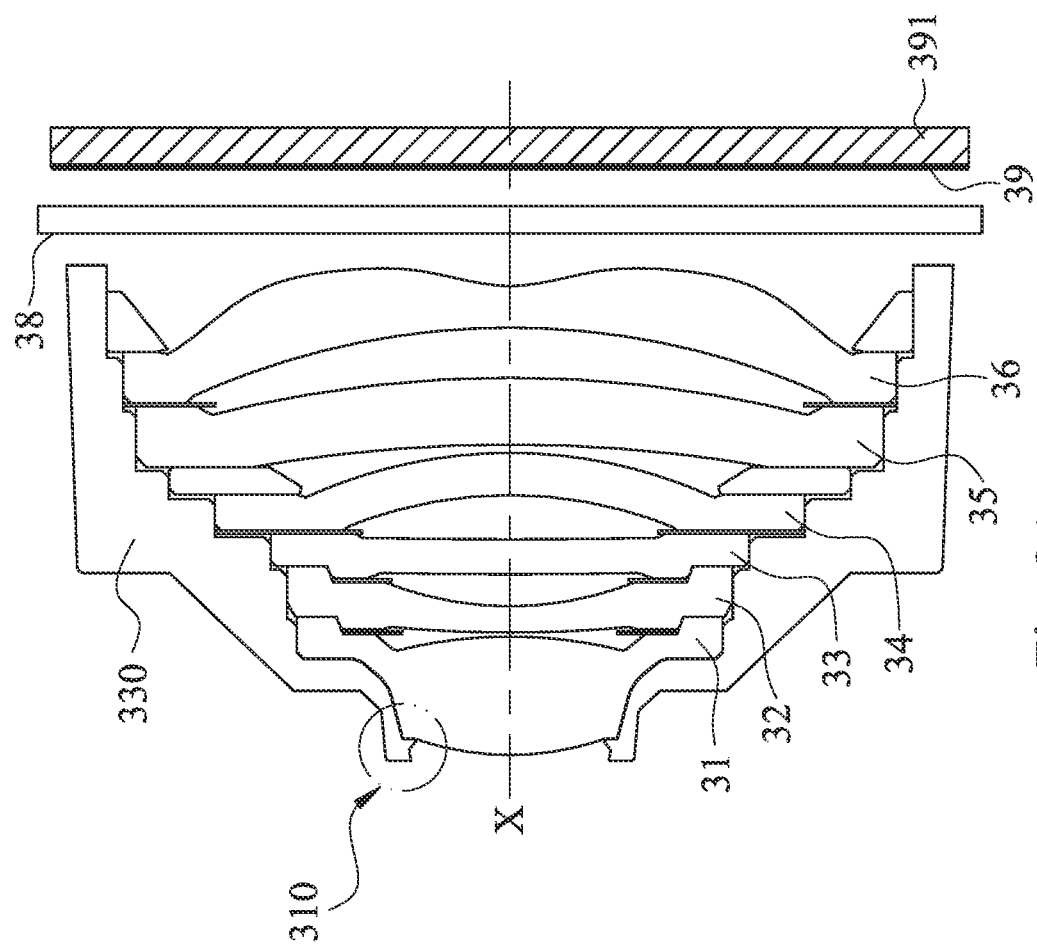
FIG. 3A is a schematic view of an electronic device according to the 3rd embodiment of the present disclosure.

FIG. 3A is a schematic view of an electronic device 30 according to the 3rd embodiment of the present disclosure. In FIG. 3A, the electronic device 30 includes at least one image capturing device (its reference numeral is omitted) and an image sensor 391, wherein the image capturing device includes an imaging lens assembly (its reference numeral is omitted) and a filter 38. The image sensor 391 is disposed on an image surface 39 of the image capturing device, and the filter 38 is disposed between the imaging lens assembly and the image surface 39.

Figure 3B:
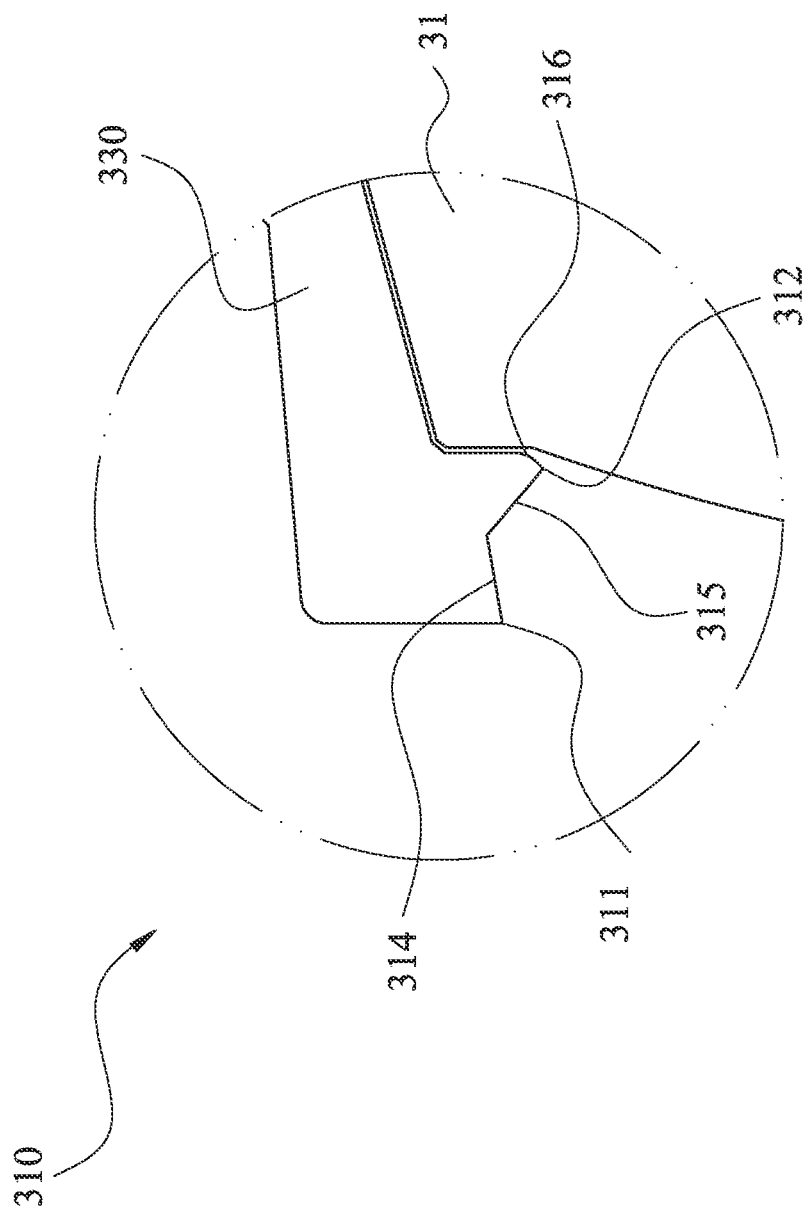
FIG. 3B is a partially enlarged view of the electronic device according to the 3rd embodiment in FIG. 3A.
Figure 3C:
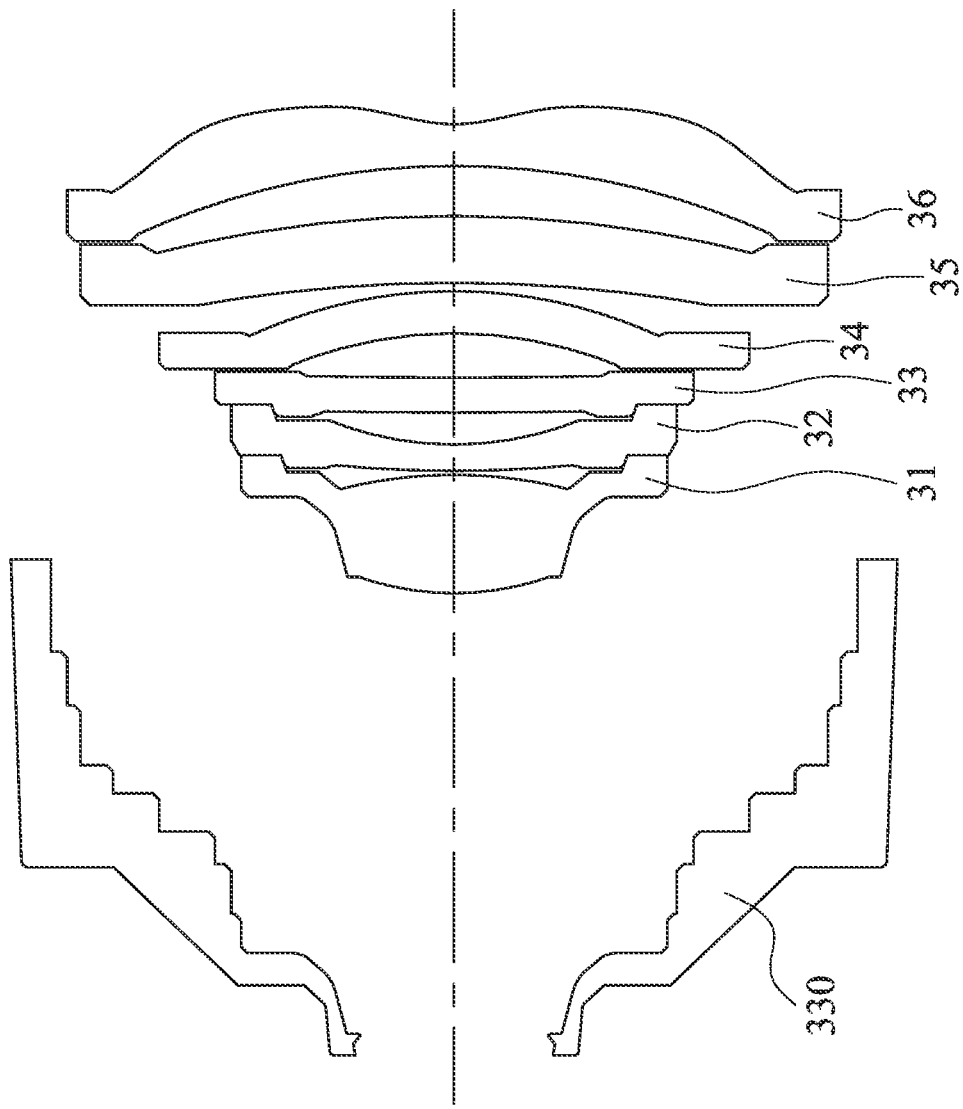
FIG. 3C is a partially exploded view of the image capturing device according to the 3rd embodiment in FIG. 3A.

FIG. 3B is a partially enlarged view of the electronic device 30 according to the 3rd embodiment in FIG. 3A. FIG. 3C is a partially exploded view of the image capturing device according to the 3rd embodiment in FIG. 3A. In FIG. 3A to FIG. 3C, the imaging lens assembly has an optical axis X and includes an annular structure 310, a lens barrel 330, a first lens element 31 and at least two lens elements.

In the 3rd embodiment, the imaging lens assembly in order from an object side to an image side includes the first lens element 31 and lens elements 32, 33, 34, 35, 36, wherein all of the first lens element 31 and the lens elements 32, 33, 34, 35, 36 are disposed on an image side of the annular structure 310, and the first lens element 31 is a closest lens element of the imaging lens assembly to the object side. Furthermore, all of the first lens element 31 and the lens elements 32, 33, 34, 35, 36 have refractive power, wherein optical characteristics of the lens elements such as a number, a structure, a surface shape and so on can be utilized, other optical elements can be further disposed according to different imaging requirements, and the present disclosure is not limited thereto.

In FIG. 3B, the annular structure 310 is located on an object side of the imaging lens assembly, surrounds the optical axis X, and the annular structure 310 includes a first through hole 311, a second through hole 312, a first frustum surface 314, a second frustum surface 315, and a third frustum surface 316. Furthermore, the first through hole 311, the second through hole 312, the first frustum surface 314, the second frustum surface 315 and the third frustum surface 316 are integrally formed, and the annular structure 310 can be integrally formed via injection molding with elastic demolding. Hence, it is favorable for decreasing a space for strapping and assembling and is favorable for reducing a volume of the imaging lens assembly.

The first through hole 311 is disposed on an object side of the annular structure 310, and the optical axis X passes through the first through hole 311. The second through hole 312 is disposed on an image side of the first through hole 311, the optical axis X passes through the second through hole 312, the second through hole 312 is a tip-end opening, and the second through hole 312 is a smallest opening of the annular structure 310. Specifically, the tip-end opening is a tip-end protruding towards the optical axis X, and the second frustum surface 315 contacts the third frustum surface 316 and the second through hole 312.

The first frustum surface 314 is disposed on the image side of the first through hole 311, extends from the first through hole 311 to the second through hole 312 in a direction away from the optical axis X, and the first frustum surface 314 can be a non-vertical cylindrical surface. The second frustum surface 315 is disposed on an object side of the second through hole 312 and extends from the second through hole 312 to the first through hole 311 in the direction away from the optical axis X. Specifically, the first frustum surface 314 and the second frustum surface 315 gradually taper in the direction away from the optical axis X and form a light trap structure (its reference numeral is omitted). The third frustum surface 316 is disposed on an image side of the second through hole 312, extends from the second through hole 312 in a direction away from the first through hole 311 and in the direction away from the optical axis X, and the second frustum surface 315 and the third frustum surface 316 gradually taper towards the second through hole 312. Hence, it is favorable for improving an exact image quality closer to an ideal design and decreasing a generation of the stray light, and the third frustum surface 316 can be configured to improve a formability of the annular structure 310. Moreover, cross sections of the second frustum surface 315 and the third frustum surface 316 can be arc lines or slash lines, the second frustum surface 315 and the third frustum surface 316 can include convex structures or concave structures, but the present disclosure is not limited thereto.

Shapes of the second through hole 312, the second frustum surface 315 and the third frustum surface 316 of the 3rd embodiment can be as illustrated in FIGS. 1D to 1I, but the present disclosure is not limited thereto. Further, a reflection path of a non-imaging light (its reference numeral is omitted) according to the 3rd embodiment can refer to FIG. 1J, but the present disclosure is not limited thereto.

It is worth to be mentioned that all of the first frustum surface 314 of the annular structure 310, the second frustum surface 315 thereof and the third frustum surface 316 thereof are conical surfaces.

Figure 3D:
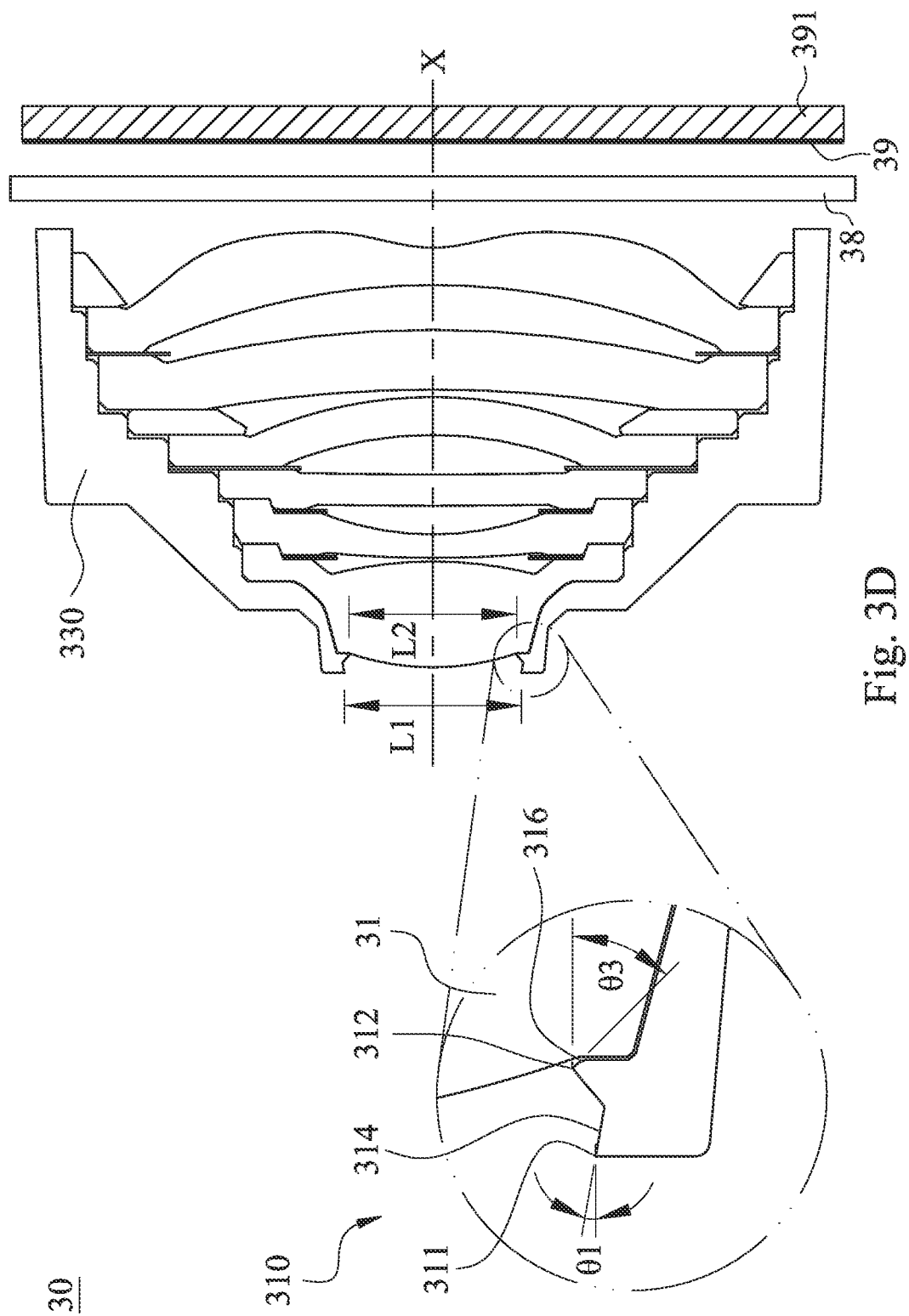
FIG. 3D is a schematic view of parameters of the electronic device according to the 3rd embodiment in FIG. 3A.

FIG. 3D is a schematic view of parameters of the electronic device 30 according to the 3rd embodiment in FIG. 3A. In FIG. 3D, when a diameter of the first through hole 311 is L1, a diameter of the second through hole 312 is L2, a minimum angle between the first frustum surface 314 and the optical axis X is θ1, an angle between the third frustum surface 316 and the optical axis X is θ3, the condition related to the parameters can be satisfied as the following Table 3.

| Table 3, the 3rd embodiment | | | |
|---|---|---|---|
| L1 (mm) | 1.51 | θ1(degrees) | 10 |
| L2 (mm) | 1.43 | θ3(degrees) | 45 |

It is worth to be mentioned that 61 is an elastic demolding angle according to the 3rd embodiment.

4th Embodiment

Figure 4A:
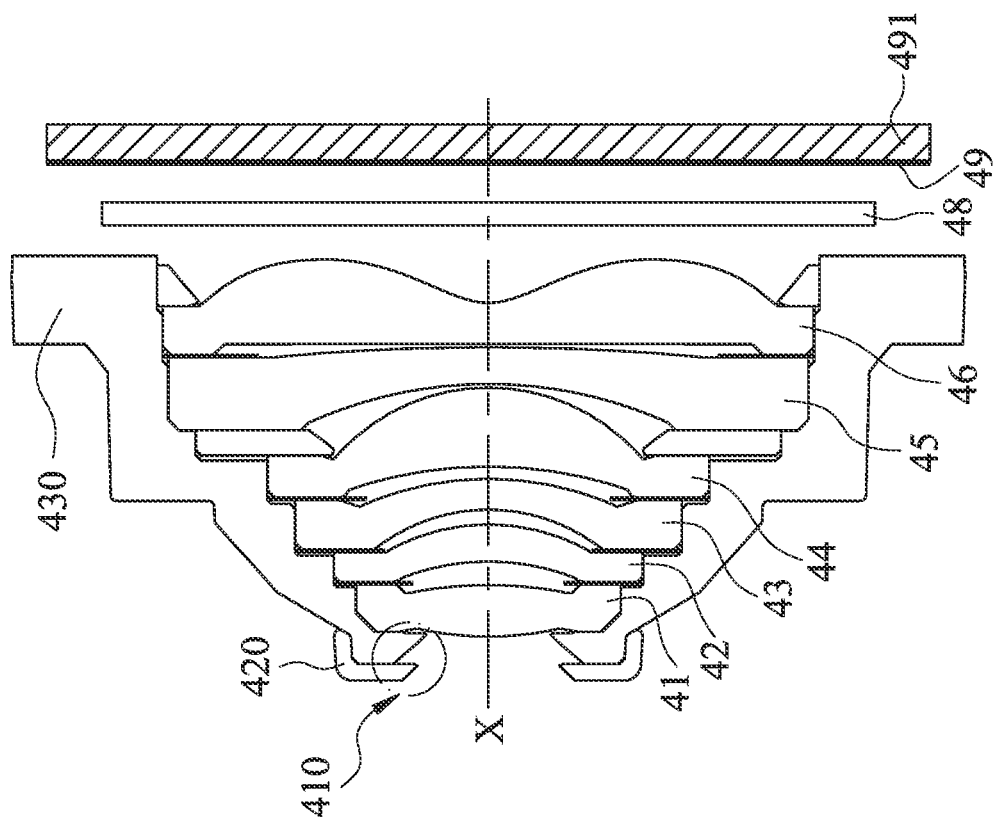
FIG. 4A is a schematic view of an electronic device according to the 4th embodiment of the present disclosure.

FIG. 4A is a schematic view of an electronic device 40 according to the 4th embodiment of the present disclosure. In FIG. 4A, the electronic device 40 includes at least one image capturing device (its reference numeral is omitted) and an image sensor 491, wherein the image capturing device includes an imaging lens assembly (its reference numeral is omitted) and a filter 48. The image sensor 491 is disposed on an image surface 49 of the image capturing device, and the filter 48 is disposed between the imaging lens assembly and the image surface 49.

Figure 4B:
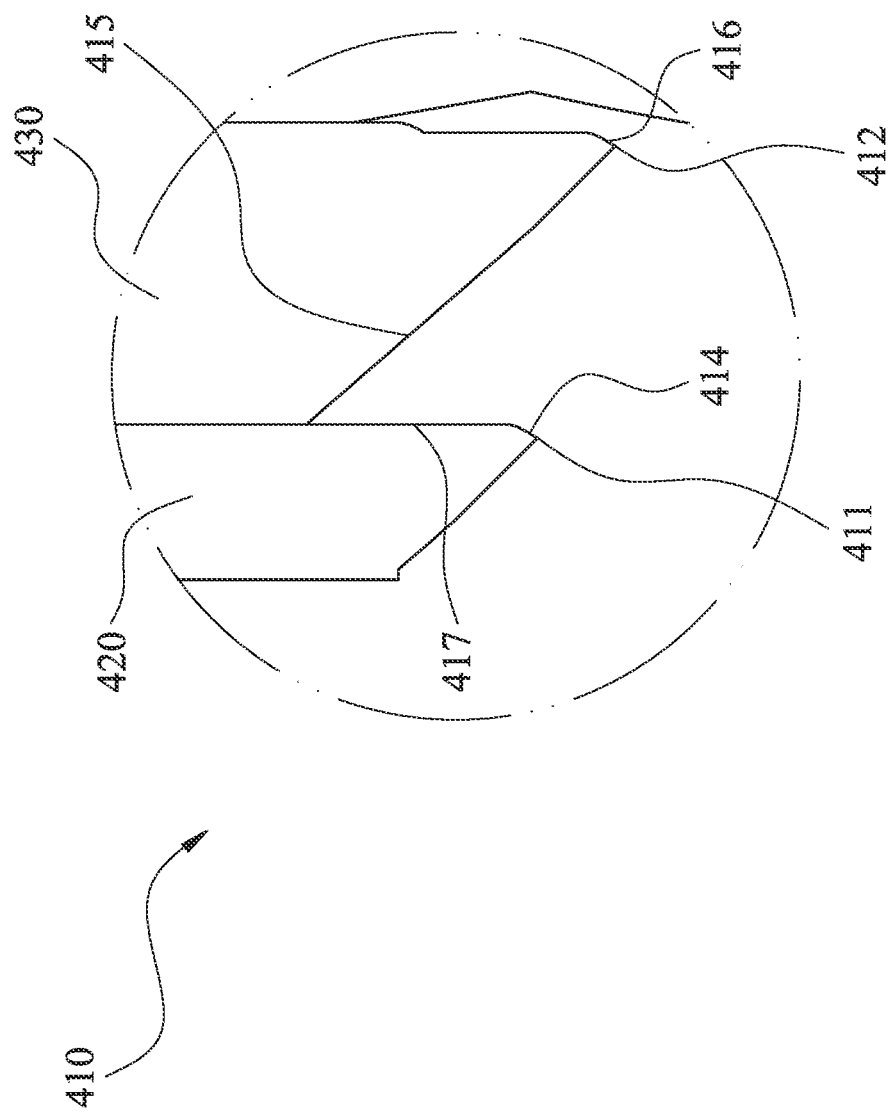
FIG. 4B is a partially enlarged view of the electronic device according to the 4th embodiment in FIG. 4A.
Figure 4C:
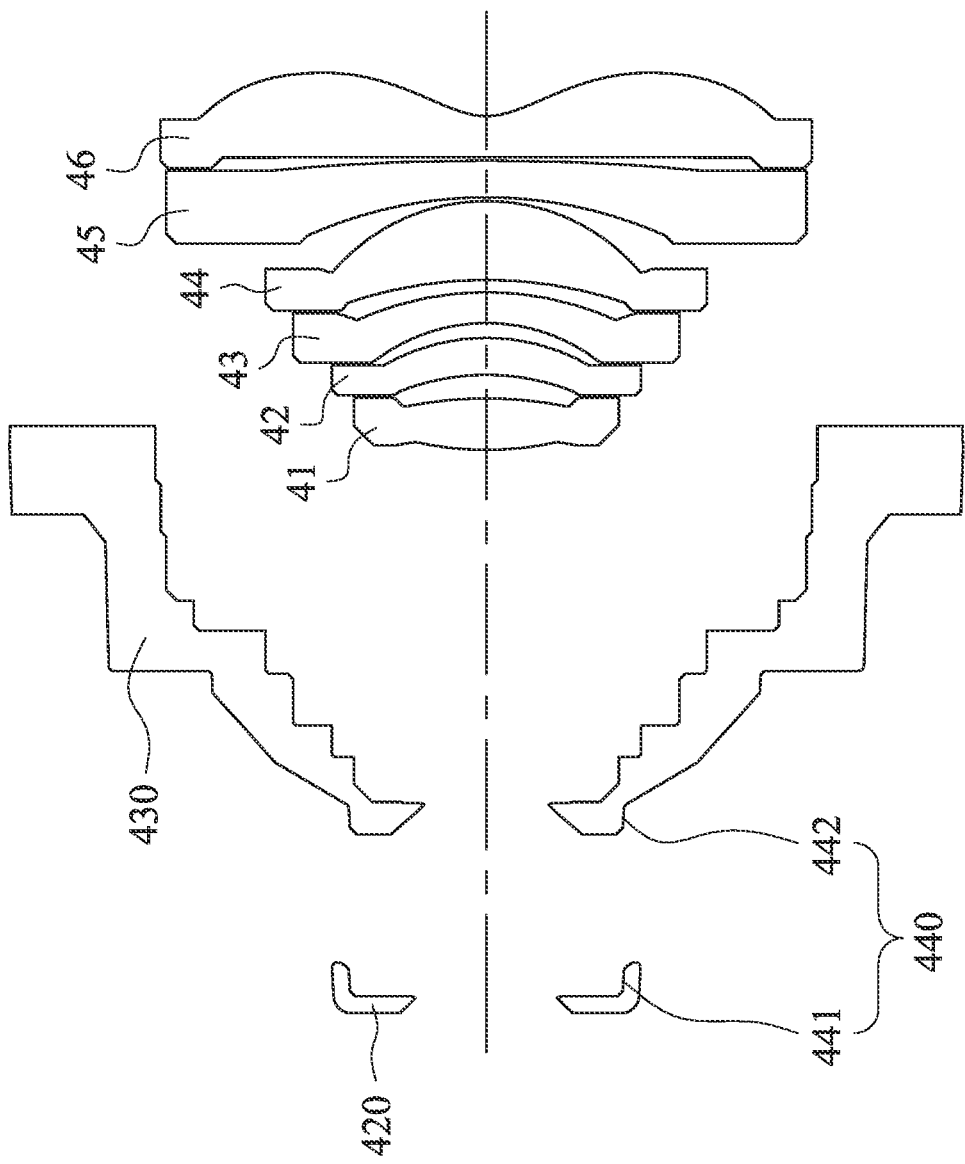
FIG. 4C is a partially exploded view of the image capturing device according to the 4th embodiment in FIG. 4A.

FIG. 4B is a partially enlarged view of the electronic device 40 according to the 4th embodiment in FIG. 4A, and FIG. 4C is a partially exploded view of the image capturing device according to the 4th embodiment in FIG. 4A. In FIGS. 4A to 4C, the imaging lens assembly has an optical axis X and includes an annular structure 410, a front cover 420, a lens barrel 430, an axial connecting structure 440, a first lens element 41 and at least two lens elements.

In the 4th embodiment, the imaging lens assembly in order from an object side to an image side includes the first lens element 41 and lens elements 42, 43, 44, 45, 46, wherein all of the first lens element 41 and the lens elements 42, 43, 44, 45, 46 are disposed on an image side of the annular structure 410, and the first lens element 41 is a closest lens element of the imaging lens assembly to the object side. Furthermore, all of the first lens element 41 and the lens elements 42, 43, 44, 45, 46 have refractive power, wherein optical characteristics of the lens elements such as a number, a structure, a surface shape and so on can be utilized, other optical elements can be further disposed according to different imaging requirements, and the present disclosure is not limited thereto.

In FIG. 4B, the annular structure 410 is located on an object side of the imaging lens assembly, surrounds the optical axis X, is composed of the front cover 420 and the lens barrel 430 and includes a first image-side surface 417. The front cover 420 includes a first through hole 411 and a first frustum surface 414, and the lens barrel 430 includes a second through hole 412, a second frustum surface 415 and a third frustum surface 416. The lens barrel 430 is located on an image side of the front cover 420. Hence, it is favorable for enhancing a feasibility of manufacturing.

The first through hole 411 is disposed on an object side of the annular structure 410, and the optical axis X passes through the first through hole 411. The second through hole 412 is disposed on an image side of the first through hole 411, the optical axis X passes through the second through hole 412, the second through hole 412 is a tip-end opening, and the second through hole 412 is a smallest opening of the annular structure 410. Specifically, the tip-end opening is a tip-end protruding towards the optical axis X, and the second frustum surface 415 contacts the third frustum surface 416 and the second through hole 412.

The first frustum surface 414 is disposed on the image side of the first through hole 411, extends from the first through hole 411 to the second through hole 412 in a direction away from the optical axis X, and the first frustum surface 414 can be a non-vertical cylindrical surface. The second frustum surface 415 is disposed on an object side of the second through hole 412 and extends from the second through hole 412 to the first through hole 411 in the direction away from the optical axis X. The first image-side surface 417 is disposed on an image-side edge of the first frustum surface 414 and extends from the image side of the first frustum surface 414 in the direction away from the optical axis X. Specifically, the first frustum surface 414 and the second frustum surface 415 gradually taper in the direction away from the optical axis X and form a light trap structure (its reference numeral is omitted). Furthermore, the first image-side surface 417 can increases a surface area of the light trap structure and then improves an effect of the light trap structure. The third frustum surface 416 is disposed on an image side of the second through hole 412, extends from the second through hole 412 in a direction away from the first through hole 411 and in the direction away from the optical axis X, and the second frustum surface 415 and the third frustum surface 416 gradually taper towards the second through hole 412. Hence, it is favorable for improving an exact image quality closer to an ideal design and decreasing a generation of the stray light, and the third frustum surface 416 can be configured to improve a formability of the annular structure 410. Moreover, cross sections of the second frustum surface 415 and the third frustum surface 416 can be arc lines or slash lines, the second frustum surface 415 and the third frustum surface 416 can include convex structures or concave structures, but the present disclosure is not limited thereto.

Moreover, shapes of the second through hole 412, the second frustum surface 415 and the third frustum surface 416 of the 4th embodiment can be as illustrated in FIGS. 1D to 1I, but the present disclosure is not limited thereto.

Figure 4D:
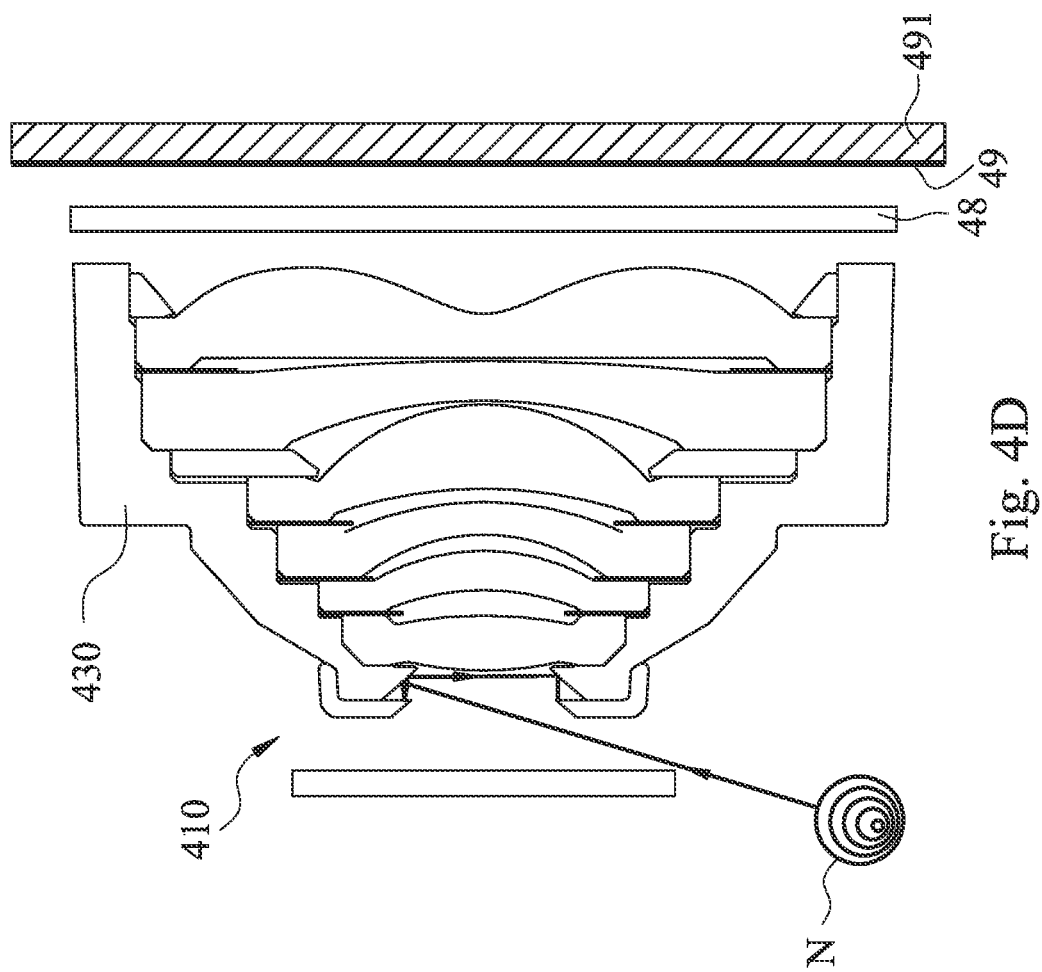
FIG. 4D is a schematic view of a reflection path of a non-imaging light according to the 4th embodiment in FIG. 4A.

FIG. 4D is a schematic view of a reflection path of a non-imaging light N according to the 4th embodiment in FIG. 4A. In FIG. 4D, when the non-imaging light N goes into the electronic device 40, the non-imaging light N first arrives at the second frustum surface 415, then reflects to the first image-side surface 417, then reflects to the second frustum surface 415, and finally repeatedly reflects between the first frustum surface 414 and the second frustum surface 415 so as to reduce an intensity of the non-imaging light N. The non-imaging light N does not go into the image surface 49. Specifically, when the non-imaging light goes into the electronic device 40, the light trap structure can decrease the intensity of the non-imaging light or change the reflection path thereof in multiple reflections. Hence, the light trap structure can intercept most of the non-imaging light N and improves the image quality, but the present disclosure is not limited to the abovementioned reflection path.

In FIG. 4C, the axial connecting structure 440 is disposed on the front cover 420 and the lens barrel 430 and includes a fourth frustum surface 441 and a fifth frustum surface 442. The fourth frustum surface 441 is disposed on the image side of the front cover 420, the fourth frustum surface 441 is farther away from the first through hole 411 than the first frustum surface 414 away from the first through hole 411, the fourth frustum surface 441 faces towards the optical axis X, and extends from the image side of the front cover 420 to the lens barrel 430 in the direction away from the optical axis X. The fifth frustum surface 442 is disposed on an object side of the lens barrel 430, the fifth frustum surface 442 is farther away from the second through hole 412 than the second frustum surface 415 away from the second through hole 412, the fifth frustum surface 442 faces towards the fourth frustum surface 441, and extends from the object side of the lens barrel 430 in a direction away from the front cover 420 and the optical axis X. Both of the fourth frustum surface 441 and the fifth frustum surface 442 can be in a form of a laying surface, the fourth frustum surface 441 contacts the fifth frustum 442 surface physically, and the front cover 420 is aligned with the lens barrel 430.

It is worth to be mentioned that all of the first frustum surface 414 of the front cover 420, the second frustum surface 415 of the lens barrel 430, the third frustum surface 416 of the lens barrel 430, the fourth frustum surface 441 of the axial connecting structure 440 and the fifth frustum surface 442 of the axial connecting structure 440 can be conical surfaces.

Figure 4E:
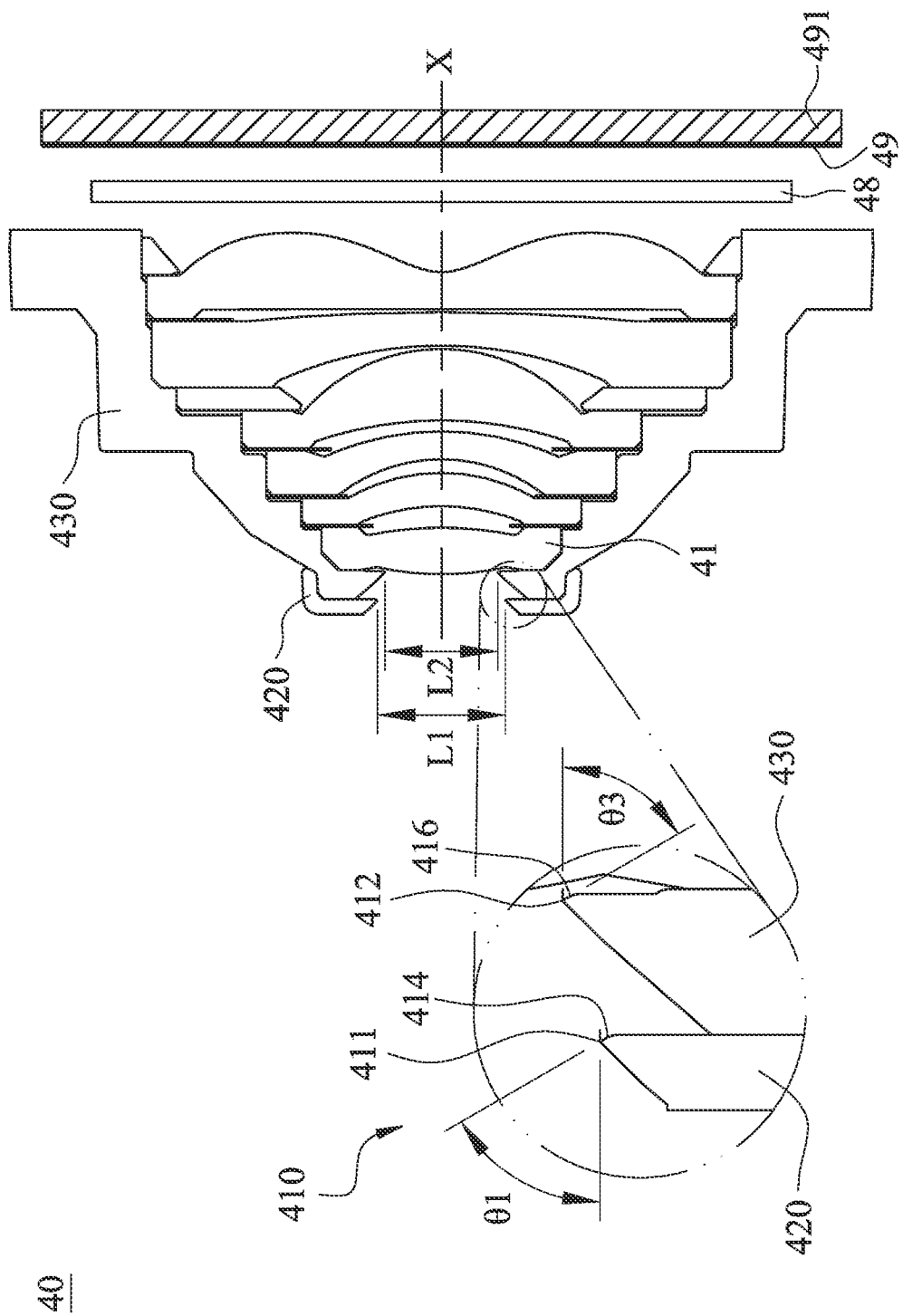
FIG. 4E is a schematic view of parameters of the electronic device according to the 4th embodiment in FIG. 4A.

FIG. 4E is a schematic view of parameters of the electronic device 40 according to the 4th embodiment in FIG. 4A. In FIG. 4E, when a diameter of the first through hole 411 is L1, a diameter of the second through hole 412 is L2, a minimum angle between the first frustum surface 414 and the optical axis X is θ1, an angle between the third frustum surface 416 and the optical axis X is θ3, the condition related to the parameters can be satisfied as the following Table 4.

| Table 4, the 4th embodiment | | | |
|---|---|---|---|
| L1 (mm) | 1.28 | θ1(degrees) | 60 |
| L2 (mm) | 1.13 | θ3(degrees) | 60 |

It is worth to be mentioned that θ1 is equal to θ3 according to the 4th embodiment.

5th Embodiment

FIG. 5A is a schematic view of an electronic device 50 according to the 5th embodiment of the present disclosure. In FIG. 5A, the electronic device 50 includes at least one image capturing device (its reference numeral is omitted) and an image sensor 591, wherein the image capturing device includes an imaging lens assembly (its reference numeral is omitted) and a filter 58. The image sensor 591 is disposed on an image surface 59 of the image capturing device, and the filter 58 is disposed between the imaging lens assembly and the image surface 59.

Figure 5B:
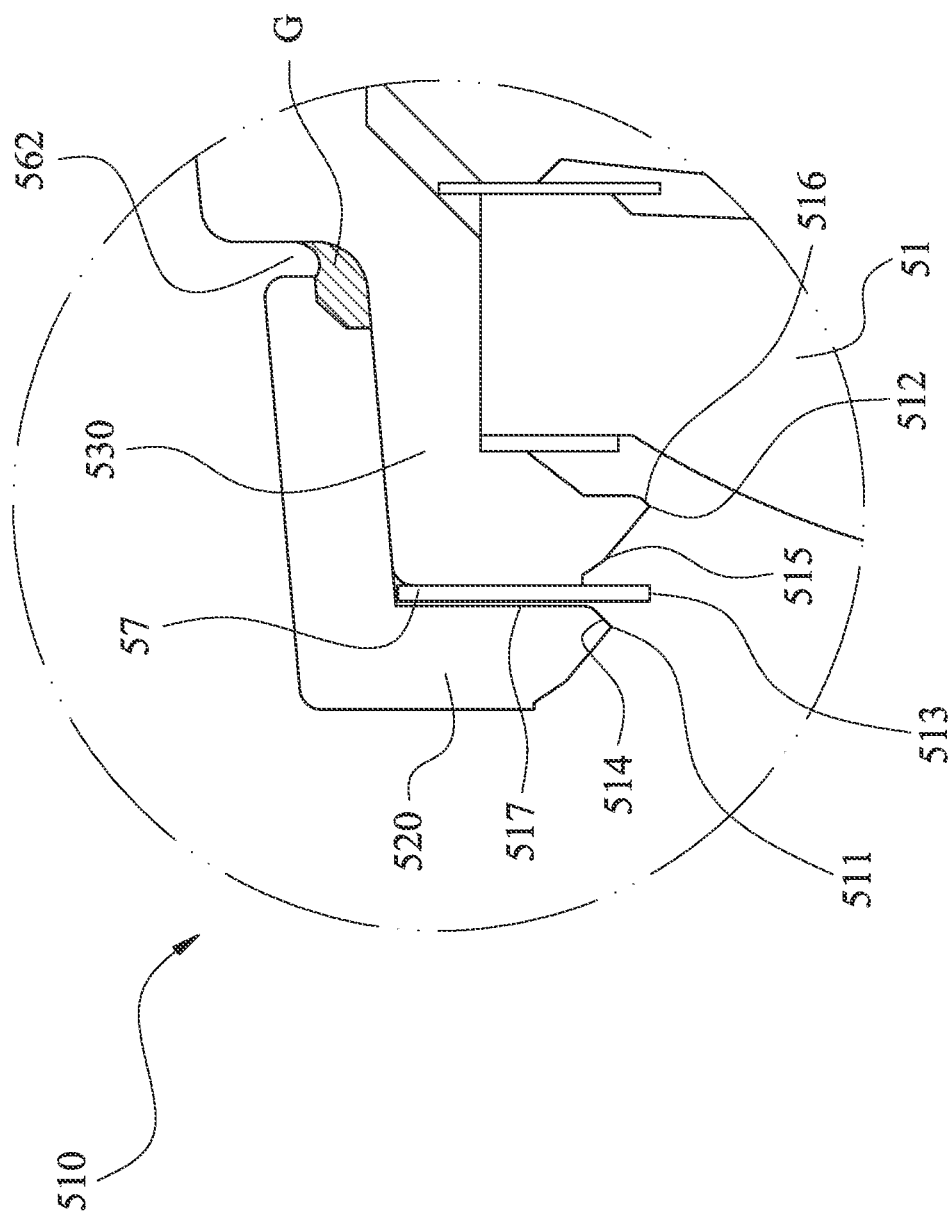
FIG. 5B is a partially enlarged view of the electronic device according to the 5th embodiment in FIG. 5A.
Figure 5C:
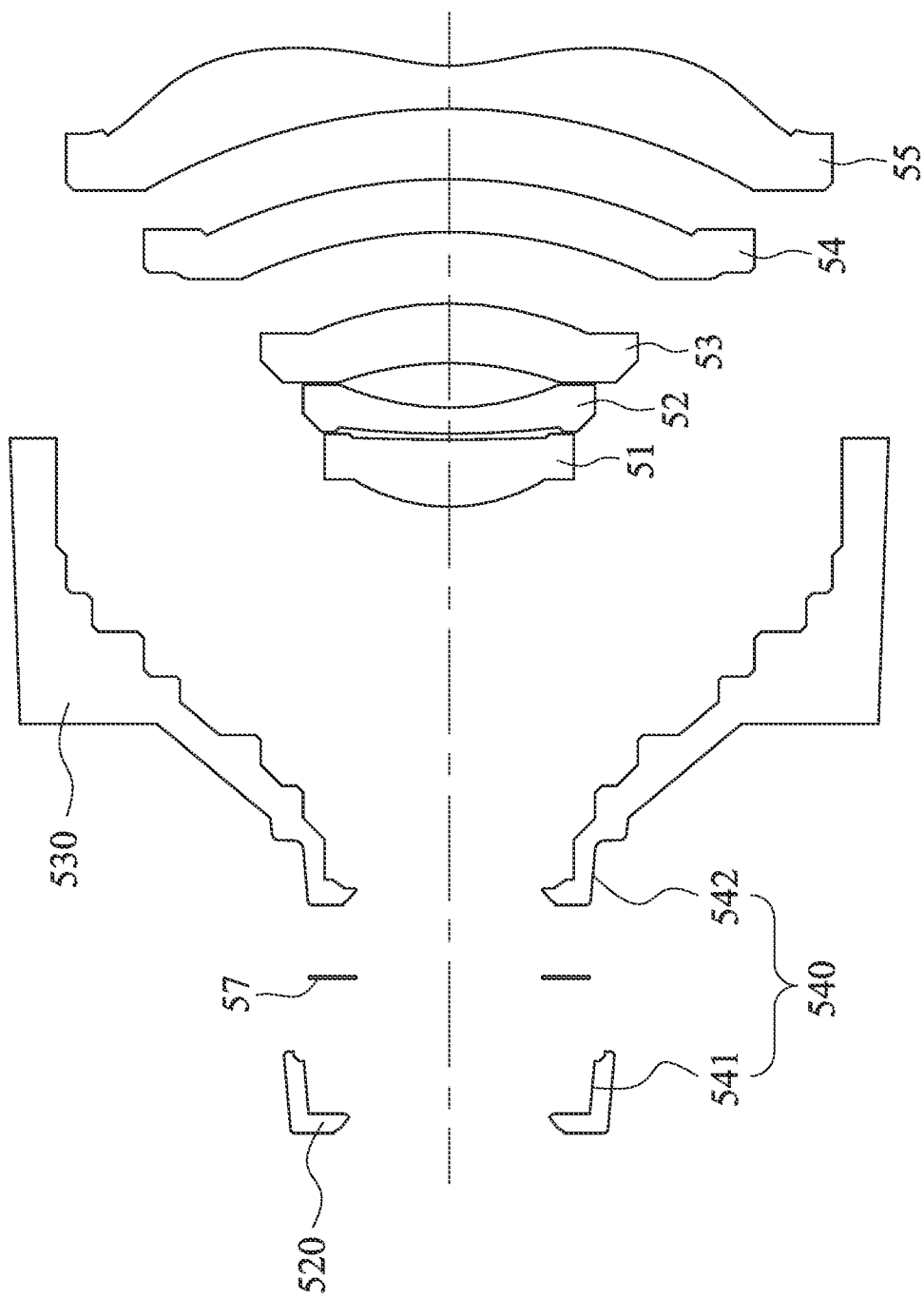
FIG. 5C is a partially exploded view of the image capturing device according to the 5th embodiment in FIG. 5A.

FIG. 5B is a partially enlarged view of the electronic device 50 according to the 5th embodiment in FIG. 5A, and FIG. 5C is a partially exploded view of the image capturing device according to the 5th embodiment in FIG. 5A. In FIGS. 5A to 5C, the imaging lens assembly has an optical axis X and includes an annular structure 510, a front cover 520, a lens barrel 530, an axial connecting structure 540, a light blocking sheet 57, a first lens element 51 and at least two lens elements.

In the 5th embodiment, the imaging lens assembly in order from an object side to an image side includes the first lens element 51 and lens elements 52, 53, 54, 55 wherein all of the first lens element 51 and the lens elements 52, 53, 54, 55 are disposed on an image side of the annular structure 510, and the first lens element 51 is a closest lens element of the imaging lens assembly to the object side. Furthermore, all of the first lens element 51 and the lens elements 52, 53, 54, 55 have refractive power, wherein optical characteristics of the lens elements such as a number, a structure, a surface shape and so on can be utilized, other optical elements can be further disposed according to different imaging requirements, and the present disclosure is not limited thereto.

In FIG. 5B, the annular structure 510 is located on an object side of the imaging lens assembly, surrounds the optical axis X, is composed of the front cover 520 and the lens barrel 530 and includes a first image-side surface 517. The front cover 520 includes a first through hole 511 and a first frustum surface 514 and the lens barrel 530 includes a second through hole 512, a second frustum surface 515 and a third frustum surface 516. The lens barrel 530 is located on an image side of the front cover 520. Hence, it is favorable for enhancing a feasibility of manufacturing.

The first through hole 511 is disposed on an object side of the annular structure 510, and the optical axis X passes through the first through hole 511. The second through hole 512 is disposed on an image side of the first through hole 511, the optical axis X passes through the second through hole 512, the second through hole 512 is a tip-end opening, and the second through hole 512 is a smallest opening of the annular structure 510. Specifically, the tip-end opening is a tip-end protruding towards the optical axis X, and the second frustum surface 515 contacts the third frustum surface 516 and the second through hole 512.

The first frustum surface 514 is disposed on the image side of the first through hole 511, extends from the first through hole 511 to the second through hole 512 in a direction away from the optical axis X, and the first frustum surface 514 can be a non-vertical cylindrical surface. The second frustum surface 515 is disposed on an object side of the second through hole 512 and extends from the second through hole 512 to the first through hole 511 in the direction away from the optical axis X. The first image-side surface 517 is disposed on an image-side edge of the first frustum surface 514 and extends from the image side of the first frustum surface 514 in the direction away from the optical axis X. Specifically, the first frustum surface 514 and the second frustum surface 515 gradually taper in the direction away from the optical axis X and form a light trap structure (its reference numeral is omitted). Furthermore, the first image-side surface 517 can increase a surface area of the light trap structure and then improves an effect of the light trap structure. The third frustum surface 516 is disposed on an image side of the second through hole 512, extends from the second through hole 512 in a direction away from the first through hole 511 and in the direction away from the optical axis X, and the second frustum surface 515 and the third frustum surface 516 gradually taper towards the second through hole 512. Hence, it is favorable for improving an exact image quality closer to an ideal design and decreasing a generation of the stray light, and the third frustum surface 516 can be configured to improve a formability of the annular structure 510. Moreover, cross sections of the second frustum surface 515 and the third frustum surface 516 can be arc lines or slash lines, the second frustum surface 515 and the third frustum surface 516 can include convex structures or concave structures, but the present disclosure is not limited thereto.

Moreover, shapes of the second through hole 512, the second frustum surface 515 and the third frustum surface 516 of the 5th embodiment can be as illustrated in FIGS. 1D to 1I, but the present disclosure is not limited thereto.

Specifically, the light blocking sheet 57 which is disposed between the first frustum surface 514 and the second frustum surface 515. The first frustum surface 514, the light blocking sheet 57 and the second frustum surface 515 are arranged in order from the object side to an image side. The light blocking sheet 57 includes a third through hole 513, wherein the optical axis X passes through the third through hole 513. Hence, it is favorable for increasing a surface area of the light trap structure and improving the effect of the light trap structure.

In FIG. 5C, the axial connecting structure 540 is disposed on the front cover 520 and the lens barrel 530 and includes a fourth frustum surface 541 and a fifth frustum surface 542. The fourth frustum surface 541 is disposed on the image side of the front cover 520, the fourth frustum surface 541 is farther away from the first through hole 510 than the first frustum surface 514 away from the first through hole 511, the fourth frustum surface 541 faces towards the optical axis X, and extends from the image side of the front cover 520 to the lens barrel in the direction away from the optical axis X. The fifth frustum surface 542 is disposed on an object side of the lens barrel 530, the fifth frustum surface 542 is farther away from the second through hole 512 than the second frustum surface 515 away from the second through hole 512, the fifth frustum surface 542 faces towards the fourth frustum surface 541, and extends from the object side of the lens barrel 530 in a direction away from the front cover 520 and the optical axis X. Both of the fourth frustum surface 541 and the fifth frustum surface 542 can be in a form of a laying surface, the fourth frustum surface 541 contacts the fifth frustum surface 542 physically, and the front cover 520 is aligned with the lens barrel 530.

It is worth to be mentioned that all of the first frustum surface 514 of the front cover 520, the second frustum surface 515 of the lens barrel 530, the third frustum surface 516 of the lens barrel 530, the fourth frustum surface 541 of the axial connecting structure 540 and the fifth frustum surface 542 of the axial connecting structure 540 can be conical surfaces.

Furthermore, the front cover 520 further includes a groove (its reference numeral is omitted), the groove is located on the image side and faces towards the optical axis X, and the groove and the fifth frustum surface 542 form a containing groove 562. The containing groove 562 is configured to contain a glue G. A bonding strength between the front cover 520 and the lens barrel 530 and an associativity of the axial connecting structure 540 can be enhanced via the glue G.

Figure 5D:
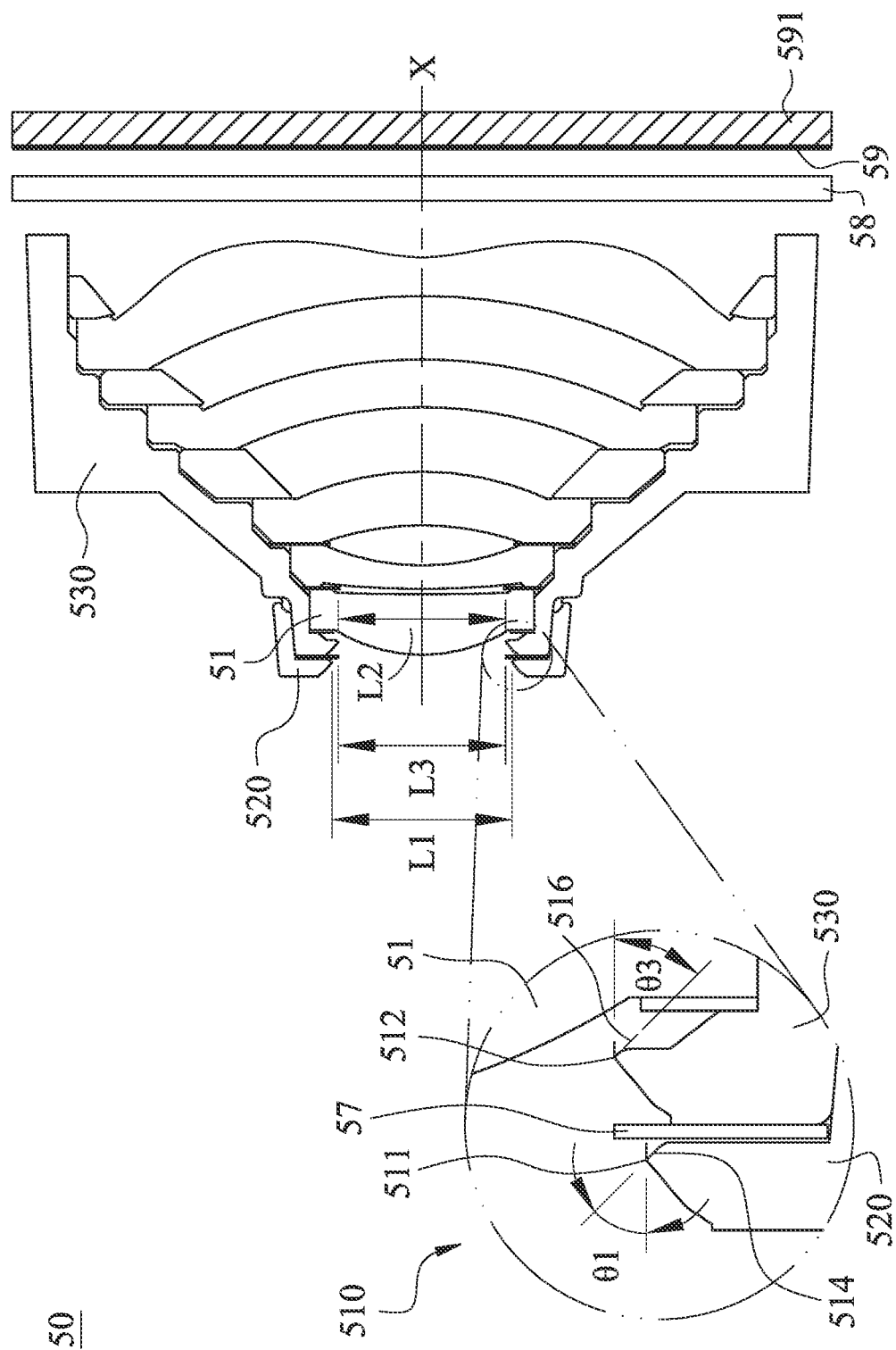
FIG. 5D is a schematic view of parameters of the electronic device according to the 5th embodiment in FIG. 5A.

FIG. 5D is a schematic view of parameters of the electronic device 50 according to the 5th embodiment in FIG. 5A. In FIG. 5D, when a diameter of the first through hole 511 is L1, a diameter of the second through hole 512 is L2, a diameter of the third through hole 513 is L3, a minimum angle between the first frustum surface 514 and the optical axis X is θ1, an angle between the third frustum surface 516 and the optical axis X is θ3, the condition related to the parameters can be satisfied as the following Table 5.

| Table 5, the 5th embodiment | | | |
|---|---|---|---|
| L1 (mm) | 1.54 | θ1 (degrees) | 45 |
| L2 (mm) | 1.43 | θ3 (degrees) | 45 |
| L3 (mm) | 1.43 | (L3 − L2)/L2 | 0 |

It is worth to be mentioned that L2 is equal to L3 and θ1 is equal to θ3 according to the 5th embodiment.

6th Embodiment

Figure 6A:
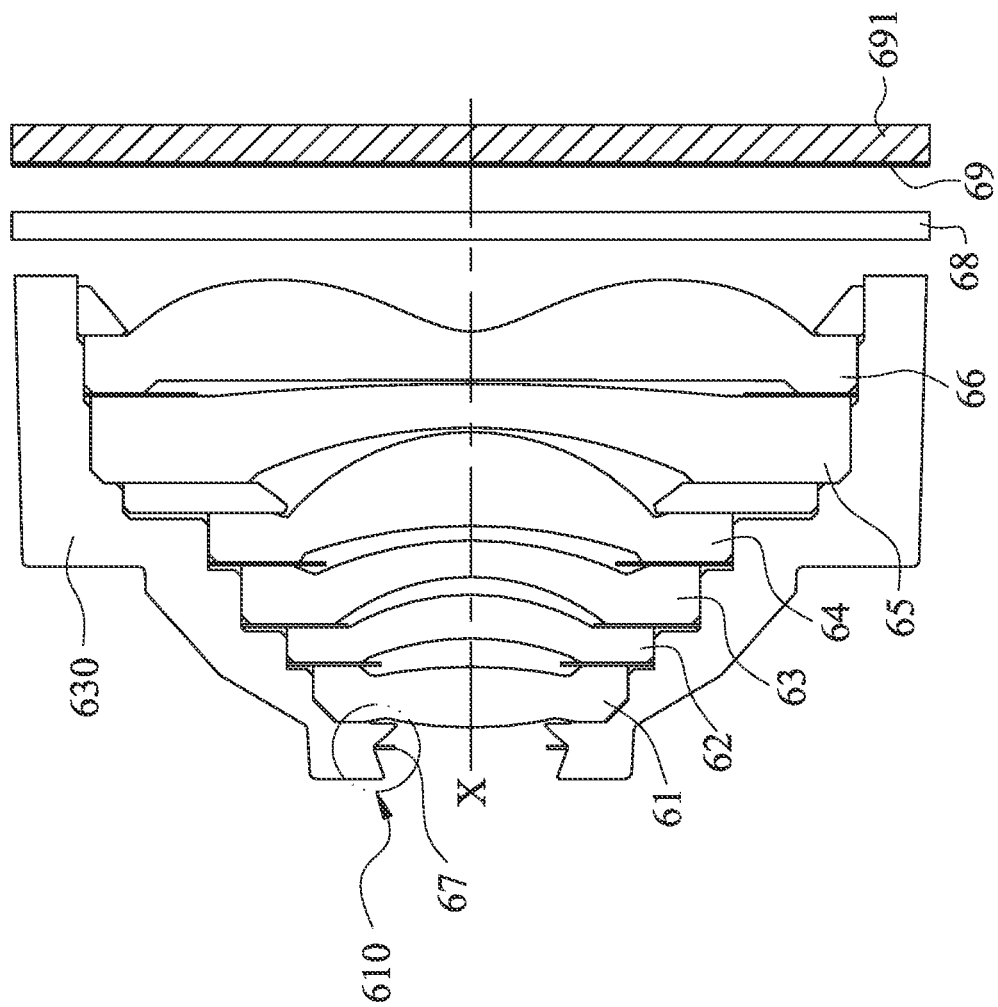
FIG. 6A is a schematic view of an electronic device according to the 6th embodiment of the present disclosure.

FIG. 6A is a schematic view of an electronic device 60 according to the 6th embodiment of the present disclosure. In FIG. 6A, the electronic device 60 includes at least one image capturing device (its reference numeral is omitted) and an image sensor 691, wherein the image capturing device includes an imaging lens assembly (its reference numeral is omitted) and a filter 68. The image sensor 691 is disposed on an image surface 69 of the image capturing device, and the filter 68 is disposed between the imaging lens assembly and the image surface 69.

Figure 6B:
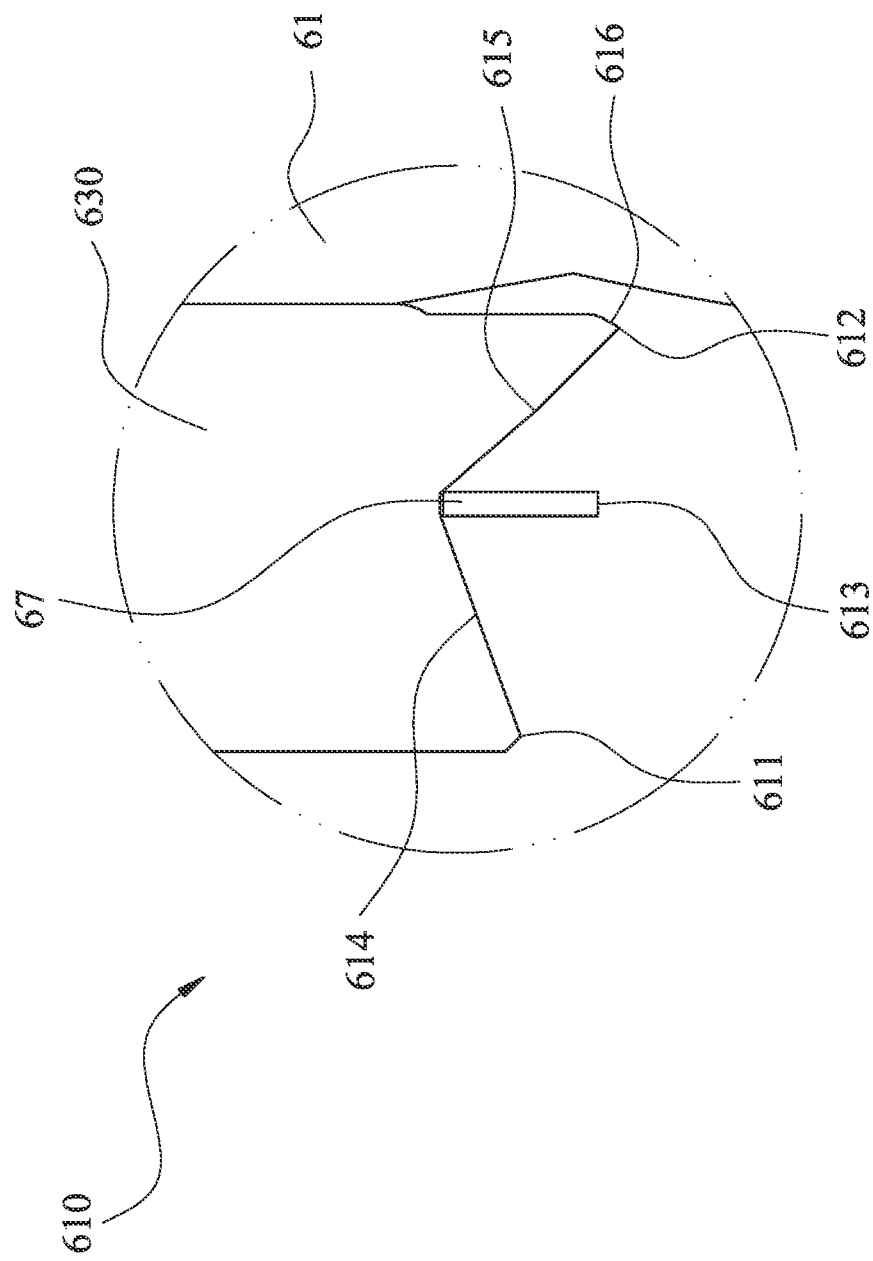
FIG. 6B is a partially enlarged view of the electronic device according to the 6th embodiment in FIG. 6A.
Figure 6C:
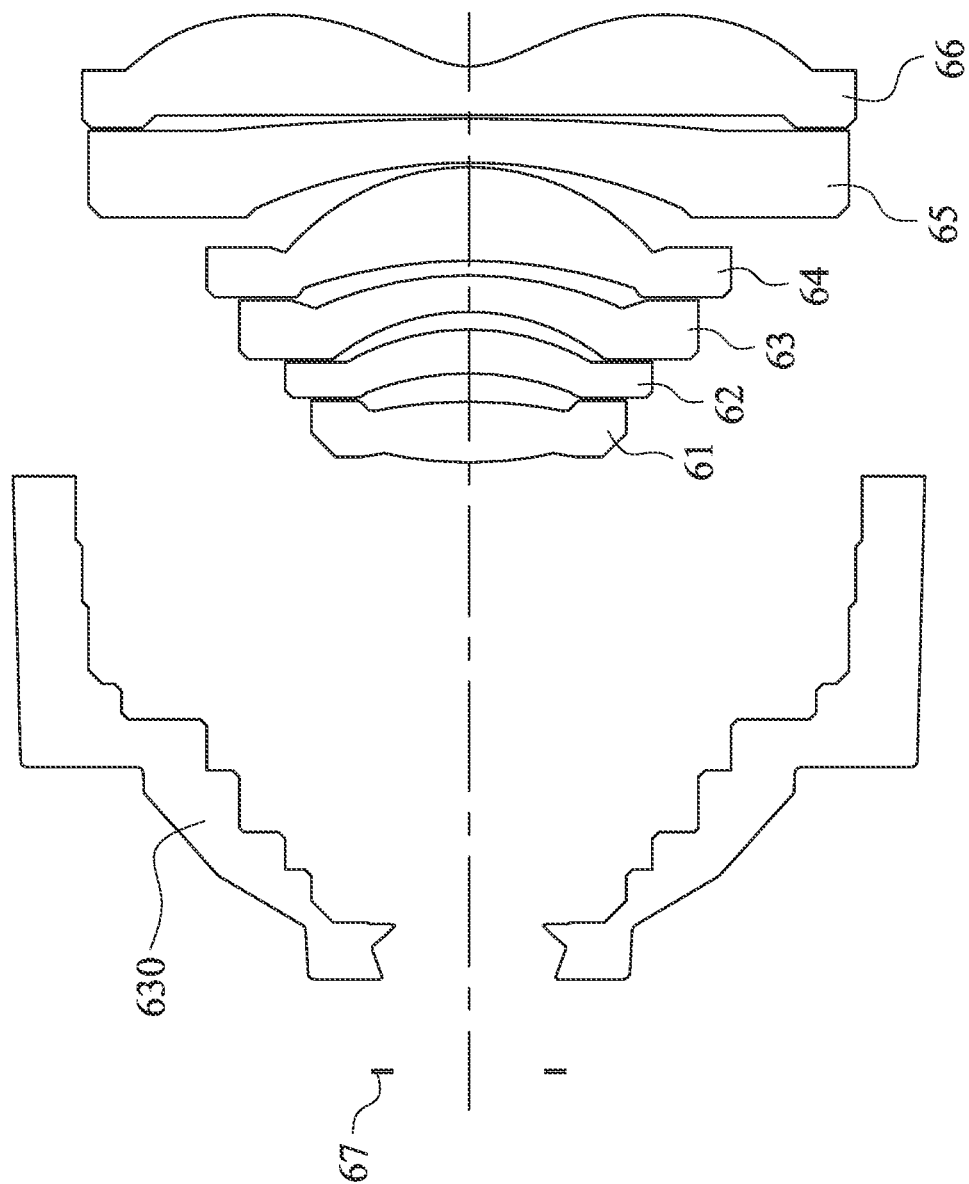
FIG. 6C is a partially exploded view of the image capturing device according to the 6th embodiment in FIG. 6A.

FIG. 6B is a partially enlarged view of the electronic device 60 according to the 6th embodiment in FIG. 6A, and FIG. 6C is a partially exploded view of the image capturing device according to the 6th embodiment in FIG. 6A. In FIGS. 6A to 6C, the imaging lens assembly has an optical axis X and includes an annular structure 610, a lens barrel 630, a light blocking sheet 67, a first lens element 61 and at least two lens elements.

In the 6th embodiment, the imaging lens assembly in order from an object side to an image side includes the first lens element 61 and lens elements 62, 63, 64, 65, 66, wherein all of the first lens element 61 and the lens elements 62, 63, 64, 65, 66 are disposed on an image side of the annular structure 610, and the first lens element 61 is a closest lens element of the imaging lens assembly to the object side. Furthermore, all of the first lens element 61 and the lens elements 62, 63, 64, 65, 66 have refractive power, wherein optical characteristics of the lens elements such as a number, a structure, a surface shape and so on can be utilized, other optical elements can be further disposed according to different imaging requirements, and the present disclosure is not limited thereto.

In FIG. 6B, the annular structure 610 is located on an object side of the imaging lens assembly, surrounds the optical axis X, and the annular structure 610 includes a first through hole 611, a second through hole 612, a first frustum surface 614, a second frustum surface 615 and a third frustum surface 616. Furthermore, the first through hole 611, the second through hole 612, the first frustum surface 614, the second frustum surface 615 and the third frustum surface 616 are integrally formed, and the annular structure 610 can be integrally formed via injection molding with elastic demolding. Hence, it is favorable for decreasing a space for strapping and assembling and is favorable for reducing a volume of the imaging lens assembly.

The first through hole 611 is disposed on an object side of the annular structure 610, and the optical axis X passes through the first through hole 611. The second through hole 612 is disposed on an image side of the first through hole 611, the optical axis X passes through the second through hole 612, the second through hole 612 is a tip-end opening, and the second through hole 612 is a smallest opening of the annular structure 610. Specifically, the tip-end opening is a tip-end protruding towards the optical axis X, and the second frustum surface 615 contacts the third frustum surface 616 and the second through hole 612.

The first frustum surface 614 is disposed on the image side of the first through hole 611, extends from the first through hole 611 to the second through hole 612 in a direction away from the optical axis X, and the first frustum surface 614 can be a non-vertical cylindrical surface. The second frustum surface 615 is disposed on an object side of the second through hole 612 and extends from the second through hole 612 to the first through hole 611 in the direction away from the optical axis X. Specifically, the first frustum surface 614 and the second frustum surface 615 gradually taper in the direction away from the optical axis X and form a light trap structure (its reference numeral is omitted). The third frustum surface 616 is disposed on an image side of the second through hole 612, extends from the second through hole 612 in a direction away from the first through hole 611 and in the direction away from the optical axis X, and the second frustum surface 615 and the third frustum surface 616 gradually taper towards the second through hole 612. Hence, it is favorable for improving an exact image quality closer to an ideal design and decreasing a generation of the stray light, and the third frustum surface 616 can be configured to improve a formability of the annular structure 610. Moreover, cross sections of the second frustum surface 615 and the third frustum surface 616 can be arc lines or slash lines, the second frustum surface 615 and the third frustum surface 616 can include convex structures or concave structures, but the present disclosure is not limited thereto.

Moreover, shapes of the second through hole 612, the second frustum surface 615 and the third frustum surface 616 of the 6th embodiment can be as illustrated in FIGS. 1D to 1I, but the present disclosure is not limited thereto.

It is worth to be mentioned that all of the first frustum surface 614 of the annular 610, the second frustum surface 615 thereof and the third frustum surface 616 thereof can be conical surfaces.

Specifically, the light blocking sheet 67 which is disposed between the first frustum surface 614 and the second frustum surface 615. The first frustum surface 614, the light blocking sheet 67 and the second frustum surface 615 are arranged in order from the object side to an image side. The light blocking sheet 67 includes a third through hole 613, wherein the optical axis X passes through the third through hole 613. Hence, it is favorable for increasing a surface area of the light trap structure and improving an effect of the light trap structure.

Figure 6D:
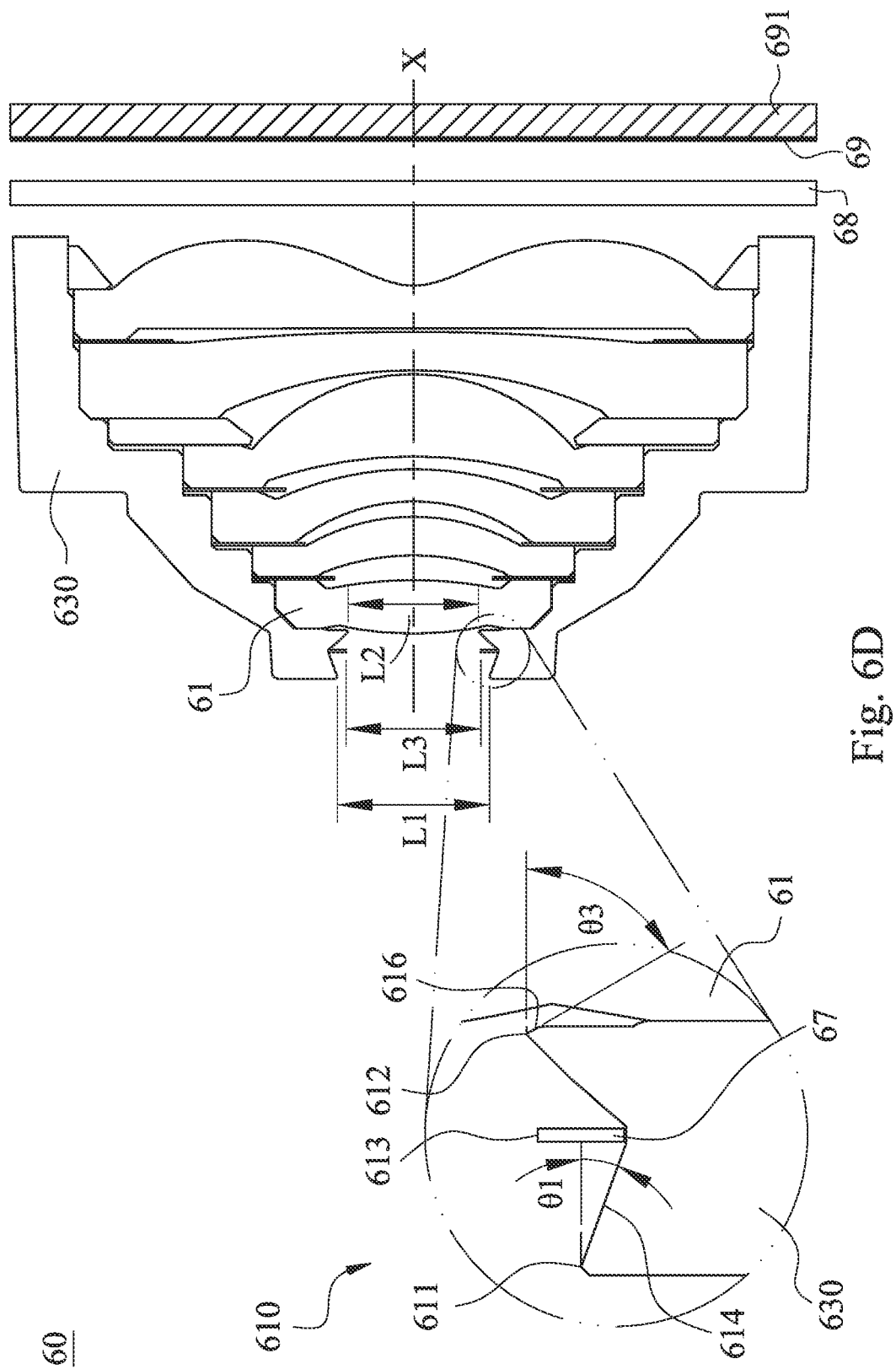
FIG. 6D is a schematic view of parameters of the electronic device according to the 6th embodiment in FIG. 6A.

FIG. 6D is a schematic view of parameters of the electronic device 60 according to the 6th embodiment in FIG. 6A. In FIG. 6D, when a diameter of the first through hole 611 is L1, a diameter of the second through hole 612 is L2, a diameter of the third through hole 613 is L3, a minimum angle between the first frustum surface 614 and the optical axis X is θ1, an angle between the third frustum surface 616 and the optical axis X is θ3, the condition related to the parameters can be satisfied as the following Table 6.

| Table 6, the 6th embodiment | | | |
|---|---|---|---|
| L1 (mm) | 1.32 | θ1(degrees) | 20 |
| L2 (mm) | 1.13 | θ3(degrees) | 60 |
| L3 (mm) | 1.17 | (L3 − L2)/L2 | 0.035 |

It is worth to be mentioned that θ1 is an elastic demolding angle according to the 6th embodiment.

7th Embodiment

Figure 7A:
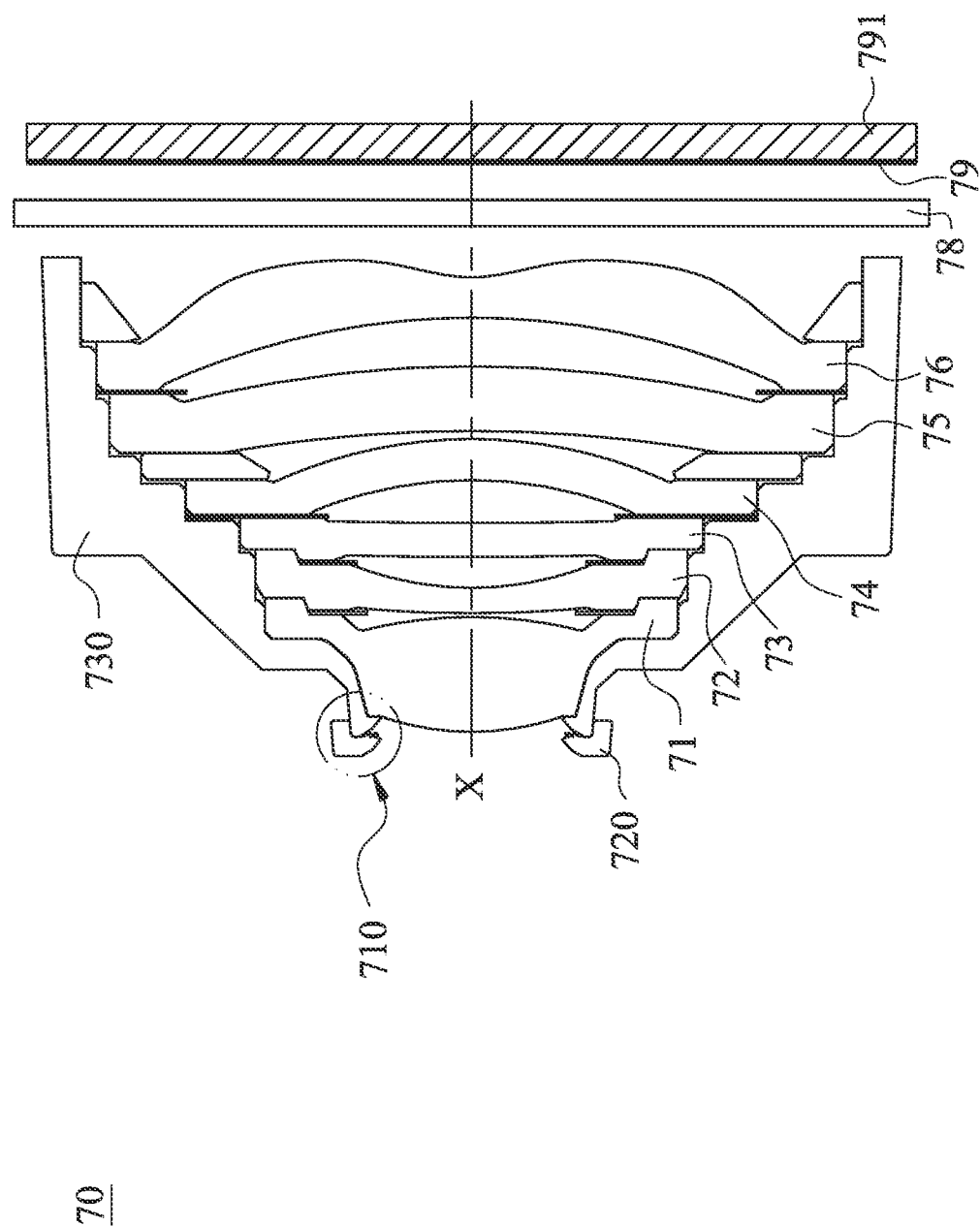
FIG. 7A is a schematic view of an electronic device according to the 7th embodiment of the present disclosure.

FIG. 7A is a schematic view of an electronic device 70 according to the 7th embodiment of the present disclosure. In FIG. 7A, the electronic device 70 includes at least one image capturing device (its reference numeral is omitted) and an image sensor 791, wherein the image capturing device includes an imaging lens assembly (its reference numeral is omitted) and a filter 78. The image sensor 791 is disposed on an image surface 79 of the image capturing device, and the filter 78 is disposed between the imaging lens assembly and the image surface 79.

Figure 7B:
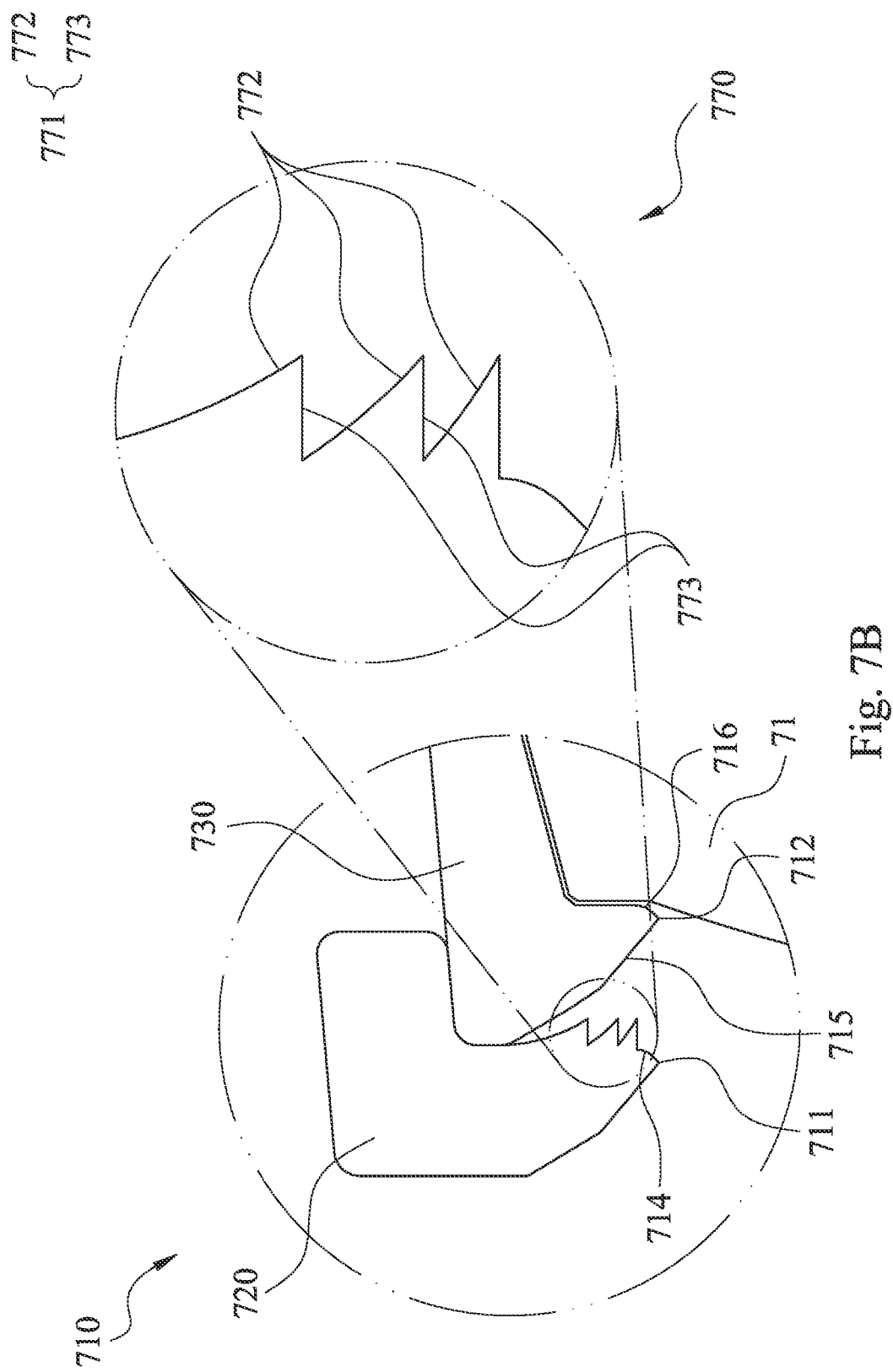
FIG. 7B is a partially enlarged view of the electronic device according to the 7th embodiment in FIG. 7A.
Figure 7C:
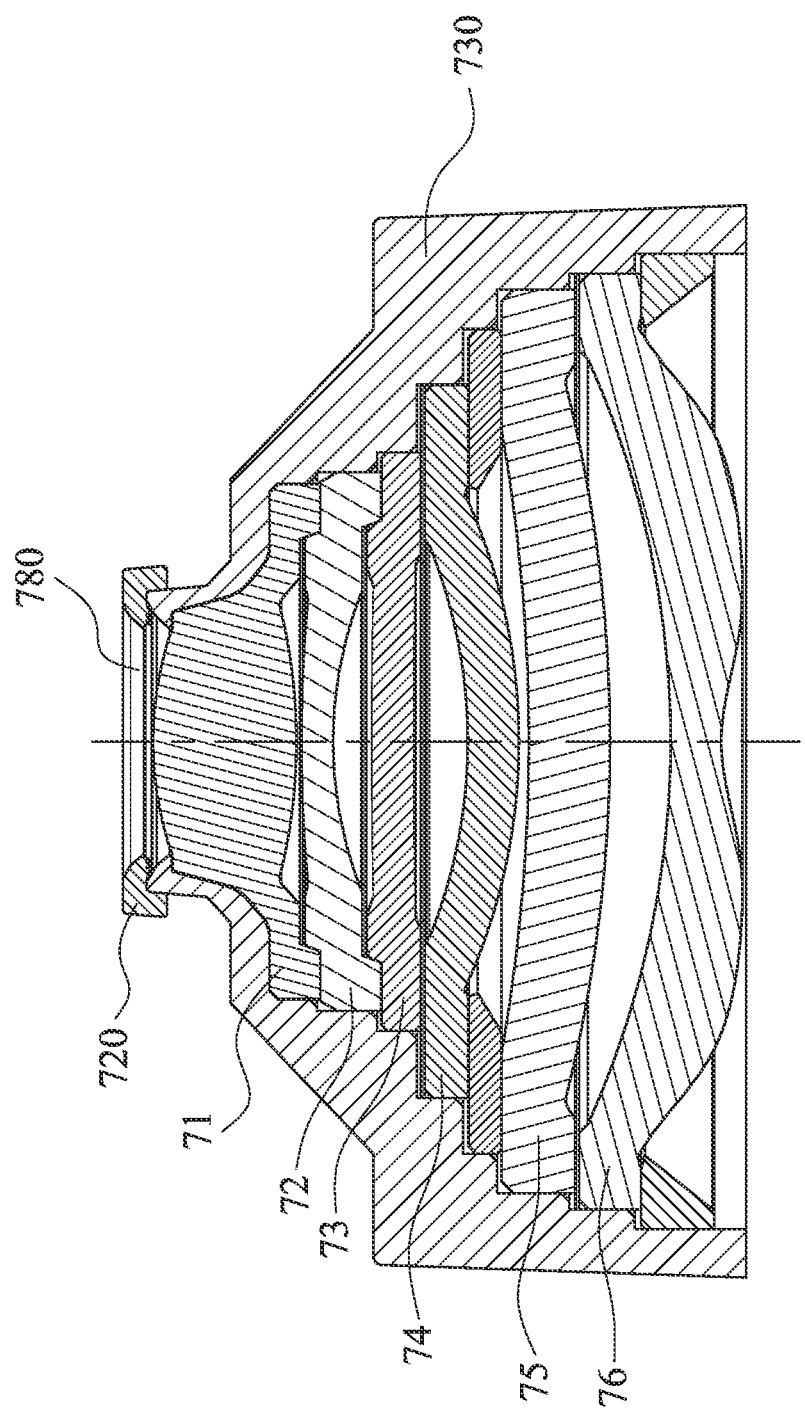
FIG. 7C is a schematic view of the image capturing device according to the 7th embodiment in FIG. 7A.
Figure 7D:
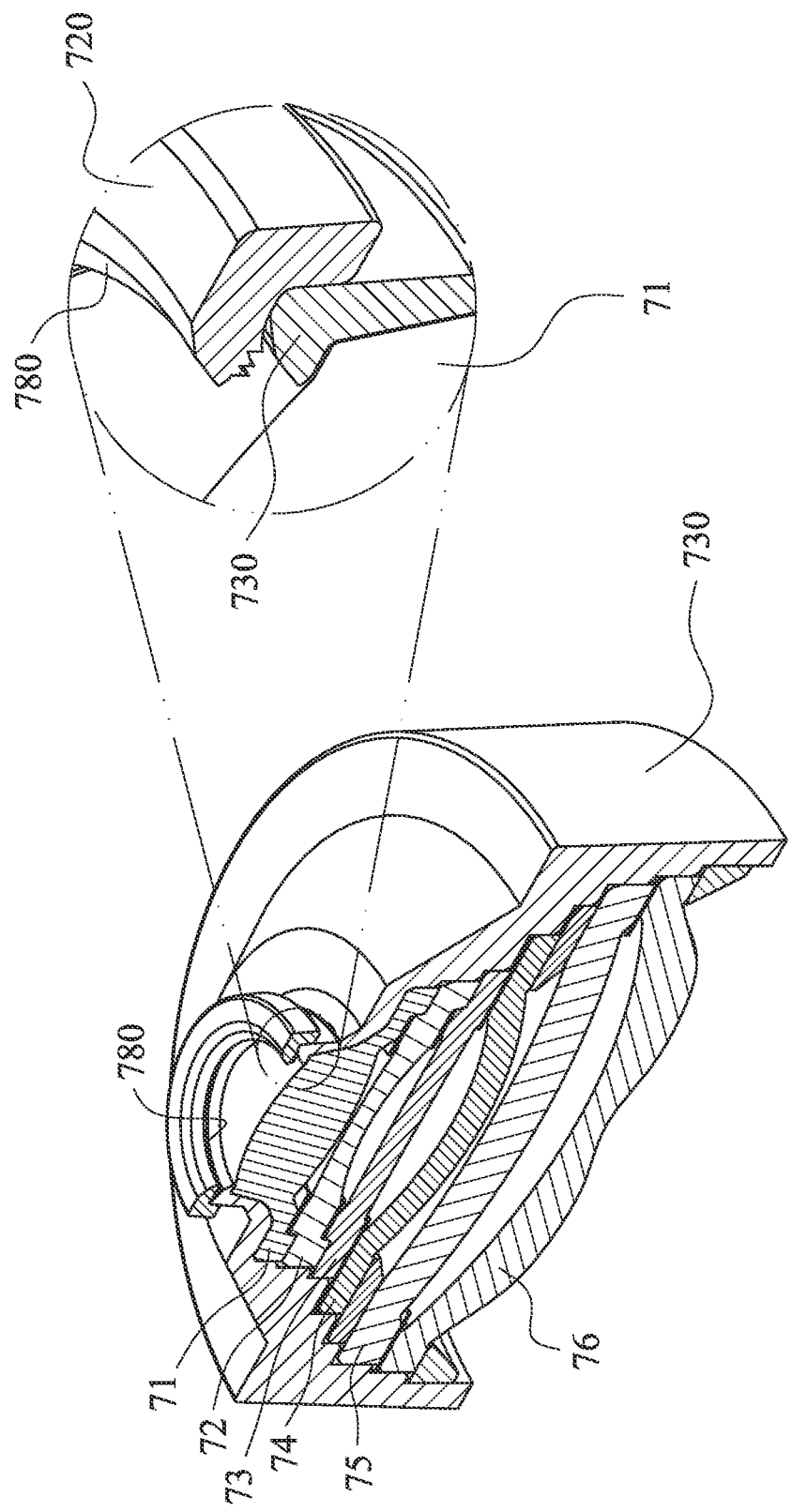
FIG. 7D is a cross-sectional view of the image capturing device according to the 7th embodiment in FIG. 7C.
Figure 7E:
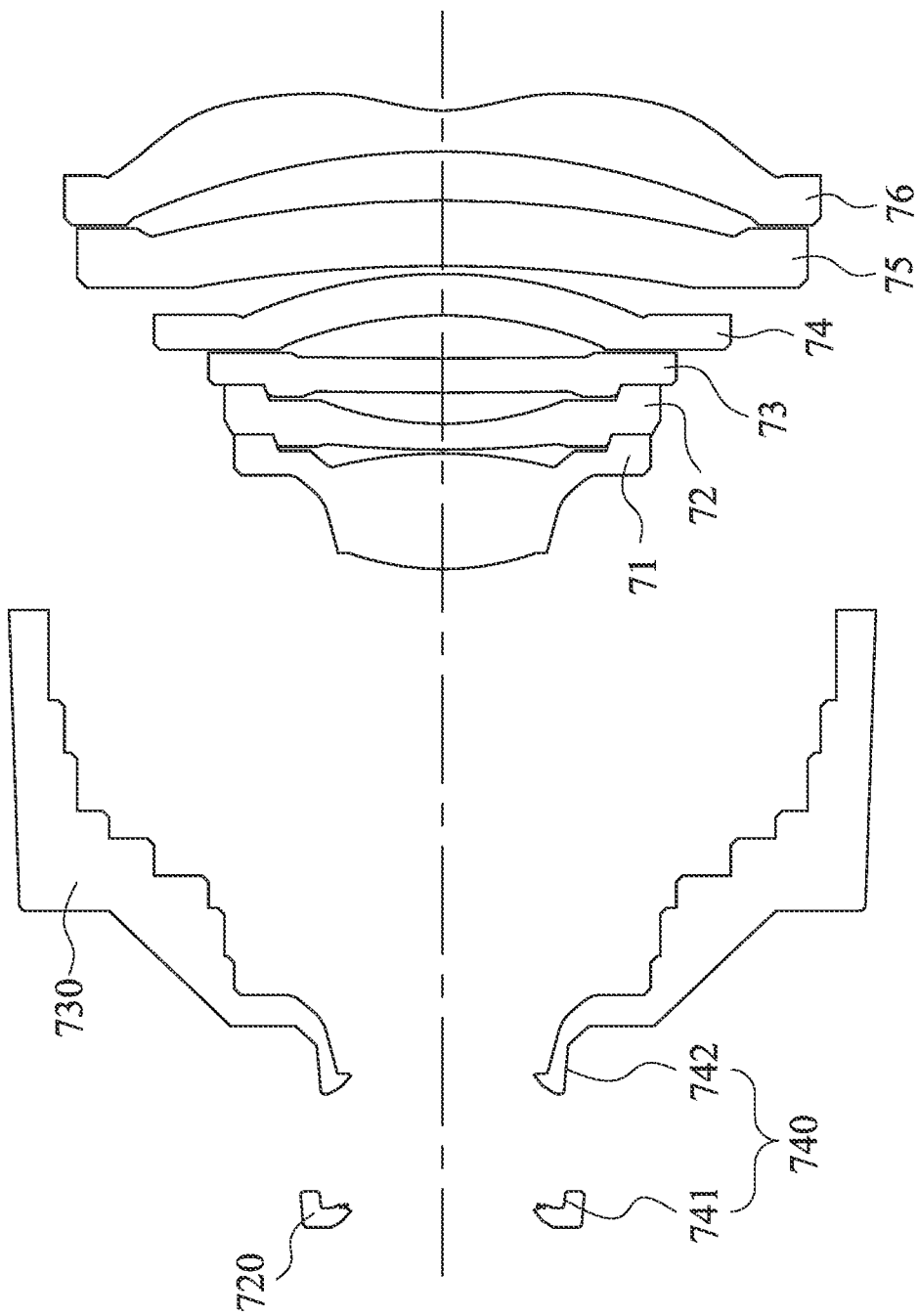
FIG. 7E is a partially exploded view of the image capturing device according to the 7th embodiment in FIG. 7A.

FIG. 7B is a partially enlarged view of the electronic device 70 according to the 7th embodiment in FIG. 7A. FIG. 7C is a schematic view of the image capturing device according to the 7th embodiment in FIG. 7A. FIG. 7D is a cross-sectional view of the image capturing device according to the 7th embodiment in FIG. 7C. FIG. 7E is a partially exploded view of the image capturing device according to the 7th embodiment in FIG. 7A. In FIGS. 7A to 7E, the imaging lens assembly has an optical axis X and includes an annular structure 710, a front cover 720, a lens barrel 730, an axial connecting structure 740, a first lens element 71 and at least two lens elements.

In the 7th embodiment, the imaging lens assembly in order from an object side to an image side includes the first lens element 71 and lens elements 72, 73, 74, 75, 76, wherein all of the first lens element 71 and the lens elements 72, 73, 74, 75, 76 are disposed on an image side of the annular structure 710, and the first lens element 71 is a closest lens element of the imaging lens assembly to the object side. Furthermore, all of the first lens element 71 and the lens elements 72, 73, 74, 75, 76 have refractive power, wherein optical characteristics of the lens elements such as a number, a structure, a surface shape and so on can be utilized, other optical elements can be further disposed according to different imaging requirements, and the present disclosure is not limited thereto.

Figure 7F:
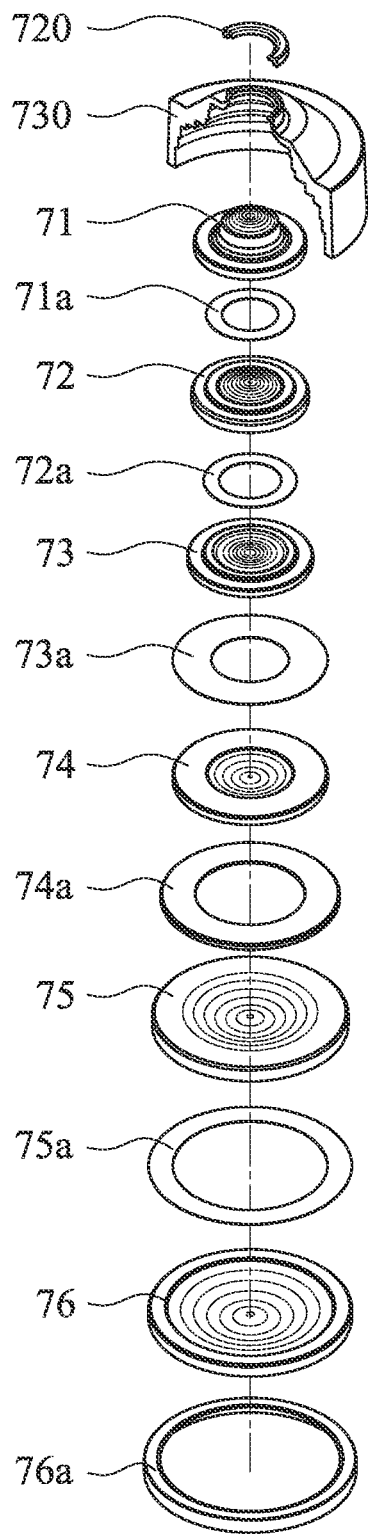
FIG. 7F is an exploded view of the image capturing device according to the 7th embodiment in FIG. 7C.
Figure 7G:
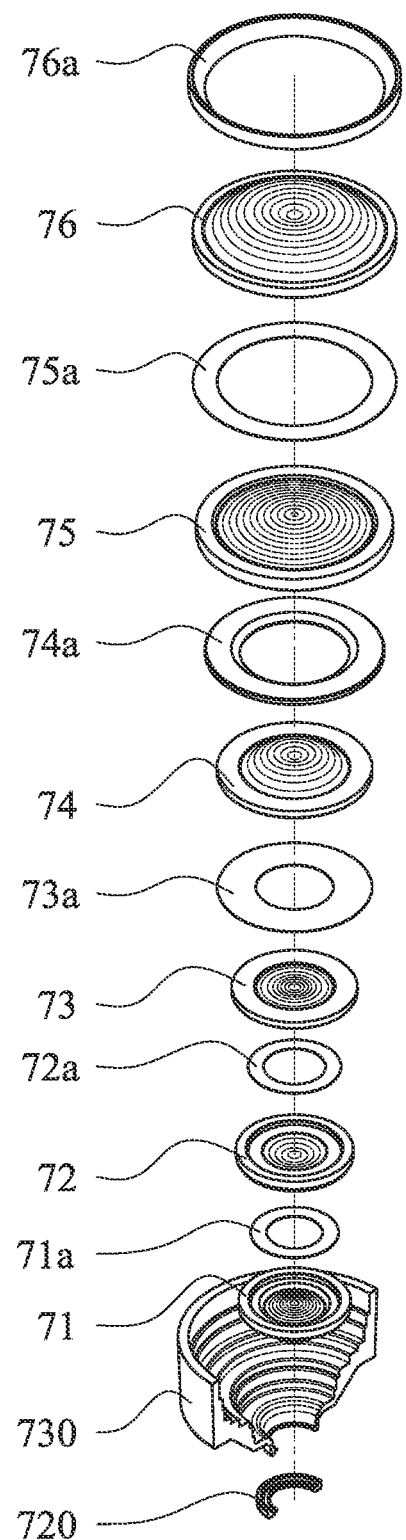
FIG. 7G is another exploded view of the image capturing device according to the 7th embodiment in FIG. 7C.

In detail, FIG. 7F is an exploded view of the image capturing device according to the 7th embodiment in FIG. 7C. FIG. 7G is another exploded view of the image capturing device according to the 7th embodiment in FIG. 7C. In FIG. 7F and FIG. 7G, the imaging lens assembly in order from the object side to image side includes the front cover 720, the lens barrel 730, the first lens element 71, a light blocking sheet 71a, the lens element 72, a light blocking sheet 72a, the lens element 73, a light blocking sheet 73a, the lens element 74, a spacer 74a, the lens element 75, a light blocking sheet 75a, the lens element 76 and a pressure ring 76a.

In FIG. 7B, the annular structure 710 is located on an object side of the imaging lens assembly, surrounds the optical axis X and is composed of the front cover 720 the lens barrel 730. The front cover 720 includes a first through hole 711 and a first frustum surface 714, the lens barrel 730 includes a second through hole 712, a second frustum surface 715 and a third frustum surface 716, and the lens barrel 730 is located on an image side of the front cover 720. Hence, it is favorable for enhancing a feasibility of manufacturing and improving a process of assembling.

The first through hole 711 is disposed on an object side of the annular structure 710, and the optical axis X passes through the first through hole 711. The second through hole 712 is disposed on an image side of the first through hole 711, the optical axis X passes through the second through hole 712, the second through hole 712 is a tip-end opening, and the second through hole 712 is a smallest opening of the annular structure 710. Specifically, the tip-end opening is a tip-end protruding towards the optical axis X, and the second frustum surface 715 contacts the third frustum surface 716 and the second through hole 712.

The first frustum surface 714 is disposed on the image side of the first through hole 711, extends from the first through hole 711 to the second through hole 712 in a direction away from the optical axis X, and the first frustum surface 714 can be a non-vertical cylindrical surface. The second frustum surface 715 is disposed on an object side of the second through hole 712 and extends from the second through hole 712 to the first through hole 711 in the direction away from the optical axis X. Specifically, the first frustum surface 714 and the second frustum surface 715 gradually taper in the direction away from the optical axis X and form a light trap structure 780. The third frustum surface 716 is disposed on an image side of the second through hole 712, extends from the second through hole 712 in a direction away from the first through hole 711 and in the direction away from the optical axis X, and the second frustum surface 715 and the third frustum surface 716 gradually taper towards the second through hole 712. Hence, it is favorable for improving an exact image quality closer to an ideal design and decreasing a generation of the stray light, and the third frustum surface 716 can be configured to improve a formability of the annular structure 710. Moreover, cross sections of the second frustum surface 715 and the third frustum surface 716 can be arc lines or slash lines, the second frustum surface 715 and the third frustum surface 716 can include convex structures or concave structures, but the present disclosure is not limited thereto.

Moreover, shapes of the second through hole 712, the second frustum surface 715 and the third frustum surface 716 of the 7th embodiment can be as illustrated in FIGS. 1D to 1I, but the present disclosure is not limited thereto.

In FIG. 7E, the axial connecting structure 740 is disposed on the front cover 720 and the lens barrel 730 and includes a fourth frustum surface 741 and a fifth frustum surface 742. The fourth frustum surface 741 is disposed on the image side of the front cover 720, the fourth frustum surface 741 is farther away from the first through hole 711 than the first frustum surface 714 away from the first through hole 711, the fourth frustum surface 741 faces towards the optical axis X, and extends from the image side of the front cover 720 to the lens barrel 730 in the direction away from the optical axis X. The fifth frustum surface 742 is disposed on an object side of the lens barrel 730, the fifth frustum surface 742 is farther away from the second through hole 712 than the second frustum surface 715 away from the second through hole 712, the fifth frustum surface 742 faces towards the fourth frustum surface 741, and extends from the object side of the lens barrel 730 in a direction away from the front cover 720 and the optical axis X. Both of the fourth frustum surface 741 and the fifth frustum surface 742 can be in a form of a laying surface, the fourth frustum surface 741 contacts the fifth frustum 742 surface physically, and the front cover 720 is aligned with the lens barrel 730.

It is worth to be mentioned that all of the first frustum surface 714 of the front cover 720, the second frustum surface 715 of the lens barrel 730, the third frustum surface 716 of the lens barrel 730, the fourth frustum surface 741 of the axial connecting structure 740 and the fifth frustum surface 742 of the axial connecting structure 740 can be conical surfaces.

In FIG. 7B, at least one of the first frustum surface 714 and the second frustum surface 715 includes a concentric circle structure 770. In the 7th embodiment, the first frustum surface 714 includes the concentric circle structure 770. The concentric circle structure 770 surrounds the optical axis X and is opaque. The concentric circle 770 is not configured to image. Hence, it is favorable for further improving the effect of the light trap structure 780. Specifically, the concentric circle structure 770 includes a plurality of convex structures 771. Each of the convex structures 771 include a plurality of arc torus surfaces 772 and a plurality of connecting surfaces 773, wherein the art torus surfaces 772 have the same curving direction and are arranged along the first frustum surface 714, and the connecting surfaces 773 connect the two adjacent art torus surfaces 772. It is worth to be mentioned that the concentric circle structure 770 can be Fresnel structure, but the present disclosure is not limited thereto.

Figure 7H:
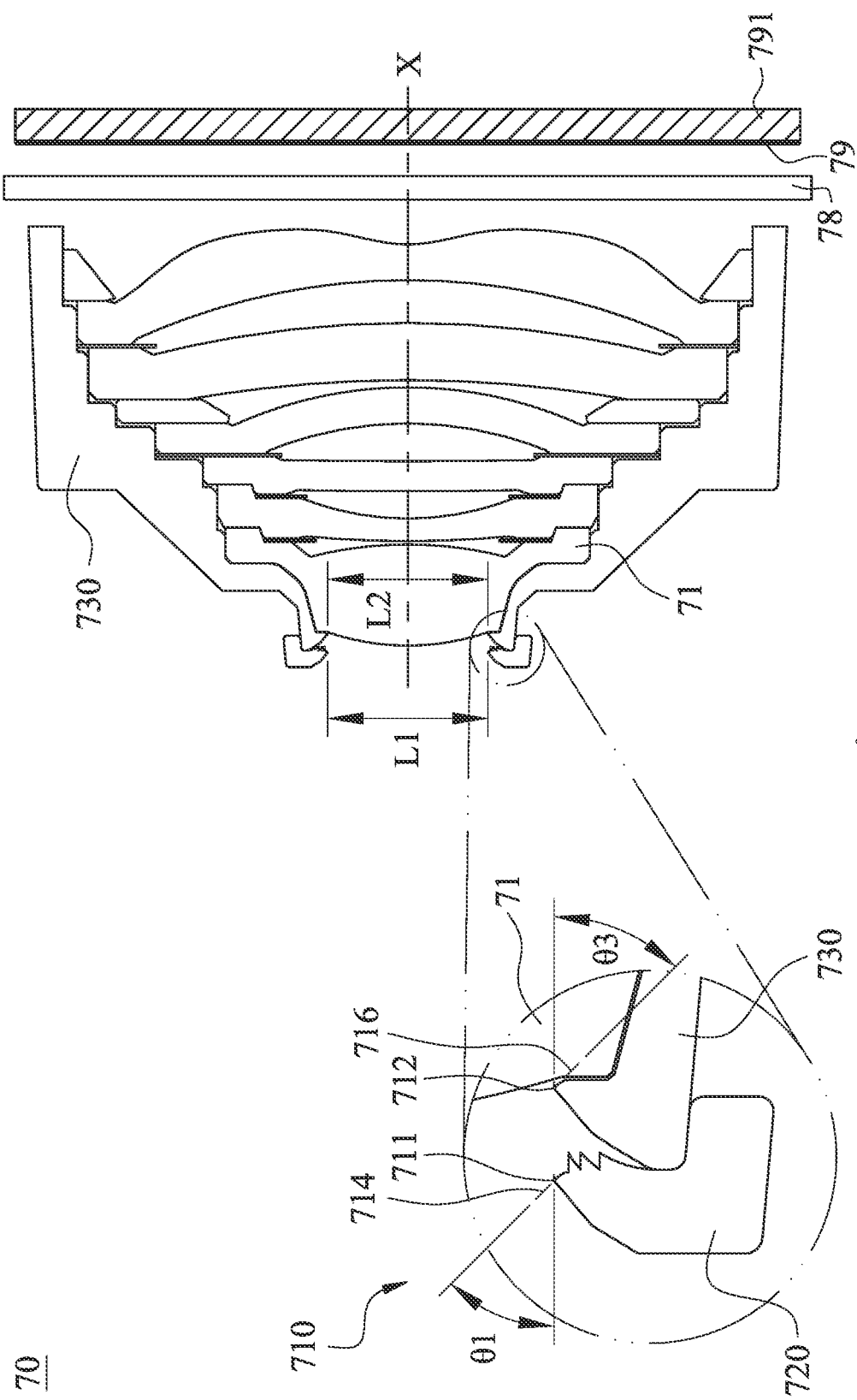
FIG. 7H is a schematic view of parameters of the electronic device according to the 7th embodiment in FIG. 7A.

FIG. 7H is a schematic view of parameters of the electronic device 70 according to the 7th embodiment in FIG. 7A. In FIG. 7H, when a diameter of the first through hole 711 is L1, a diameter of the second through hole 712 is L2, a minimum angle between the first frustum surface 714 and the optical axis X is θ1, an angle between the third frustum surface 716 and the optical axis X is θ3, the condition related to the parameters can be satisfied as the following Table 7.

| Table 7, the 7th embodiment | | | |
|---|---|---|---|
| L1 (mm) | 1.43 | θ1 (degrees) | 45 |
| L2 (mm) | 1.43 | θ3 (degrees) | 45 |

It is worth to be mentioned that L1 is equal to L2 and θ1 is equal to θ3 according to the 7th embodiment.

8th Embodiment

Figure 8A:
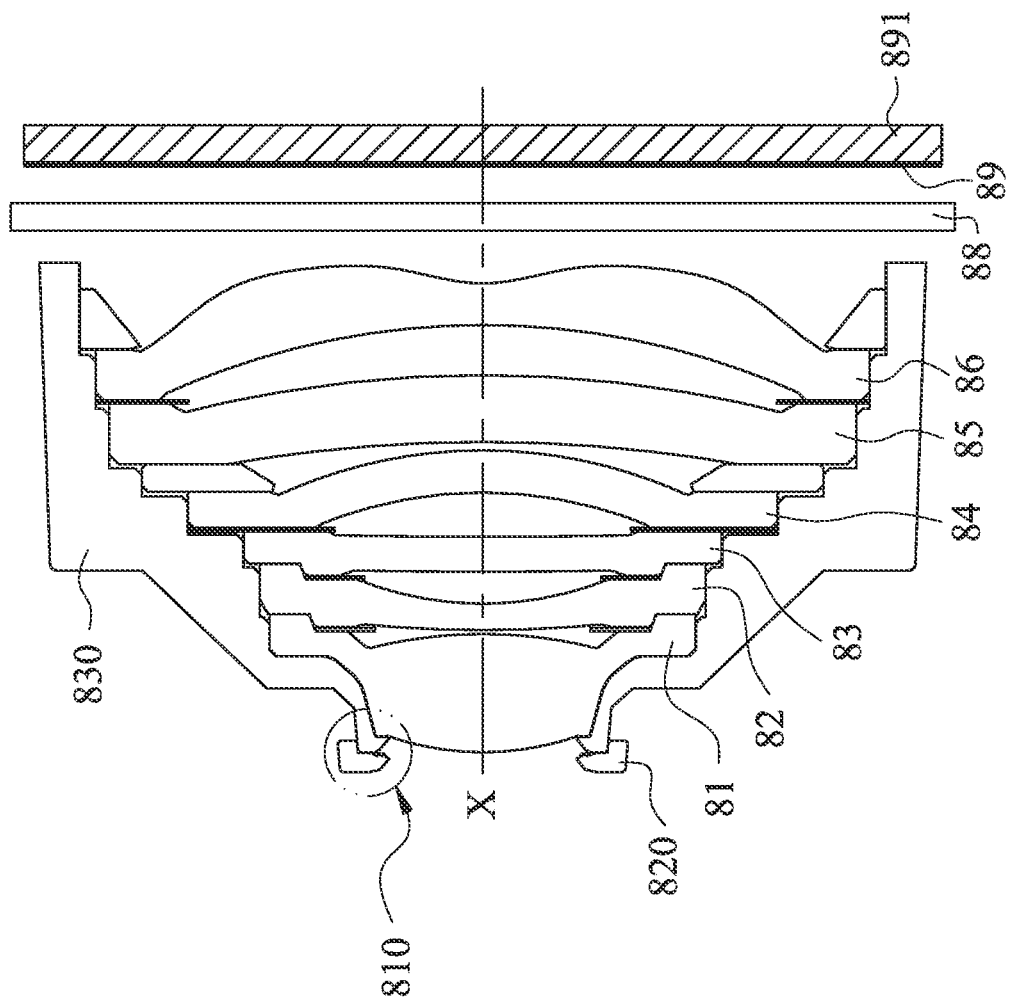
FIG. 8A is a schematic view of an electronic device according to the 8th embodiment of the present disclosure.

FIG. 8A is a schematic view of an electronic device 80 according to the 8th embodiment of the present disclosure. In FIG. 8A, the electronic device 80 includes at least one image capturing device (its reference numeral is omitted) and an image sensor 891, wherein the image capturing device includes an imaging lens assembly (its reference numeral is omitted) and a filter 88. The image sensor 891 is disposed on an image surface 89 of the image capturing device, and the filter 88 is disposed between the imaging lens assembly and the image surface 89.

Figure 8B:
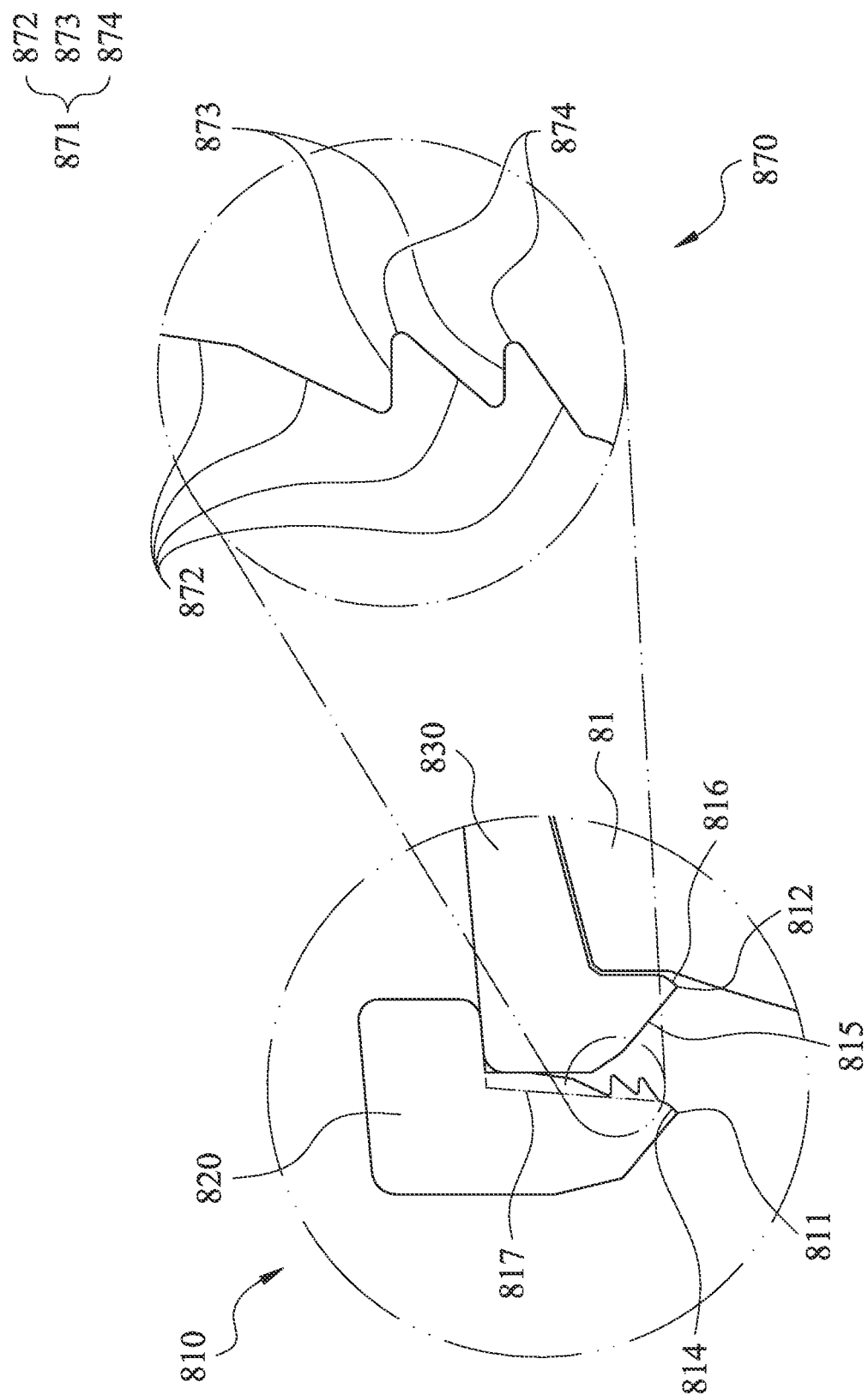
FIG. 8B is a partially enlarged view of the electronic device according to the 8th embodiment in FIG. 8A.
Figure 8C:
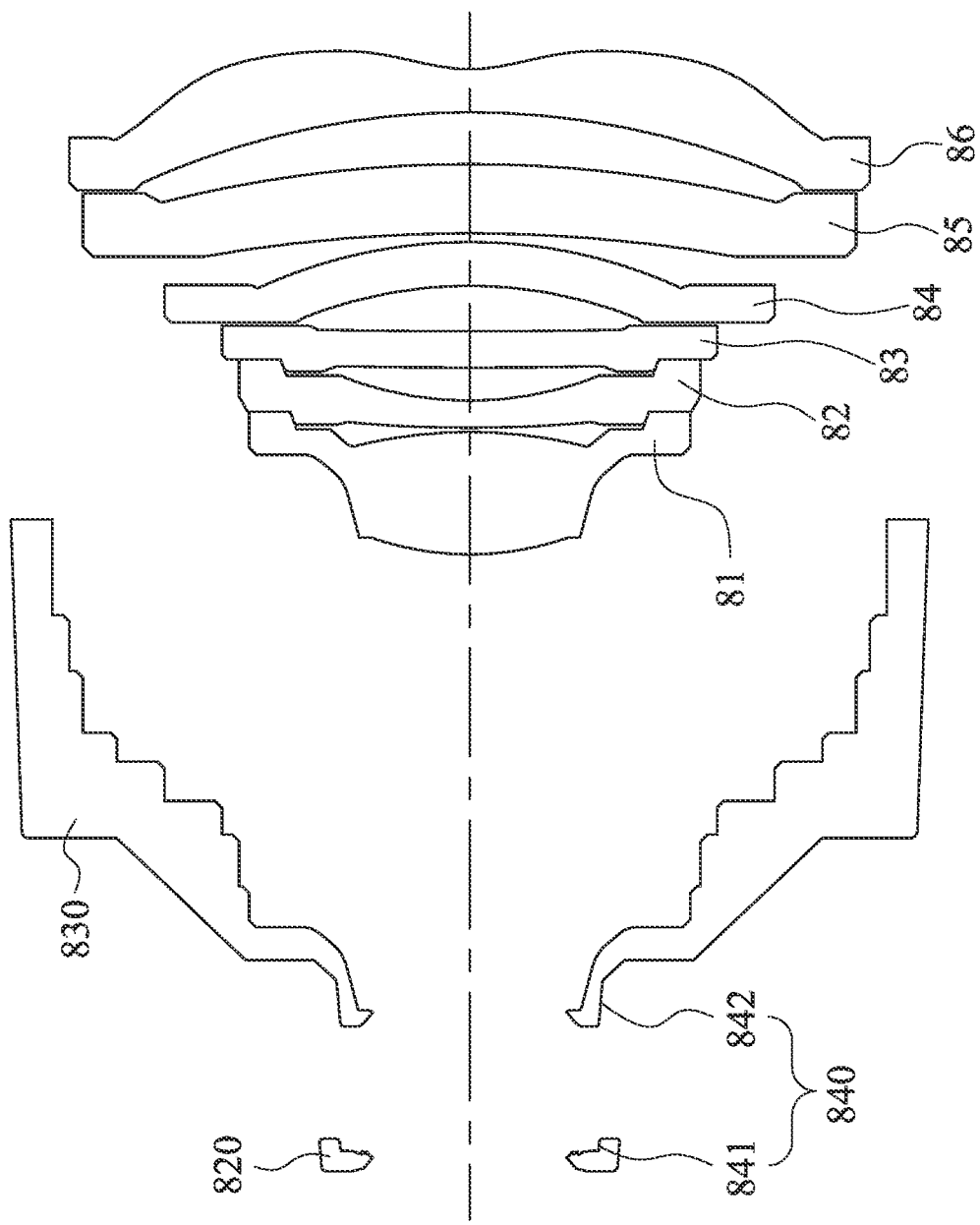
FIG. 8C is a partially exploded view of the image capturing device according to the 8th embodiment in FIG. 8A.

FIG. 8B is a partially enlarged view of the electronic device 80 according to the 8th embodiment in FIG. 8A, and FIG. 8C is a partially exploded view of the image capturing device according to the 8th embodiment in FIG. 8A. In FIGS. 8A to 8C, the imaging lens assembly has an optical axis X and includes an annular structure 810, front cover 820, a lens barrel 830, an axial connecting structure 840, a first lens element 81 and at least two lens elements.

In the 8th embodiment, the imaging lens assembly in order from an object side to an image side includes the first lens element 81 and lens elements 82, 83, 84, 85, 86, wherein all of the first lens element 81 and the lens elements 82, 83, 84, 85, 86 are disposed on an image side of the annular structure 810, and the first lens element 81 is a closest lens element of the imaging lens assembly to the object side. Furthermore, all of the first lens element 81 and the lens elements 82, 83, 84, 85, 86 have refractive power, wherein optical characteristics of the lens elements such as a number, a structure, a surface shape and so on can be utilized, other optical elements can be further disposed according to different imaging requirements, and the present disclosure is not limited thereto.

In FIG. 8B, the annular structure 810 is located on an object side of the imaging lens assembly, surrounds the optical axis X, is composed of the front cover 820 and the lens barrel 830 and includes a first image-side surface 817. The front cover 820 includes a first through hole 811 and a first frustum surface 814 and the lens barrel 830 includes a second through hole 812, a second frustum surface 815 and a third frustum surface 816. The lens barrel 830 is located on an image side of the front cover 820. Hence, it is favorable for enhancing a feasibility of manufacturing.

The first through hole 811 is disposed on an object side of the annular structure 810, and the optical axis X passes through the first through hole 811. The second through hole 812 is disposed on an image side of the first through hole 811, the optical axis X passes through the second through hole 812, the second through hole 812 is a tip-end opening, and the second through hole 812 is a smallest opening of the annular structure 810. Specifically, the tip-end opening is a tip-end protruding towards the optical axis X, and the second frustum surface 815 contacts the third frustum surface 816 and the second through hole 812.

The first frustum surface 814 is disposed on the image side of the first through hole 811, extends from the first through hole 811 to the second through hole 812 in a direction away from the optical axis X, and the first frustum surface 814 can be a non-vertical cylindrical surface. The second frustum surface 815 is disposed on an object side of the second through hole 812 and extends from the second through hole 812 to the first through hole 811 in the direction away from the optical axis X. The first image-side surface 817 is disposed on an image-side edge of the first frustum surface 814 and extends from the image side of the first frustum surface 814 in the direction away from the optical axis X. Specifically, the first frustum surface 814 and the second frustum surface 815 gradually taper in the direction away from the optical axis X and form a light trap structure (its reference numeral is omitted). Furthermore, the first image-side surface 817 can increase a surface area of the light trap structure and then improves an effect of the light trap structure. The third frustum surface 816 is disposed on an image side of the second through hole 812, extends from the second through hole 812 in a direction away from the first through hole 811 and in the direction away from the optical axis X, and the second frustum surface 815 and the third frustum surface 816 gradually taper towards the second through hole 812. Hence, it is favorable for improving an exact image quality closer to an ideal design and decreasing a generation of the stray light, and the third frustum surface 816 can be configured to improve a formability of the annular structure 810. Moreover, cross sections of the second frustum surface 815 and the third frustum surface 816 can be arc lines or slash lines, the second frustum surface 815 and the third frustum surface 816 can include convex structures or concave structures, but the present disclosure is not limited thereto.

Moreover, shapes of the second through hole 812, the second frustum surface 815 and the third frustum surface 816 of the 8th embodiment can be as illustrated in FIGS. 1D to 1I, but the present disclosure is not limited thereto.

In FIG. 8C, the axial connecting structure 840 is disposed on the front cover 820 and the lens barrel 830 and includes a fourth frustum surface 841 and a fifth frustum surface 842. The fourth frustum surface 841 is disposed on the image side of the front cover 820, the fourth frustum surface 841 is farther away from the first through hole 811 than the first frustum surface 814 away from the first through hole 811, the fourth frustum surface 841 faces towards the optical axis X, and extends from the image side of the front cover 820 to the lens barrel 830 in the direction away from the optical axis X. The fifth frustum surface 842 is disposed on an object side of the lens barrel 830, the fifth frustum surface 842 is farther away from the second through hole 812 than the second frustum surface 815 away from the second through hole 812, the fifth frustum surface 842 faces towards the fourth frustum surface 841, and extends from the object side of the lens barrel 830 in a direction away from the front cover 820 and the optical axis X. Both of the fourth frustum surface 841 and the fifth frustum surface 842 can be in a form of a laying surface, the fourth frustum surface 841 contacts the fifth frustum surface 842 physically, and the front cover 820 is aligned with the lens barrel 830.

It is worth to be mentioned that all of the first frustum surface 814 of the front cover 820, the second frustum surface 815 of the lens barrel 830, the third frustum surface 816 of the lens barrel 830, the fourth frustum surface 841 of the axial connecting structure 840 and the fifth frustum surface 842 of the axial connecting structure 840 can be conical surfaces.

In FIG. 8B, at least one of the first frustum surface 814 and the second frustum surface 815 includes a concentric circle structure 870. In the 8th embodiment, the first frustum surface 814 includes the concentric circle structure 870. The concentric circle structure 870 surrounds the optical axis X and is opaque. The concentric circle structure 870 is not configured to image. Hence, it is favorable for further improving the effect of the light trap structure. Specifically, the concentric circle structure 870 includes a plurality of convex structures 871. Each of the convex structures 871 include a plurality of arc torus surfaces 872 and a plurality of connecting surfaces 873, wherein the art torus surfaces 872 have the same curving direction and are arranged along the first image-side surface 817, and the connecting surfaces 873 connect the two adjacent art torus surfaces 872. Moreover, the arc torus surfaces 872 are composed of at least one cone surface and a plurality of rounded angles 874 can be further included between the arc torus surfaces 872 and the connecting surfaces 873. Hence, it is favorable for enhancing a feasibility of manufacturing. It is worth to be mentioned that the concentric circle structure 870 can be Fresnel structure, but the present disclosure is not limited thereto.

Figure 8D:
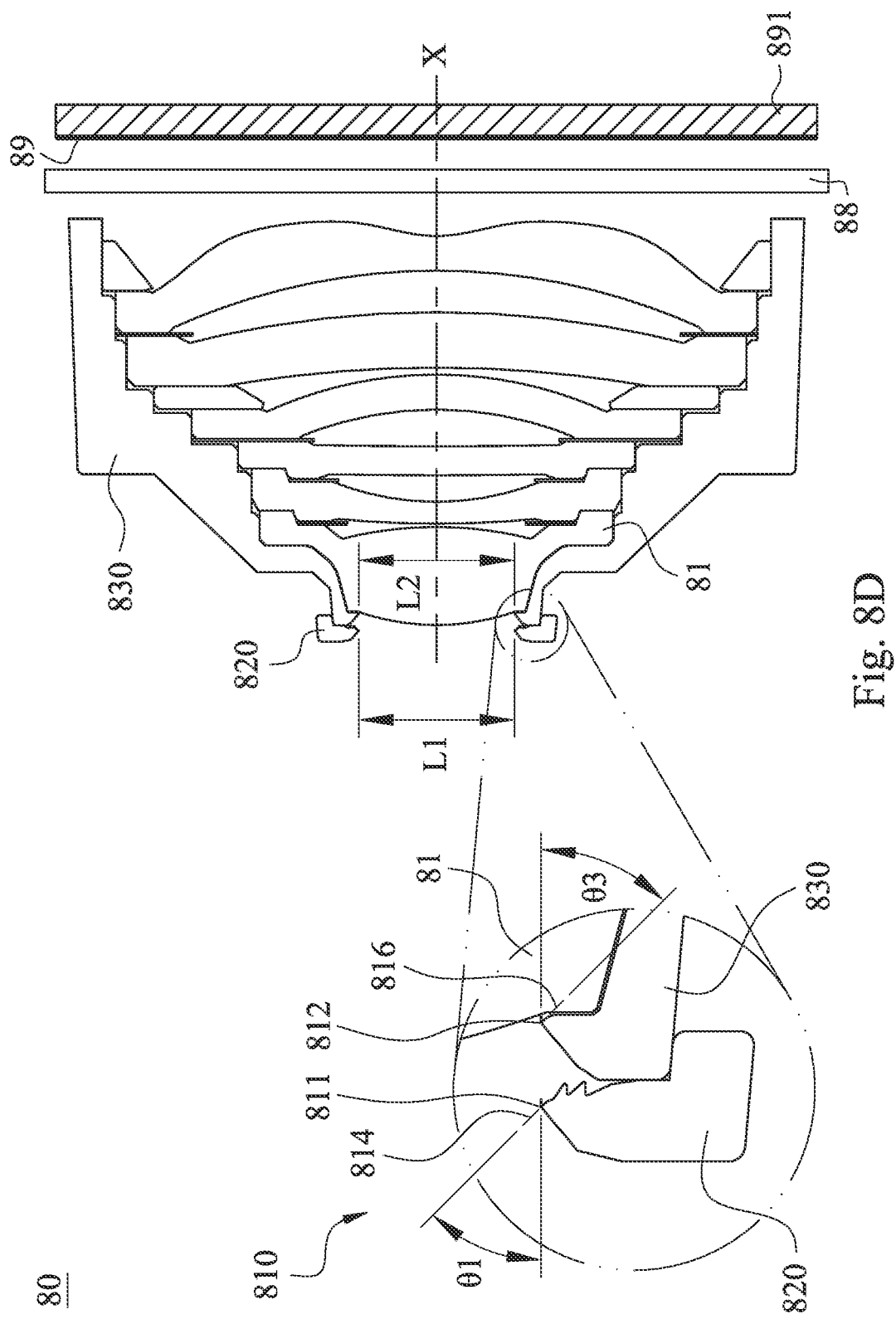
FIG. 8D is a schematic view of parameters of the electronic device according to the 8th embodiment in FIG. 8A.

FIG. 8D is a schematic view of parameters of the electronic device 80 according to the 8th embodiment in FIG. 8A. In FIG. 8D, when a diameter of the first through hole 811 is L1, a diameter of the second through hole 812 is L2, a minimum angle between the first frustum surface 814 and the optical axis X is θ1, an angle between the third frustum surface 816 and the optical axis X is θ3, the condition related to the parameters can be satisfied as the following Table 8.

| Table 8, the 8th embodiment | | | |
| --- | --- | --- | --- |
| L1 (mm) | 1.43 | θ1(degrees) | 45 |
| L2 (mm) | 1.43 | θ3(degrees) | 45 |

It is worth to be mentioned that L1 is equal to L2 and θ1 is equal to θ3 according to the 8th embodiment.

9th Embodiment

Figure 9A:
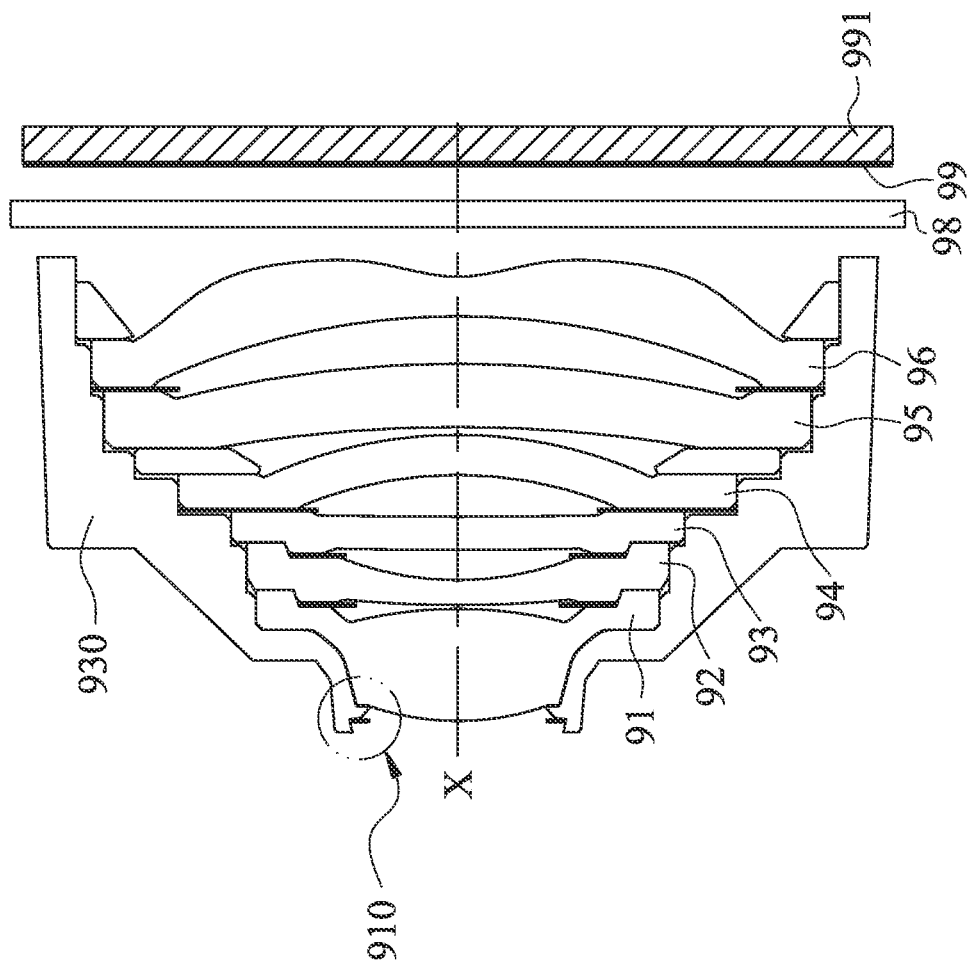
FIG. 9A is a schematic view of an electronic device according to the 9th embodiment of the present disclosure.

FIG. 9A is a schematic view of an electronic device 90 according to the 9th embodiment of the present disclosure. In FIG. 9A, the electronic device 90 includes at least one image capturing device (its reference numeral is omitted) and an image sensor 991, wherein the image capturing device includes an imaging lens assembly (its reference numeral is omitted) and a filter 98. The image sensor 991 is disposed on an image surface 99 of the image capturing device, and the filter 98 is disposed between the imaging lens assembly and the image surface 99.

Figure 9B:
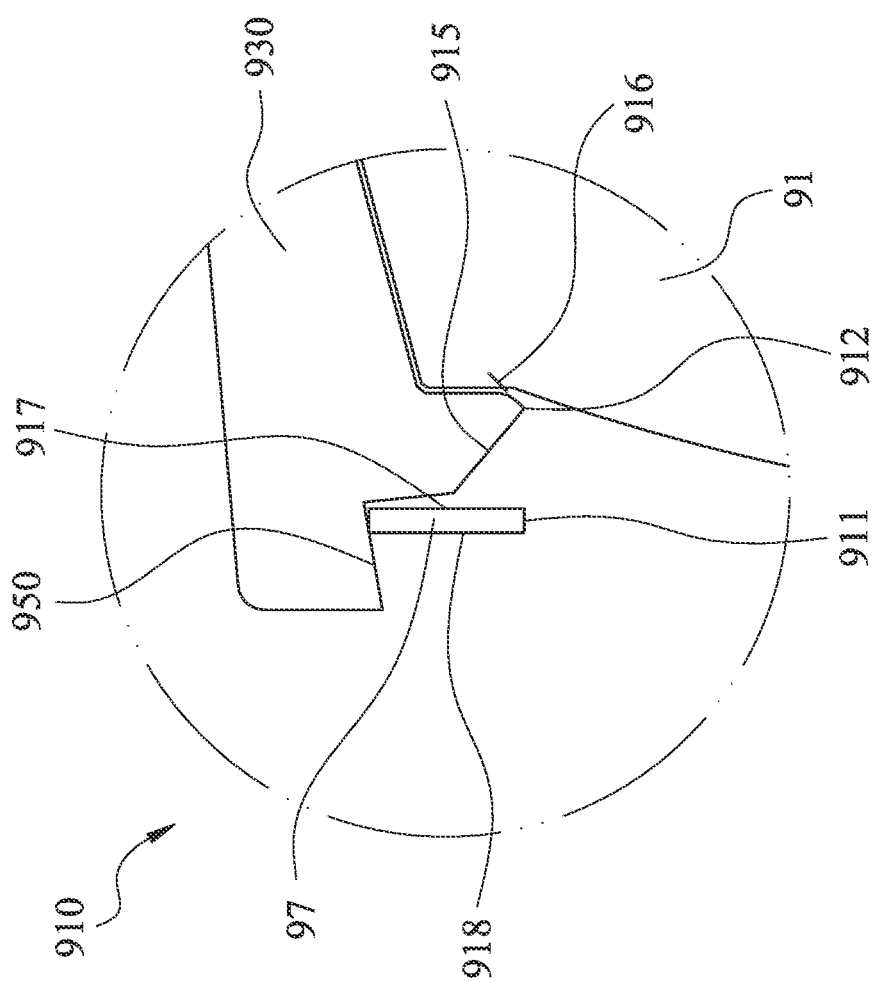
FIG. 9B is a partially enlarged view of the electronic device according to the 9th embodiment in FIG. 9A.
Figure 9C:
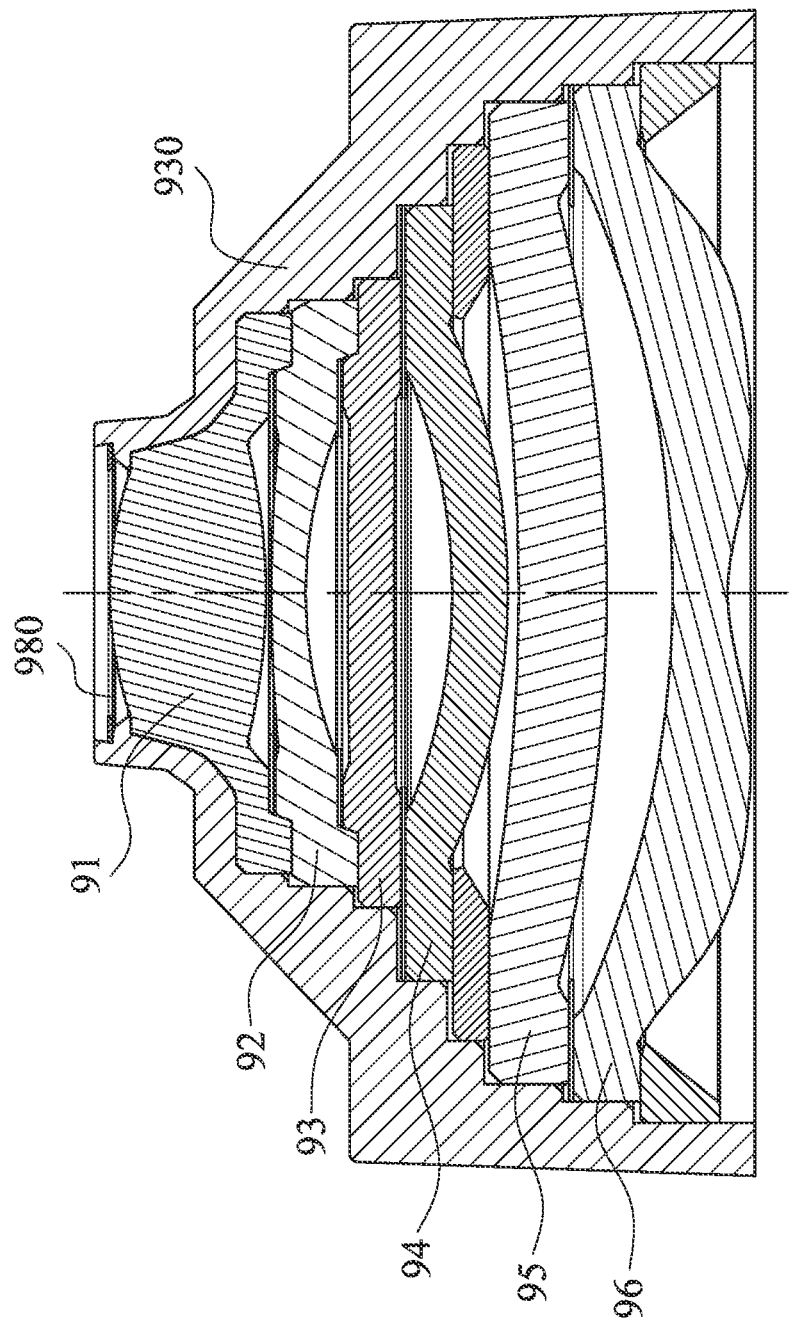
FIG. 9C is a schematic view of the image capturing device according to the 9th embodiment in FIG. 9A.
Figure 9D:
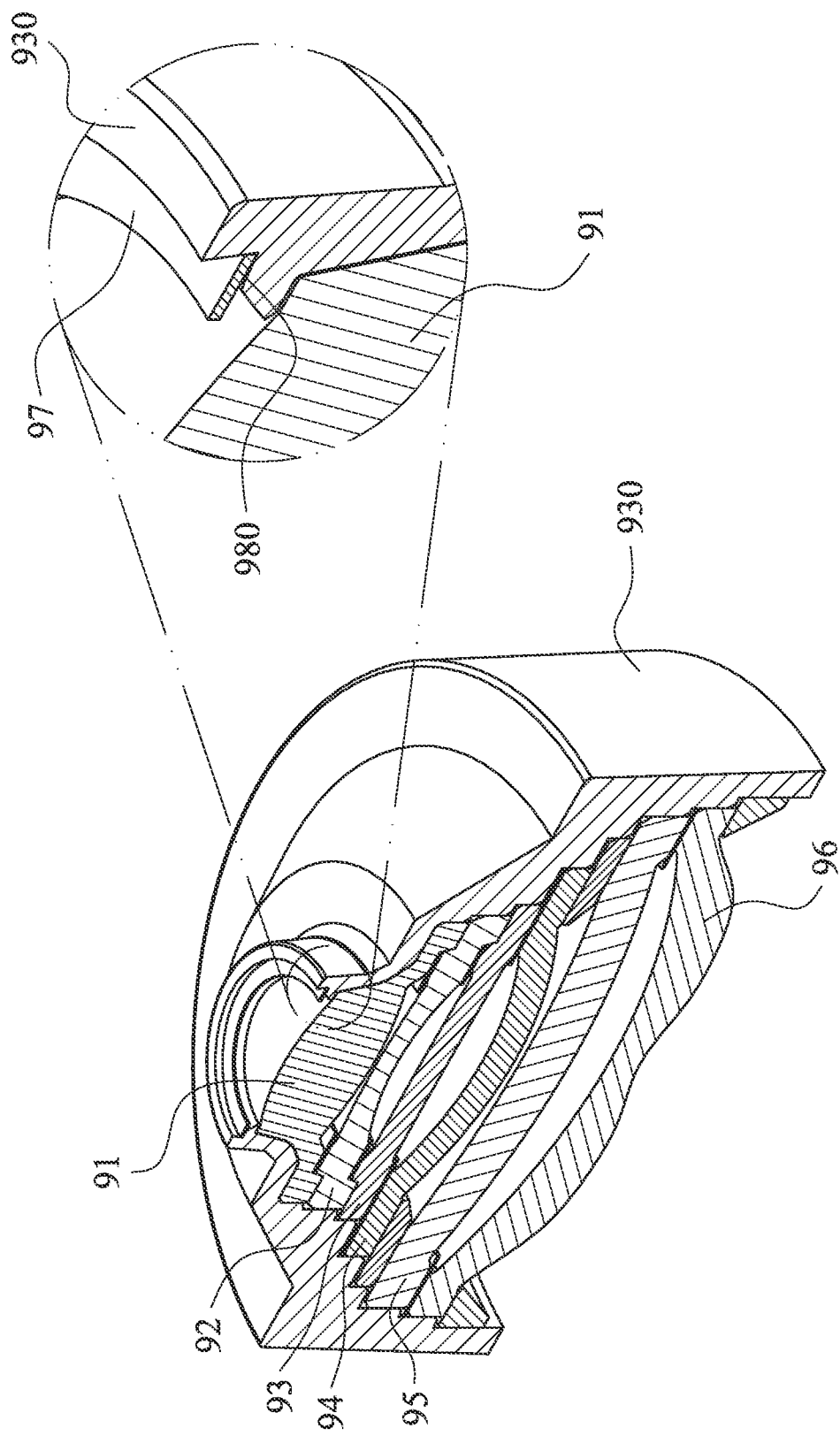
FIG. 9D is a cross-sectional view of the image capturing device according to the 9th embodiment in FIG. 9C.
Figure 9E:
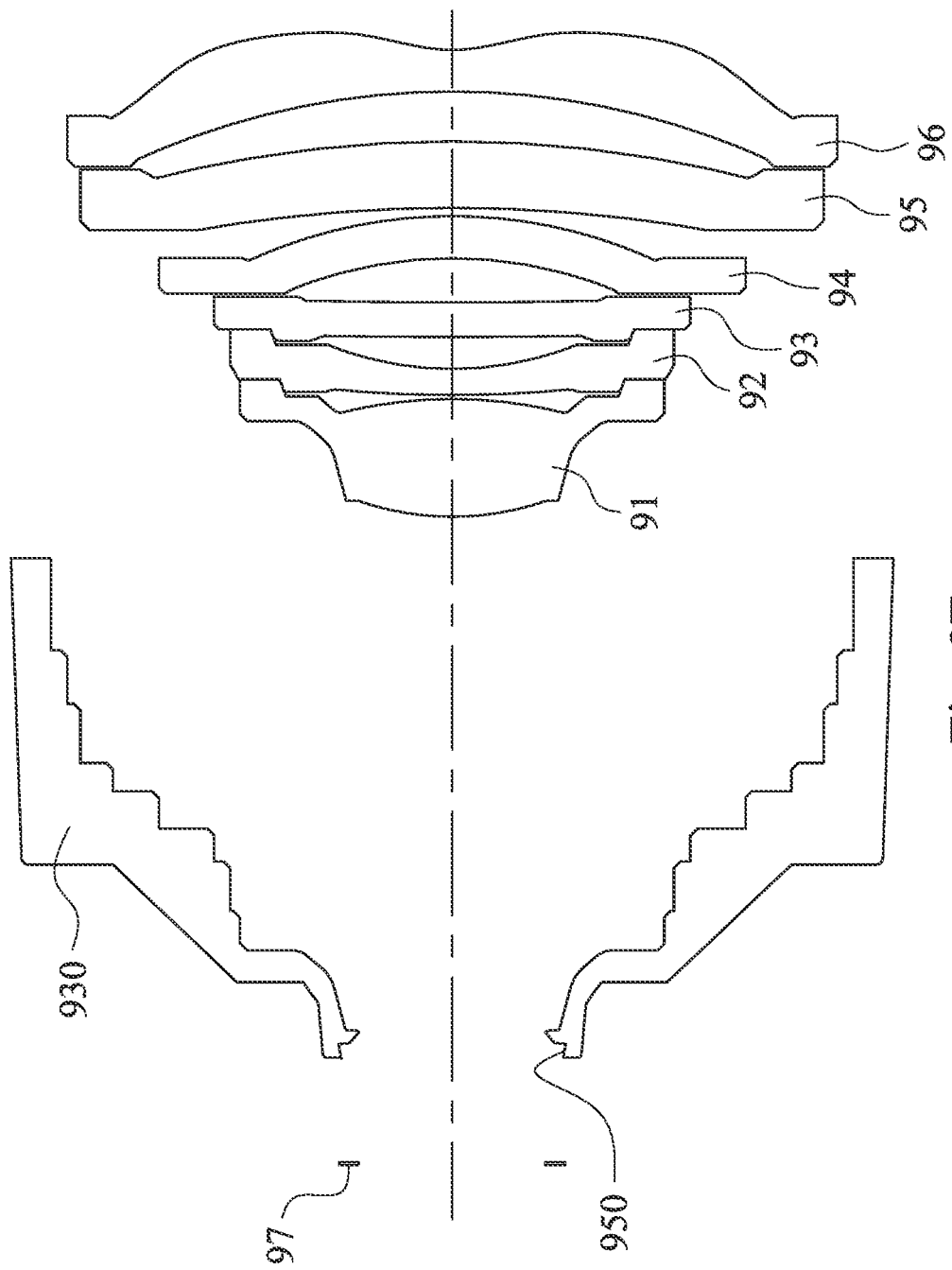
FIG. 9E is a partially exploded view of the image capturing device according to the 9th embodiment in FIG. 9A.

FIG. 9B is a partially enlarged view of the electronic device 90 according to the 9th embodiment in FIG. 9A. FIG. 9C is a schematic view of the image capturing device according to the 9th embodiment in FIG. 9A. FIG. 9D is a cross-sectional view of the image capturing device according to the 9th embodiment in FIG. 9C. FIG. 9E is a partially exploded view of the image capturing device according to the 9th embodiment in FIG. 9A. In FIGS. 9A to 9E, the imaging lens assembly has an optical axis X and includes an annular structure 910, a lens barrel 930, a light blocking sheet 97, a first lens element 91 and at least two lens elements.

In the 9th embodiment, the imaging lens assembly in order from an object side to an image side includes the first lens element 91 and lens elements 92, 93, 94, 95, 96, wherein all of the first lens element 91 and the lens elements 92, 93, 94, 95, 96 are disposed on an image side of the annular structure 910, and the first lens element 91 is a closest lens element of the imaging lens assembly to the object side. Furthermore, all of the first lens element 91 and the lens elements 92, 93, 94, 95, 96 have refractive power, wherein optical characteristics of the lens elements such as a number, a structure, a surface shape and so on can be utilized and other optical elements can be further disposed according to different imaging requirements, and the present disclosure is not limited thereto.

Figure 9F:
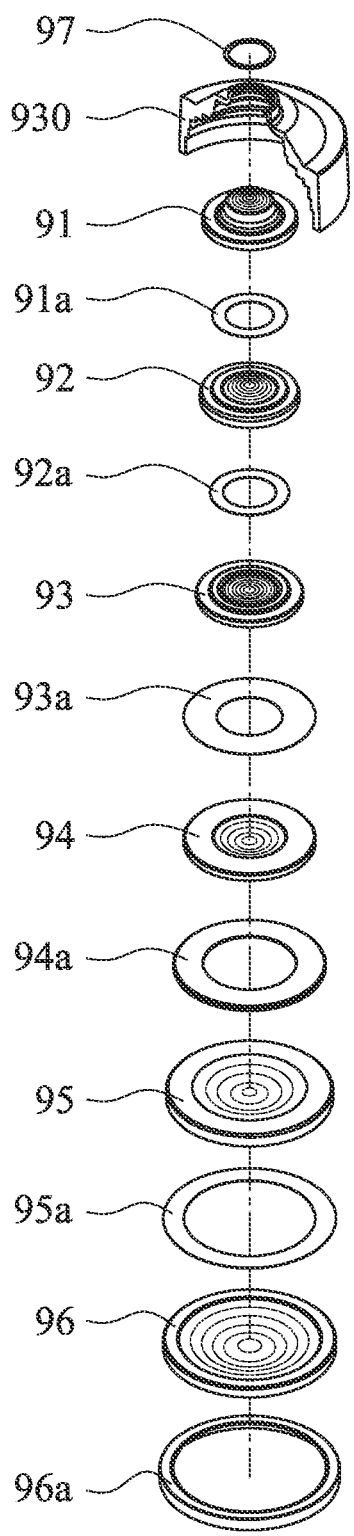
FIG. 9F is an exploded view of the image capturing device according to the 9th embodiment in FIG. 9C.
Figure 9G:
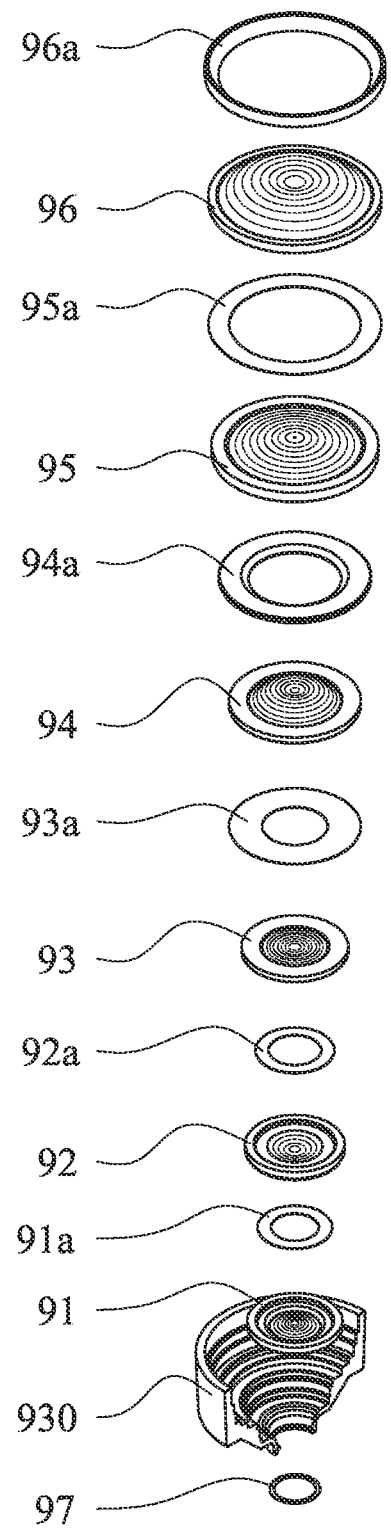
FIG. 9G is another exploded view of the image capturing device according to the 9th embodiment in FIG. 9C.

In detail, FIG. 9F is an exploded view of the image capturing device according to the 9th embodiment in FIG. 9C. FIG. 9G is another exploded view of the image capturing device according to the 9th embodiment in FIG. 9C. In FIG. 9F and FIG. 9G, the imaging lens assembly in order from the object side to image side includes the light blocking sheet 97, the lens barrel 930, the first lens element 91, a light blocking sheet 91a, the lens element 92, a light blocking sheet 92a, the lens element 93, a light blocking sheet 93a, the lens element 94, a spacer 94a, the lens element 95, a light blocking sheet 95a, the lens element 96 and a pressure ring 96a.

In FIG. 9B, the annular structure is located on an object side of the imaging lens assembly, surrounds the optical axis X and is composed of the light blocking sheet 97 and the lens barrel 930. The light blocking sheet 97 includes a first through hole 911, a first object-side surface 918 and a first image-side surface 917, and the lens barrel 930 includes a second through hole 912, a second frustum surface 915, a third frustum surface 916 and a sixth frustum surface 950. Specifically, the lens barrel 930 can be integrally formed via injection molding with elastic demolding. Hence, it is favorable for decreasing a space for strapping and assembling and is favorable for reducing a volume of the imaging lens assembly.

The first through hole 911 is disposed on an object side of the annular structure 910, and the optical axis X passes through the first through hole 911. The second through hole 912 is disposed on an image side of the first through hole 911, the optical axis X passes through the second through hole 912, the second through hole 912 is a tip-end opening, and the second through hole 912 is a smallest opening of the annular structure 910. Specifically, the tip-end opening is a tip-end protruding towards the optical axis X, and the second frustum surface 915 contacts the third frustum surface 916 and the second through hole 912.

The first object-side surface 918 is disposed on an object side of the first through hole 911 and extends from the first through hole in a direction away from the optical axis X. The first image-side surface 917 is disposed on an image side of the first through hole 911, extends from the first through hole 911 in the direction away from the optical axis X, and is disposed relative to the first object-side surface 918. Furthermore, the first image-side surface 917 and the second frustum surface 915 gradually taper and form a light trap structure 980. Hence, it is favorable for decreasing a generation of the stray light.

The second frustum surface 915 is disposed on an object side of the second through hole 912 and extends from the second through hole 912 to the first through hole 911 in the direction away from the optical axis X. The third frustum surface 916 is disposed on an image side of the second through hole 912, extends from the second through hole 912 to the first through hole 911 in the direction away from the optical axis X, and the second frustum surface 915 and the third frustum surface 916 gradually taper towards the second through hole 912. Hence, it is favorable for improving an image quality closer to an ideal design, and the third frustum surface 916 is configured to improve a feasibility of the annular structure 910. Moreover, cross sections of the second frustum surface 915 and the third frustum surface 916 can be arc lines or slash lines, the second frustum surface 915 and the third frustum surface 916 can include convex structures or concave structures, but the present disclosure is not limited thereto.

Moreover, shapes of the second through hole 912, the second frustum surface 915 and the third frustum surface 916 of the 9th embodiment can be as illustrated in FIGS. 1D to 1I, but the present disclosure is not limited thereto.

In FIG. 9E, the sixth frustum surface 950 surrounds an object-side edge of the lens barrel 930, faces towards the optical axis X, extends towards the light blocking sheet 97 and gradually expands, wherein the sixth frustum surface 950 contacts an object side of the light blocking sheet 97.

It is worth to be mentioned that all of the second frustum surface 915 of the lens barrel 930, the third frustum surface 916 thereof and the sixth frustum surface 950 thereof can be conical surfaces.

Figure 9H:
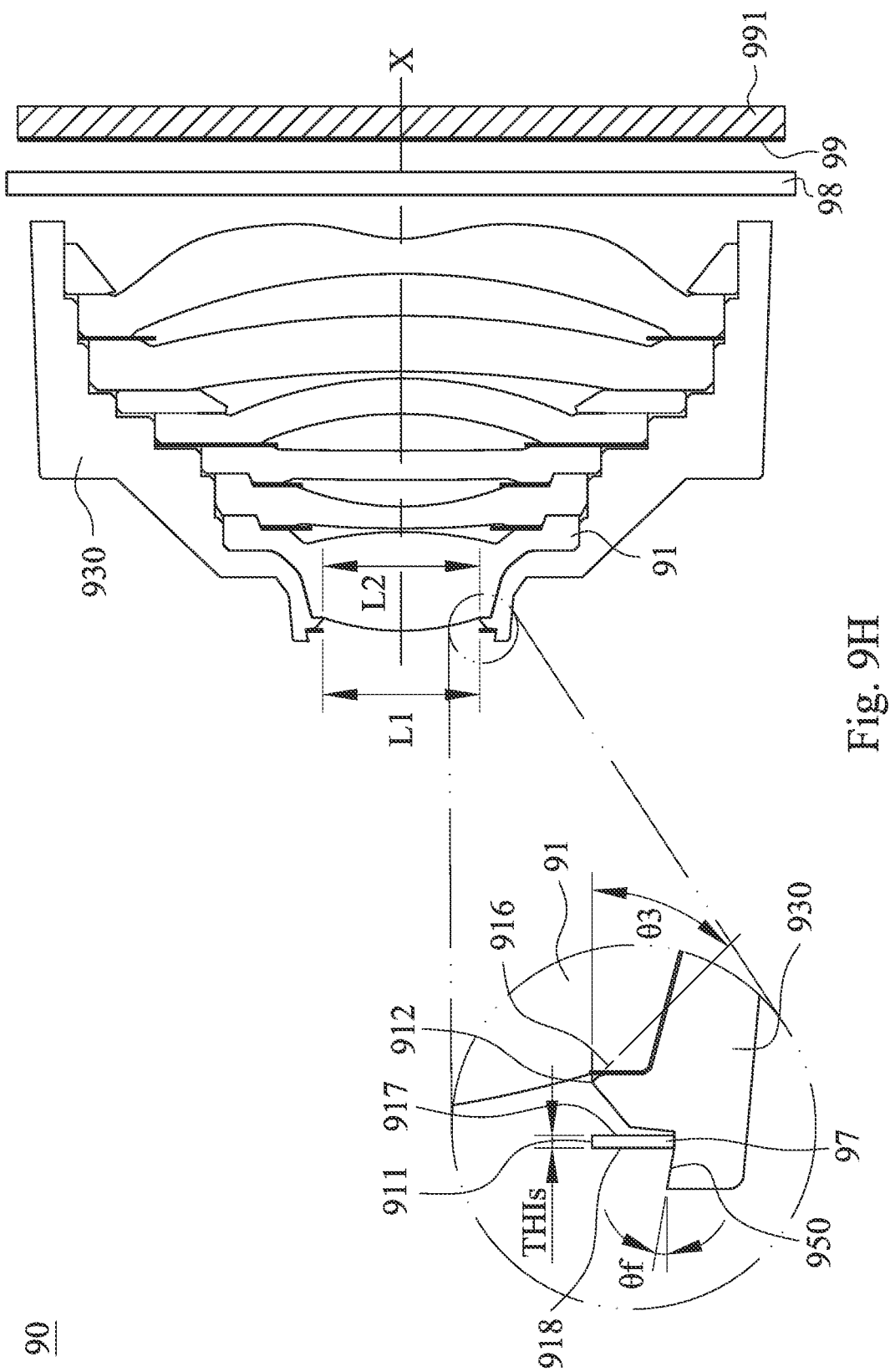
FIG. 9H is a schematic view of parameters of the electronic device according to the 9th embodiment in FIG. 9A.

FIG. 9H is a schematic view of parameters of the electronic device 90 according to the 9th embodiment in FIG. 9A. In FIG. 9H, when a diameter of the first through hole 911 is L1, a diameter of the second through hole 912 is L2, a minimum angle between the third frustum surface 916 and the optical axis X is θ3, an angle between the sixth frustum surface 950 and the optical axis X is θf, a spacing thickness between the first object-side surface 918 of the light blocking sheet 97 and the first image-side surface 917 thereof is THIs, the condition related to the parameters can be satisfied as the following Table 9.

| Table 9, the 9th embodiment | | | |
|---|---|---|---|
| L1 (mm) | 1.43 | θf(degrees) | 10 |
| L2 (mm) | 1.43 | θ3(degrees) | 45 |
| THIs(mm) | 0.023 | | |

It is worth to be mentioned that L1 is equal to L2 and θf is equal to θ3 according to the 9th embodiment.

10th Embodiment

Figure 10A:
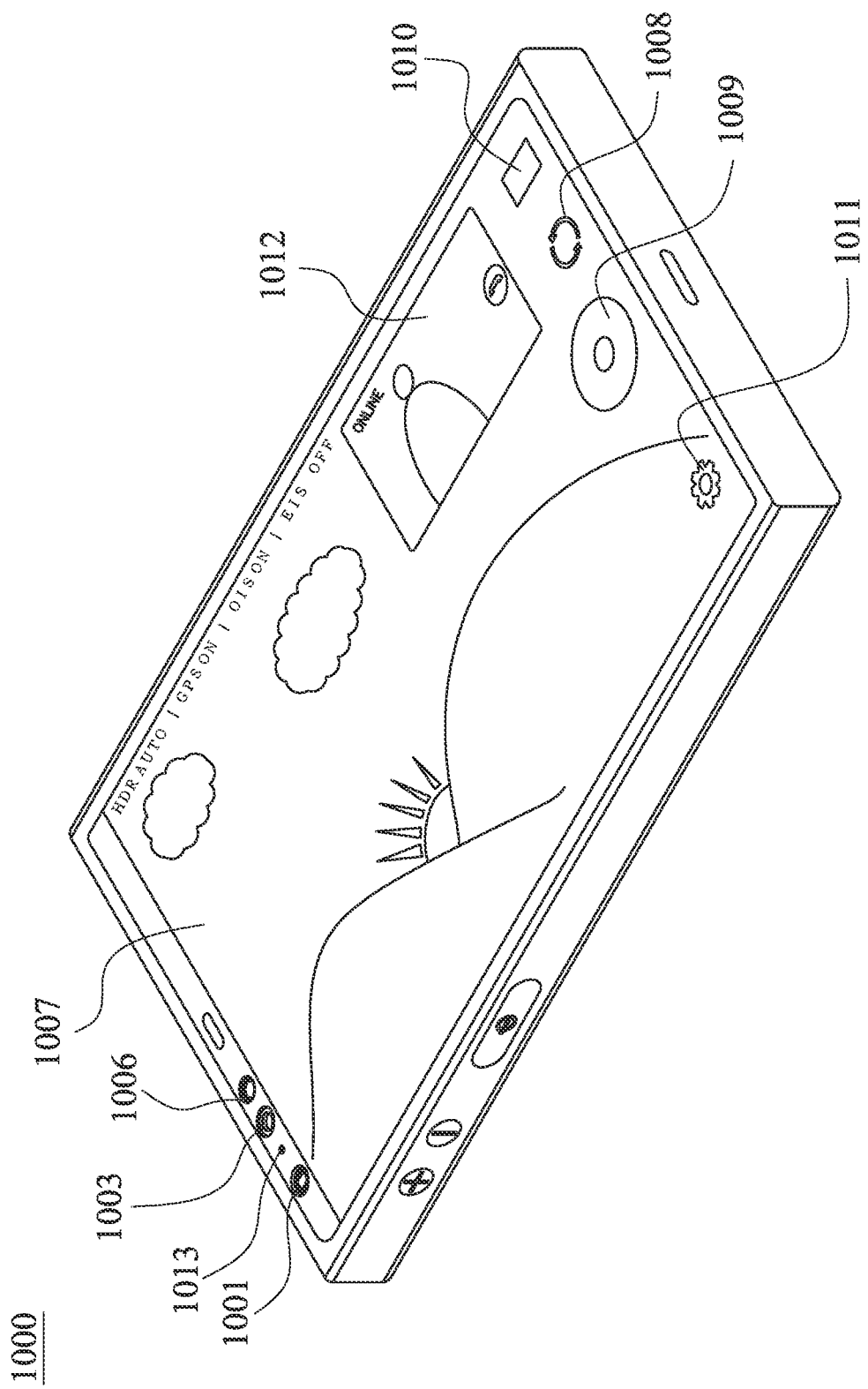
FIG. 10A is a schematic view of an electronic device according to the 10th embodiment of the present disclosure.
Figure 10B:
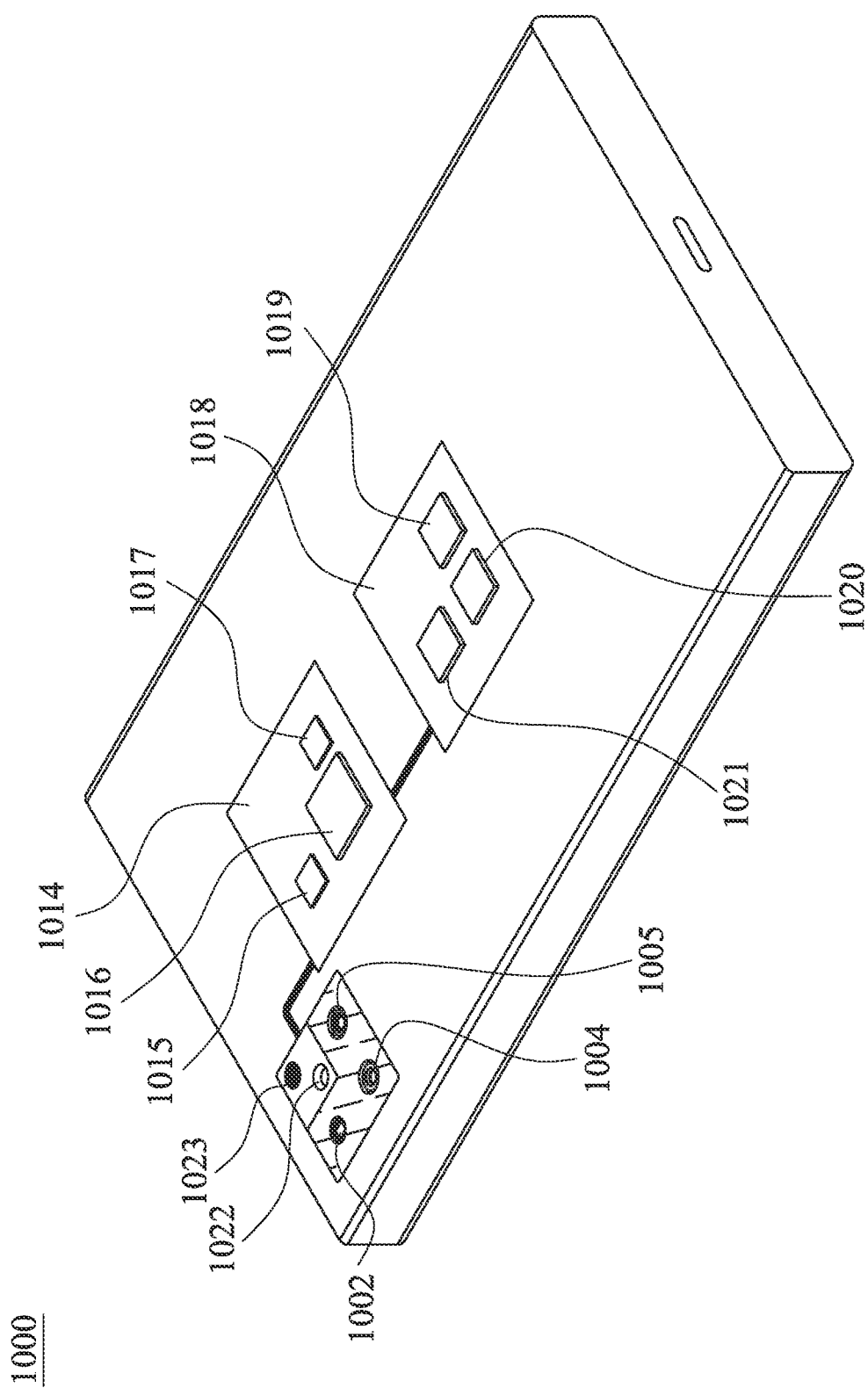
FIG. 10B is another schematic view of the electronic device according to the 10th embodiment in FIG. 10A.
Figure 11A:
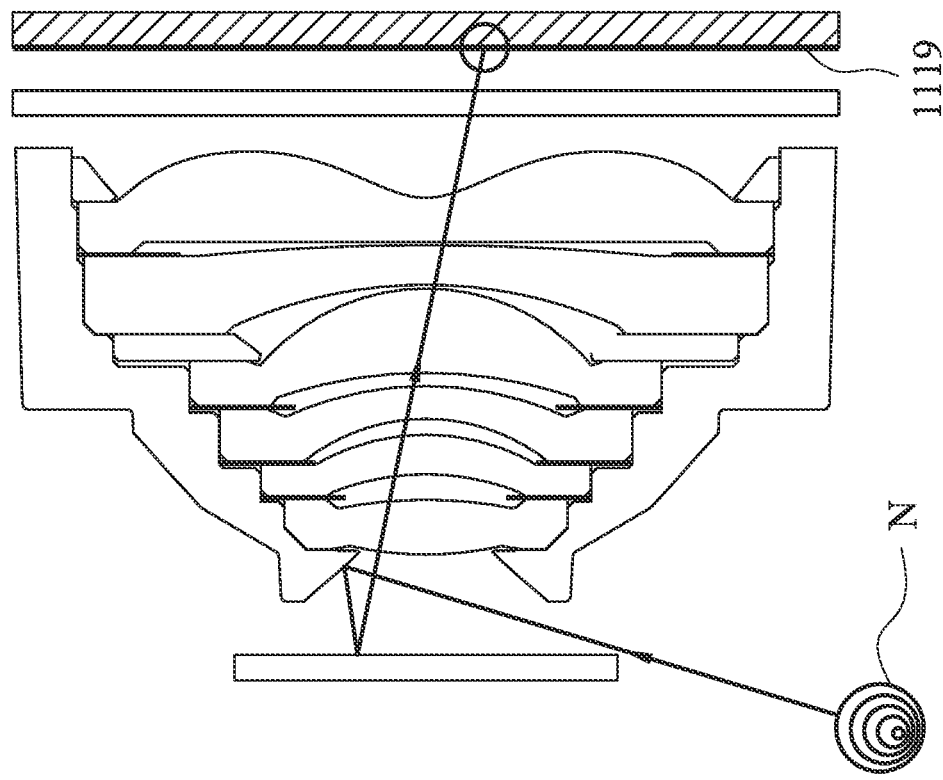
FIG. 11A is a schematic view of an electronic device without a light blocking element according to the conventional art.
Figure 11B:
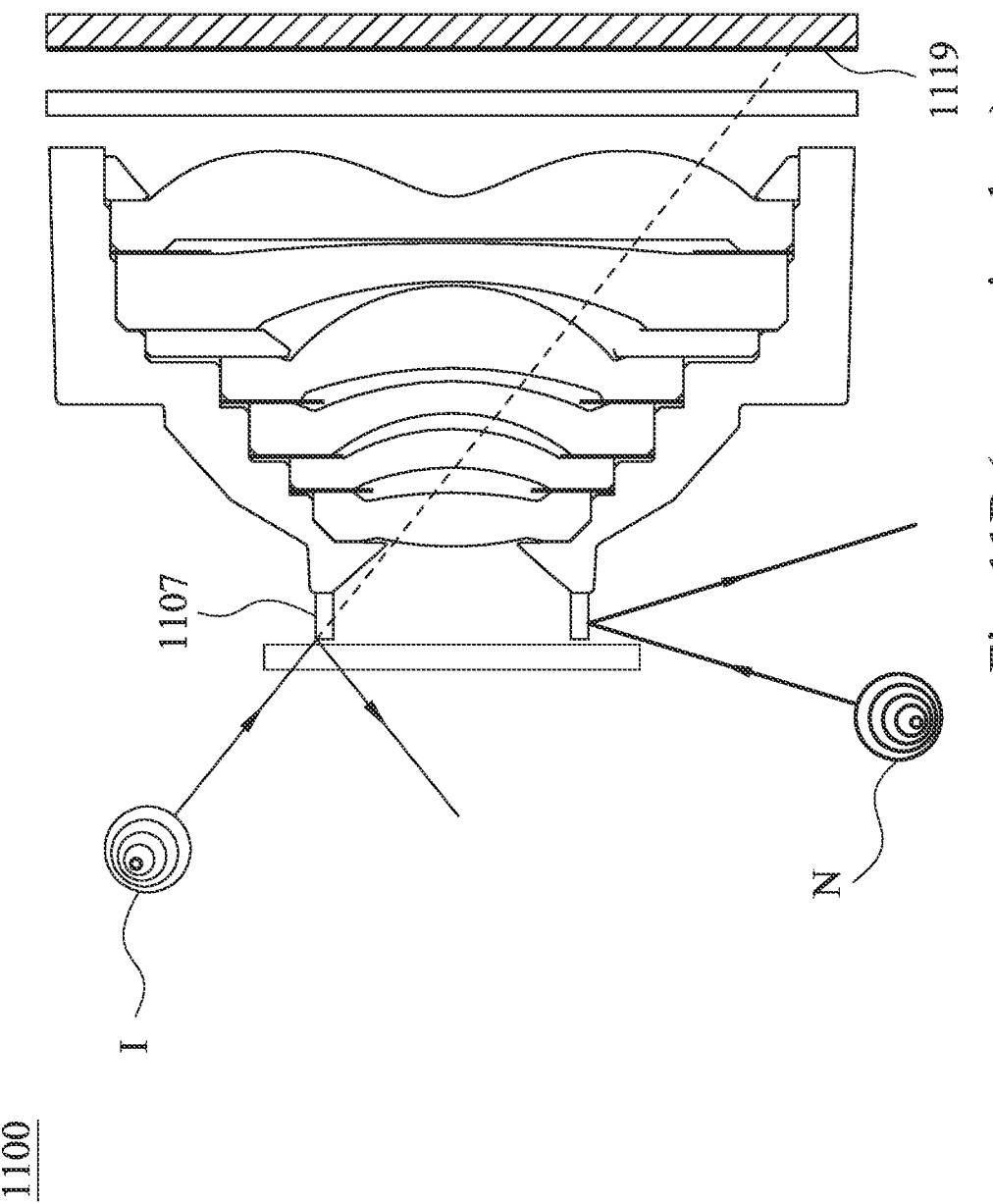
FIG. 11B is a schematic view of an electronic device with a light blocking element according to the conventional art.

FIG. 10A is a schematic view of an electronic device 1000 according to the 10th embodiment of the present disclosure. FIG. 10B is another schematic view of the electronic device 1000 according to the 10th embodiment in FIG. 10A. In FIG. 10A and FIG. 10B, the electronic device 1000 is a smart phone and the electronic device 1000 includes at least one image capturing device and an image sensor (its reference numeral is omitted), wherein a number of the image capturing devices are 6 and the image capturing devices are image capturing devices 1001, 1002, 1003, 1004, 1005, 1006 according to the 10th embodiment. The image capturing devices 1001, 1102 are ultra-wide angle image capturing devices, the image capturing devices 1003, 1004 are wide-angle image capturing devices, the image capturing device

1005 is a telephoto image capturing device, the image capturing device 1006 is a TOF (time-of-flight) module, the image capturing device 1006 can be other image capturing device, and the 10th embodiment is not limited thereto. In detail, the image capturing devices 1001, 1003, 1006 are disposed on a front side of the electronic device 1000 and the image capturing devices 1002, 1004, 1005 are disposed on a rear side of the electronic device 1000 according to the 10th embodiment. Each of the image capturing devices includes an imaging lens assembly (its reference numeral is omitted), the image sensor is disposed on an image surface (its reference numeral is omitted) of the image capturing devices, and each of the image capturing devices can be any one according to the 1st embodiment to the 9th embodiment, but the present disclosure is not limited thereto.

An image capturing control interface 1007 can be a screen or a display screen, and includes an image capturing module switching bottom 1008, a focus picturing bottom 1009, a video replay bottom 1010, an integrated menu bottom 1011 and a floating window 1012. Furthermore, a user can activate the capturing mode by the image capturing control interface 1007 of the electronic device 1000 and use the image capturing module switching bottom 1008 to switch one of the image capturing devices 1001, 1002, 1003, 1004, 1005 to take pictures. After taking pictures and confirming one of the image capturing devices 1001, 1002, 1003, 1004, 1005, the user use the focus picturing bottom 1009 to undergo image capturing. After image picturing, the user can view pictures by the video replay bottom 1010. The integrated menu bottom 1011 is configured to adjust the details of the image capturing (such as timed photo, photo ratio, and etc.). The user can use the floating window 1012 to livestream or do a phone call during filming.

The electronic device 1000 further includes a reminding light 1013, and the reminding light 1013 is disposed on the front side of the electronic device 1000 and configured to remind the user of unread messages, missed calls and the condition of the phone.

Furthermore, when the user activate the capturing mode by the image capturing control interface 1007 of the electronic device 1000, the imaging lens assembly converge imaging lights on the image sensor and output an electronic signal about image to an image signal processor 1015 of a single chip system 1014. Wherein the single chip system 1014 further includes a central processing unit 1016 and a random-access memory (RAM) 1017, and can further include, but not limited to, a display, a control unit, a storage unit, a read-only memory (ROM) or the combination thereof.

In response to the camera specification of the electronic device 1000, the electronic device 1000 can further include an optical anti-shake mechanism (its reference numeral is omitted), which can be an optical image stabilization (OIS) device. Furthermore, the electronic device 1000 can further include at least one auxiliary optical component and at least one sensing component 1018. In the 10th embodiment, the auxiliary optical component is a fill light 1022 and a focus auxiliary element 1023, the fill light 1022 is configured to compensate the color temperature, and the focus auxiliary element 1023 can be an infrared distance measurement component, a laser focus module, etc. The sensing component 1018 can have functions for sensing physical momentum and kinetic energies, and can further include a position locator 1019, an accelerometer 1020, a gyroscope 1021, and a Hall effect element (its reference numeral is omitted), wherein the position locator 1019 can be a global positioning system (GPS). Specifically, the sensing component 1018 is configured to record a geographic location and an environment when picturing, and sense a shake and a vibration from the hands of the user or an external environment. Hence, it is favorable for functioning of the autofocus function and the optical anti-shake mechanism of the imaging lens assembly disposed on the electronic device 1000 to obtain a great image quality and facilitate the electronic device 1000 according to the present disclosure to have an image capturing function with multiple modes, such as taking optimized selfies, high dynamic range (HDR) with a low light source, 4K resolution recording, etc. Further, the user can visually see the captured image of the image capturing devices 1001, 1002, 1003, 1004, 1005 by the image capturing control interface 1007 and manually operate the view finding range on the image capturing control interface 1007 to achieve the auto focus function of what you see is what you get.

Hence, the user can obtain a better picturing experience by the electronic device 1000 of the present disclosure.

The foregoing description, for purpose of explanation, has been described with reference to specific embodiments. It is to be noted that Tables show different data of the different embodiments, however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis, comprising:
   an annular structure located on an object side of the imaging lens assembly and surrounding the optical axis, and comprising:
   a first through hole disposed on an object side of the annular structure, and the optical axis passing therethrough;
   a second through hole disposed on an image side of the first through hole, and the optical axis passing therethrough;
   a first frustum surface disposed on the image side of the first through hole and extending from the first through hole to the second through hole in a direction away from the optical axis;
   a second frustum surface disposed on an object side of the second through hole and extending from the second through hole to the first through hole in the direction away from the optical axis; and
   a third frustum surface disposed on an image side of the second through hole and extending from the second through hole in a direction away from the first through hole and in the direction away from the optical axis;
   wherein the first frustum surface of the annular structure and the second frustum surface of the annular structure gradually taper towards the direction away from the optical axis;
   wherein the second frustum surface and the third frustum surface gradually taper towards the second through hole;
   wherein the second through hole of the annular structure is a tip-end opening;

wherein a minimum angle between the first frustum surface and the optical axis is θ1, a diameter of the first through hole is L1, a diameter of the second through hole is L2, and the following conditions are satisfied:

3 degrees<θ1≤70 degrees; and
L1≥L2.

2. The imaging lens assembly of claim 1, wherein an angle between the third frustum surface and the optical axis is θ3, and the following condition is satisfied:

35 degrees≤θ3≤80 degrees.

3. The imaging lens assembly of claim 1, wherein the annular structure further comprises:
   a first image-side surface disposed on an image-side edge of the first frustum surface and extending from the image side of the first frustum surface in the direction away from the optical axis.

4. The imaging lens assembly of claim 1, wherein the annular structure is composed of a front cover and a lens barrel, the front cover comprises the first through hole and the first frustum surface, the lens barrel comprises the second through hole, the second frustum surface and the third frustum surface, and the lens barrel is located on an image side of the front cover.

5. The imaging lens assembly of claim 4, further comprising:
   an axial connecting structure disposed on the front cover and the lens barrel, and comprising:
   a fourth frustum surface disposed on the image side of the front cover, wherein the fourth frustum surface is farther from the first through hole than the first frustum surface from the first through hole, the fourth frustum surface faces towards the optical axis and extends from the image side of the front cover to the lens barrel in the direction away from the optical axis; and
   a fifth frustum surface disposed on an object side of the lens barrel, wherein the fifth frustum surface is farther from the second through hole than the second frustum surface from the second through hole, the fifth frustum surface faces towards the fourth frustum surface and extends from the object side of the lens barrel in a direction away from the front cover and in the direction away from the optical axis;
   wherein the fourth frustum surface contacts the fifth frustum surface physically, and the front cover is aligned with the lens barrel.

6. The imaging lens assembly of claim 1, wherein the annular structure is composed of a lens barrel and a ring element, the lens barrel comprises the first through hole and the first frustum surface, the ring element comprises the second through hole, the second frustum surface and the third frustum surface, the lens barrel surrounds the optical axis and forms a containing space, the ring element is disposed on an object side of the containing space and contacts the lens barrel physically.

7. The imaging lens assembly of claim 1, wherein the first through hole, the second through hole, the first frustum surface, the second frustum surface and the third frustum surface are integrally formed, the minimum angle between the first frustum surface and the optical axis is θ1, and the following condition is satisfied:

3 degrees<θ1≤30 degrees.

8. The imaging lens assembly of claim 1, further comprising:
   a light blocking sheet disposed between the first frustum surface and the second frustum surface, wherein the first frustum surface, the light blocking sheet and the second frustum surface are arranged in order from the object side to an image side, and comprising:
   a third through hole, the optical axis passing therethrough;
   wherein the diameter of the second through hole is L2, a diameter of the third through hole is L3, and the following condition is satisfied:

0≤(L3−L2)/L2≤0.2.

9. The imaging lens assembly of claim 1, wherein at least one of the first frustum surface and the second frustum surface comprises a concentric circle structure, the concentric circle structure surrounds the optical axis and is opaque.

10. The imaging lens assembly of claim 1, further comprising:
   a first lens element disposed on an image side of the annular structure; and
   at least two lens elements disposed on the image side of the annular structure;
   wherein the first lens element is a closest lens element to the object side of the imaging lens assembly.

11. An image capturing device, comprising:
   the imaging lens assembly of claim 1.

12. An electronic device, comprising:
   at least one of the image capturing device of claim 11; and
   an image sensor disposed on an image surface of the at least one of the image capturing device.

13. An imaging lens assembly, having an optical axis, and comprising:
   an annular structure located on an object side of the imaging lens assembly and surrounding the optical axis, and comprising:
   a first through hole disposed on an object side of the annular structure and the optical axis passing therethrough;
   a second through hole disposed on an image side of the first through hole and the optical axis passing therethrough;
   a first object-side surface disposed on an object side of the first through hole and extending from the first through hole in a direction away from the optical axis;
   a first image-side surface disposed on the image side of the first through hole, extending from the first through hole in the direction away from the optical axis, and disposed relative to the first object-side surface;
   a second frustum surface disposed on an object side of the second through hole and extending from the second through hole to the first through hole in the direction away from the optical axis, and the second frustum surface facing to the first image-side surface in a direction parallel to the optical axis; and
   a third frustum surface disposed on an image side of the second through hole and extending from the second through hole in a direction away from the first through hole and the optical axis;
   wherein the first image-side surface of the annular structure and the second frustum surface of the annular structure gradually taper in the direction away from the optical axis;
   wherein the second frustum surface and the third frustum surface gradually taper towards the second through hole;
   wherein the second through hole of the annular structure is a tip-end opening;

wherein an angle between the third frustum surface and the optical axis is θ3, and the following condition is satisfied:

35 degrees≤θ3≤80 degrees.

14. The imaging lens assembly of claim 13, wherein the annular structure is composed of a light blocking sheet and a lens barrel, the light blocking sheet comprises the first through hole, the first object-side surface and the first image-side surface, and the lens barrel comprises the second through hole, the second frustum surface and the third frustum surface.

15. The imaging lens assembly of claim 14, wherein the lens barrel further comprises:
  a sixth frustum surface surrounding an object-side edge of the lens barrel, facing towards the optical axis, extending towards the light blocking sheet and gradually expanding;
  wherein the sixth frustum surface contacts an object-side edge of the light blocking sheet;
  wherein an angle between the sixth frustum surface and the optical axis is θf, and the following condition is satisfied:

3 degrees≤θf≤30 degrees.

16. The imaging lens assembly of claim 15, wherein a spacing thickness between the first object-side surface of the light blocking sheet and the first image-side surface of the light blocking sheet is THIs, and the following condition is satisfied:

0.005 mm≤THIs≤0.06 mm.

17. The imaging lens assembly of claim 13, wherein the second frustum surface comprises a concentric circle structure, the concentric circle structure surrounds the optical axis, and the concentric circle structure is opaque.

18. The imaging lens assembly of claim 13, wherein a diameter of the first through hole is L1, a diameter of the second through hole is L2, and the following condition is satisfied:

L1≥L2.

19. The imaging lens assembly of claim 13, further comprising:
  a first lens element disposed on an image side of the annular structure; and
  at least two lens elements disposed on the image side of the annular structure;
  wherein the first lens element is a closest lens element to the object side of the imaging lens assembly.

20. An image capturing device, comprising:

the imaging lens assembly of claim 13.

21. An electronic device, comprising:

at least one of the image capturing device of claim 20; and an image sensor disposed on an image surface of the at least one of the image capturing device.

* * * * *